US012641616B2

(12) United States Patent
Yoshimura et al.

(10) Patent No.: US 12,641,616 B2
(45) Date of Patent: May 26, 2026

(54) TERMINAL APPARATUS, BASE STATION APPARATUS, AND COMMUNICATION METHOD

(71) Applicant: SHARP KABUSHIKI KAISHA, Sakai City (JP)

(72) Inventors: Tomoki Yoshimura, Sakai City (JP); Shoichi Suzuki, Sakai City (JP); Daiichiro Nakashima, Sakai City (JP); Huifa Lin, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 442 days.

(21) Appl. No.: 17/908,387

(22) PCT Filed: Mar. 2, 2021

(86) PCT No.: PCT/JP2021/007805
§ 371 (c)(1),
(2) Date: Aug. 31, 2022

(87) PCT Pub. No.: WO2021/177262
PCT Pub. Date: Sep. 10, 2021

(65) Prior Publication Data
US 2023/0093299 A1     Mar. 23, 2023

(30) Foreign Application Priority Data
Mar. 6, 2020     (JP) ................................. 2020-038493

(51) Int. Cl.
*H04W 72/23*        (2023.01)

(52) U.S. Cl.
CPC .................................. *H04W 72/23* (2023.01)

(58) Field of Classification Search
CPC ............. H04W 72/23; H04W 72/0446; H04W 72/232; H04B 7/0695; H04B 7/088;
(Continued)

(56) References Cited

U.S. PATENT DOCUMENTS

2020/0367208 A1 *  11/2020  Khoshnevisan ...... H04W 72/23
2021/0184812 A1 *   6/2021  MolavianJazi ....... H04L 1/0041

OTHER PUBLICATIONS

CATT, Considerations on multi-TRP/panel transmission, 3GPP TSG RAN WG1 #98b R1-1910349, Oct. 20, 2019 (Year: 2019).*
(Continued)

*Primary Examiner* — Charles C Jiang
*Assistant Examiner* — Margaret Marie Anderson
(74) *Attorney, Agent, or Firm* — ScienBiziP, P.C.

(57)        ABSTRACT

Provided is a transmitter configured to transmit a PUCCH by applying a transmission filter based on any one piece of spatial relation information of a spatial relation information set, and transmit a PUSCH in a slot set by applying multiple transmission filters respectively based on multiple pieces of spatial relation information included in a spatial relation information subset of the spatial relation information set. The spatial relation information subset at least includes first spatial relation information and second spatial relation information different from the first spatial relation information. The transmitter applies a transmission filter of the multiple transmission filters based on the first spatial relation information to the PUSCH of a first slot subset of the slot set. The transmitter applies a transmission filter of the multiple transmission filters based on the second spatial relation information to the PUSCH of a second slot subset of the slot set.

3 Claims, 18 Drawing Sheets

(58) Field of Classification Search
CPC ..... H04L 1/1671; H04L 5/001; H04L 5/0048; H04L 5/0053; H04L 5/0023; H04L 5/0028; H04L 5/0044; H04L 5/0082; H04L 5/0092

See application file for complete search history.

(56) References Cited

OTHER PUBLICATIONS

NTT DOCOMO, "New SID proposal: Study on New Radio Access Technology", RP-160671, 3GPP TSG RAN Meeting #71, Göteborg, Sweden, Mar. 7-10, 2016

RAN chairman et al, "Release 17 package for RAN", RP-193216, 3GPP TSG RAN Meeting #86, Sitges, Spain, Dec. 11, 2019.

* cited by examiner

Figure A: Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

REs for PSS

REs for SSS

REs for PBCH

Frequency

Time (OFDM symbol index $l_{sym}$)

FIG. 7

| index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| codebook | $\frac{1}{2}\begin{bmatrix}1 & 0\\0 & 0\end{bmatrix}$ | $\frac{1}{2}\begin{bmatrix}0 & 1\\0 & 0\end{bmatrix}$ | $\frac{1}{2}\begin{bmatrix}0 & 0\\1 & 0\end{bmatrix}$ | $\frac{1}{2}\begin{bmatrix}0 & 0\\0 & 1\end{bmatrix}$ | $\frac{1}{2}\begin{bmatrix}1 & 1\\1 & 0\end{bmatrix}$ | $\frac{1}{2}\begin{bmatrix}1 & 0\\1 & 0\end{bmatrix}$ | $\frac{1}{2}\begin{bmatrix}1 & 0\\1 & 0\end{bmatrix}$ | $\frac{1}{2}\begin{bmatrix}1 & 0\\1 & 0\end{bmatrix}$ | $\frac{1}{2}\begin{bmatrix}0 & 0\\1 & 0\end{bmatrix}$ | $\frac{1}{2}\begin{bmatrix}0 & 1\\1 & 0\end{bmatrix}$ | $\frac{1}{2}\begin{bmatrix}0 & 1\\1 & 0\end{bmatrix}$ | $\frac{1}{2}\begin{bmatrix}0 & 1\\1 & 0\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ |

| index | 16 | 17 | 18 | 19 | 20 | 21 | 22 | 23 | 24 | 25 | 26 | 27 |
|---|---|---|---|---|---|---|---|---|---|---|---|---|
| codebook | $\frac{1}{2}\begin{bmatrix}1 & j\\1 & j\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ | $\frac{1}{2}\begin{bmatrix}1 & 1\\1 & 1\end{bmatrix}$ |

FIG. 12

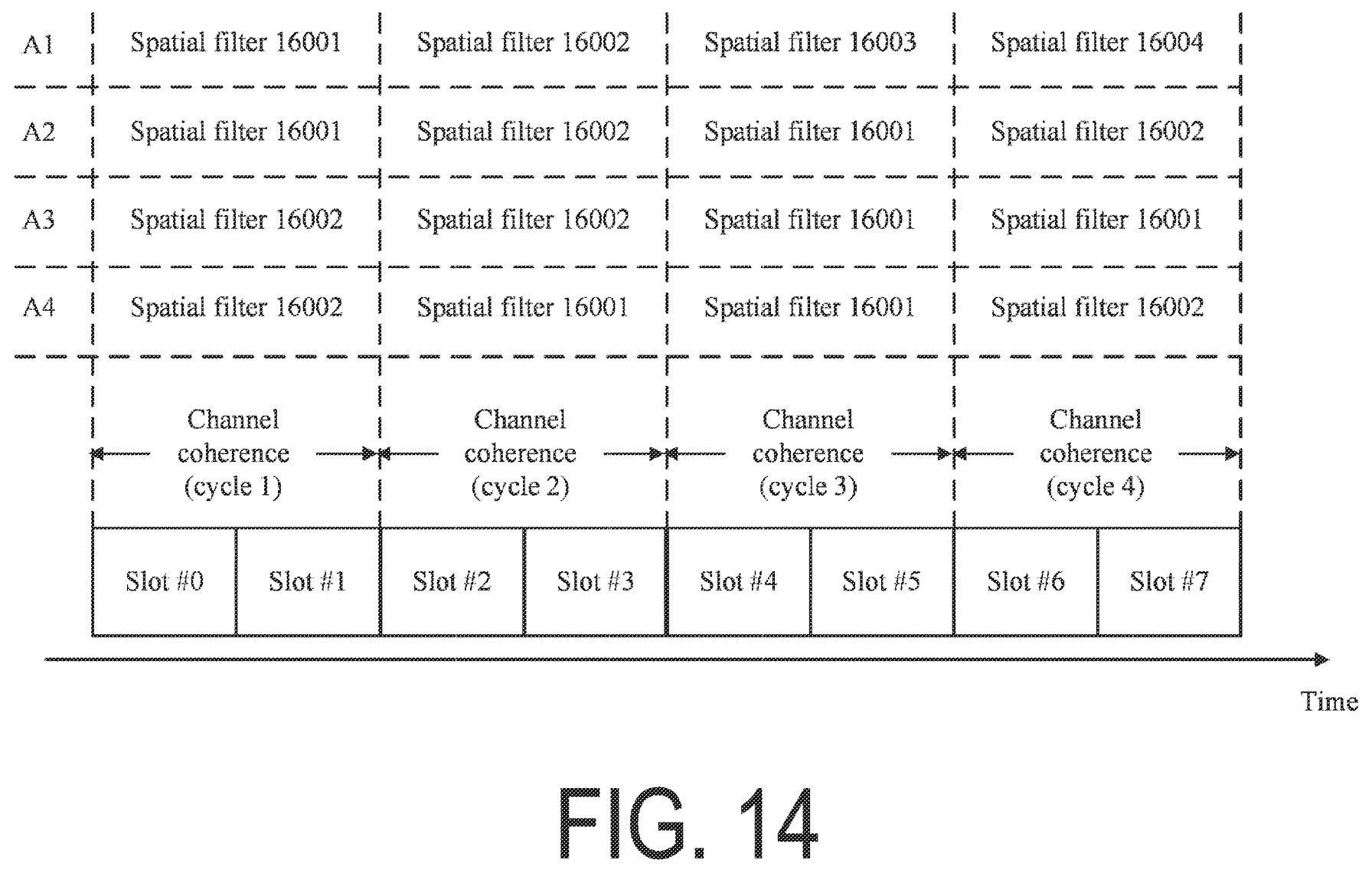

| | Spatial filter 16001 | Spatial filter 16002 | Spatial filter 16003 | Spatial filter 16004 |
|---|---|---|---|---|
| A1 | Spatial filter 16001 | Spatial filter 16002 | Spatial filter 16001 | Spatial filter 16002 |
| A2 | Spatial filter 16002 | Spatial filter 16002 | Spatial filter 16001 | Spatial filter 16001 |
| A3 | Spatial filter 16002 | Spatial filter 16001 | Spatial filter 16001 | Spatial filter 16002 |
| A4 | | | | |

| Channel coherence (cycle 1) | Channel coherence (cycle 2) | Channel coherence (cycle 3) | Channel coherence (cycle 4) |
|---|---|---|---|
| Slot #0 | Slot #1 | Slot #2 | Slot #3 | Slot #4 | Slot #5 | Slot #6 | Slot #7 |

Time

FIG. 14

| index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| codebook | $\frac{1}{2}\begin{bmatrix}1&0\\0&0\end{bmatrix}$ | $\frac{1}{2}\begin{bmatrix}0&j\\0&0\end{bmatrix}$ | $\frac{1}{2}\begin{bmatrix}0&0\\1&0\end{bmatrix}$ | $\frac{1}{2}\begin{bmatrix}0&0\\0&1\end{bmatrix}$ | $\frac{1}{2}\begin{bmatrix}1&1\\0&0\end{bmatrix}$ | $\frac{1}{2}\begin{bmatrix}1&-1\\0&0\end{bmatrix}$ | $\frac{1}{2}\begin{bmatrix}1&j\\0&0\end{bmatrix}$ | $\frac{1}{2}\begin{bmatrix}1&-j\\0&0\end{bmatrix}$ | $\frac{1}{2}\begin{bmatrix}0&0\\1&1\end{bmatrix}$ | $\frac{1}{2}\begin{bmatrix}0&0\\1&-1\end{bmatrix}$ | $\frac{1}{2}\begin{bmatrix}0&0\\1&j\end{bmatrix}$ | $\frac{1}{2}\begin{bmatrix}0&0\\1&-j\end{bmatrix}$ | $\frac{1}{2}\begin{bmatrix}1&1\\1&-1\end{bmatrix}$ | $\frac{1}{2}\begin{bmatrix}1&1\\j&j\end{bmatrix}$ | $\frac{1}{2}\begin{bmatrix}1&1\\-1&1\end{bmatrix}$ | $\frac{1}{2}\begin{bmatrix}1&1\\-j&-j\end{bmatrix}$ |
| allowed | N | N | N | Y | Y | Y | N | Y | N | Y | Y | Y | Y | Y | N | Y |

| index | 16 | 17 | 18 | 19 | 20 | 21 | 22 | 23 | 24 | 25 | 26 | 27 |
|---|---|---|---|---|---|---|---|---|---|---|---|---|
| codebook | $\frac{1}{2}\begin{bmatrix}1&j\\1&j\end{bmatrix}$ | $\frac{1}{2}\begin{bmatrix}1&j\\j&1\end{bmatrix}$ | $\frac{1}{2}\begin{bmatrix}1&j\\-1&-j\end{bmatrix}$ | $\frac{1}{2}\begin{bmatrix}1&j\\-j&-1\end{bmatrix}$ | $\frac{1}{2}\begin{bmatrix}1&1\\1&1\end{bmatrix}$ | $\frac{1}{2}\begin{bmatrix}1&-1\\j&-j\end{bmatrix}$ | $\frac{1}{2}\begin{bmatrix}1&-1\\-1&-1\end{bmatrix}$ | $\frac{1}{2}\begin{bmatrix}1&-j\\-j&j\end{bmatrix}$ | $\frac{1}{2}\begin{bmatrix}1&-j\\1&j\end{bmatrix}$ | $\frac{1}{2}\begin{bmatrix}1&-j\\j&-1\end{bmatrix}$ | $\frac{1}{2}\begin{bmatrix}1&-j\\1&-j\end{bmatrix}$ | $\frac{1}{2}\begin{bmatrix}1&1\\-1&-j\end{bmatrix}$ |
| allowed | Y | N | Y | N | N | Y | Y | Y | Y | Y | Y | N |

FIG. 15

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2020-38493 filed on Mar. 6, 2020, the contents of which are incorporated herein by reference.

BACKGROUND ART

In the $3^{rd}$ Generation Partnership Project (3GPP), a radio access method and a radio network for cellular mobile communications (hereinafter also referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as User Equipment (UE). LTE is a cellular communication system in which multiple areas covered by base station apparatuses are deployed in a cell structure. A single base station apparatus may manage multiple serving cells.

3GPP has been studying a next generation standard (New Radio or NR) (NPL 1) to make a proposal for International Mobile Telecommunication (IMT)-2020, a standard for a next generation mobile communication system developed by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

3GPP has been studying enhancement of services supported in NR (NPL 2).

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10 Mar. 2016.

NPL 2: "Release 17 package for RAN", RP-193216, RAN chairman, RAN1 chairman, RAN2 chairman, RAN3 chairman, 3GPP TSG RAN Meeting #86, Sitges, Spain, 9-12 Dec. 2019

SUMMARY OF INVENTION

Technical Problem

One aspect of the present invention provides a terminal apparatus that efficiently performs communication, a communication method used for the terminal apparatus, a base station apparatus that efficiently performs communication, and a communication method used for the base station apparatus.

Solution to Problem (1) A first aspect of the present invention is a terminal apparatus including: a receiver configured to receive a command of a MAC layer for activating a spatial relation information set; and a transmitter configured to transmit a PUCCH by applying a transmission filter based on any one piece of spatial relation information of the spatial relation information set, and transmit a PUSCH in a slot set by applying multiple transmission filters respectively based on multiple pieces of spatial relation information included in a spatial relation information subset of the spatial relation information set, wherein the spatial relation information subset at least includes first spatial relation information and second spatial relation information different from the first spatial relation information, the transmitter applies a transmission filter of the multiple transmission filters based on the first spatial relation information to the PUSCH of a first slot subset of the slot set, and applies a transmission filter of the multiple transmission filters based on the second spatial relation information to the PUSCH of a second slot subset of the slot set.

(2) A second aspect of the present invention is a terminal apparatus including: a receiver configured to receive a DCI format including at least one SRS resource indication field; and a transmitter configured to transmit a PUSCH scheduled by the DCI format in a slot set, wherein one SRS resource set is configured for the terminal apparatus by an RRC parameter, a first SRS resource subset of the one SRS resource set and a second SRS resource subset of the one SRS resource set are determined, the first SRS resource subset or the second SRS resource subset is indicated based on a value of the one SRS resource indication field, the first SRS resource subset at least includes a first SRS resource and a second SRS resource, the second SRS resource subset at least includes a third SRS resource and a fourth SRS resource, in a case that the indicated SRS resource subset is the first SRS resource subset, the transmitter applies a transmission filter applied to the first SRS resource to the PUSCH of a first slot subset of the slot set, and applies a transmission filter applied to the second SRS resource to the PUSCH of a second slot subset of the slot set, and in a case that the indicated SRS resource subset is the second SRS resource subset, the transmitter applies a transmission filter applied to the third SRS resource to the PUSCH of a third slot subset of the slot set, and applies a transmission filter applied to the fourth SRS resource to the PUSCH of a fourth slot subset of the slot set.

(3) A third aspect of the present invention is a terminal apparatus including: a receiver configured to receive a first MAC layer command for activating a first spatial relation information set, and receive a second MAC layer command for activating a second spatial relation information set; and a transmitter configured to transmit a PUCCH by applying a transmission filter based on one piece of spatial relation information of the first spatial relation information set, and transmit a PUSCH in a slot set by applying multiple transmission filters respectively based on multiple pieces of spatial relation information included in a first spatial relation information subset of the second spatial relation information set, wherein the first spatial relation information subset at least includes first spatial relation information and second spatial relation information, the transmitter applies a transmission filter of the multiple transmission filters based on the first spatial relation information to the PUSCH of a first slot subset of the slot set, and applies a transmission filter of the multiple transmission filters based on the second spatial relation information to the PUSCH of a second slot subset of the slot set.

(4) A fourth aspect of the present invention is a base station apparatus including: a receiver configured to transmit a command of a MAC layer for activating a spatial relation information set; and the receiver configured to receive a PUCCH to which a transmission filter based on any one piece of spatial relation information of the spatial relation information set is applied, and receive, in a slot set, a PUSCH to which multiple transmission filters respectively based on multiple pieces of spatial relation information included in a spatial relation information subset of the spatial relation information set is applied, wherein the spatial relation information subset at least includes first spatial relation information and second spatial relation information different from the first spatial relation information, a transmission filter of the multiple transmission filters based on the first spatial relation information is applied to the PUSCH of a first slot subset of the slot set, and a transmission filter of the multiple transmission filters based on the second spatial relation information is applied to the PUSCH of a second slot subset of the slot set.

(5) A fifth aspect of the present invention is a base station apparatus including: a transmitter configured to receive a DCI format including at least one SRS resource indication field; and a receiver configured to receive a PUSCH scheduled by the DCI format in a slot set, wherein one SRS resource set is configured for a terminal apparatus by an RRC parameter, a first SRS resource subset of the one SRS resource set and a second SRS resource subset of the one SRS resource set are determined, the first SRS resource subset or the second SRS resource subset is indicated based on a value of the one SRS resource indication field, the first SRS resource subset at least includes a first SRS resource and a second SRS resource, the second SRS resource subset at least includes a third SRS resource and a fourth SRS resource, in a case that the indicated SRS resource subset is the first SRS resource subset, a transmission filter applied to the first SRS resource is applied to the PUSCH of a first slot subset of the slot set, and a transmission filter applied to the second SRS resource is applied to the PUSCH of a second slot subset of the slot set, and in a case that the indicated SRS resource subset is the second SRS resource subset, a transmission filter applied to the third SRS resource is applied to the PUSCH of a third slot subset of the slot set, and a transmission filter applied to the fourth SRS resource is applied to the PUSCH of a fourth slot subset of the slot set.

(6) A sixth aspect of the present invention is a base station apparatus including: a transmitter configured to transmit a first MAC layer command for activating a first spatial relation information set, and transmit a second MAC layer command for activating a second spatial relation information set; and a receiver configured to receive a PUCCH to which a transmission filter based on one piece of spatial relation information of the first spatial relation information set is applied, and receive, in a slot set, a PUSCH to which multiple transmission filters respectively based on multiple pieces of spatial relation information included in a first spatial relation information subset of the second spatial relation information set is applied, wherein the first spatial relation information subset at least includes first spatial relation information and second spatial relation information, a transmission filter of the multiple transmission filters based on the first spatial relation information is applied to the PUSCH of a first slot subset of the slot set, and a transmission filter of the multiple transmission filters based on the second spatial relation information is applied to the PUSCH of a second slot subset of the slot set.

(7) A seventh aspect of the present invention is a communication method used for a terminal apparatus, the communication method including the steps of: receiving a command of a MAC layer for activating a spatial relation information set; and transmitting a PUCCH by applying a transmission filter based on any one piece of spatial relation information of the spatial relation information set, and transmitting a PUSCH in a slot set by applying multiple transmission filters respectively based on multiple pieces of spatial relation information included in a spatial relation information subset of the spatial relation information set, wherein the spatial relation information subset at least includes first spatial relation information and second spatial relation information different from the first spatial relation information, a transmission filter of the multiple transmission filters based on the first spatial relation information is applied to the PUSCH of a first slot subset of the slot set, and a transmission filter of the multiple transmission filters based on the second spatial relation information is applied to the PUSCH of a second slot subset of the slot set.

(8) An eighth aspect of the present invention is a communication method used for a terminal apparatus, the communication method including the steps of: receiving a DCI format including at least one SRS resource indication field; and transmitting a PUSCH scheduled by the DCI format in a slot set, wherein one SRS resource set is configured for the terminal apparatus by an RRC parameter, a first SRS resource subset of the one SRS resource set and a second SRS resource subset of the one SRS resource set are determined, the first SRS resource subset or the second SRS resource subset is indicated based on a value of the one SRS resource indication field, the first SRS resource subset at least includes a first SRS resource and a second SRS resource, the second SRS resource subset at least includes a third SRS resource and a fourth SRS resource, in a case that the indicated SRS resource subset is the first SRS resource subset, a transmission filter applied to the first SRS resource is applied to the PUSCH of a first slot subset of the slot set, and a transmission filter applied to the second SRS resource is applied to the PUSCH of a second slot subset of the slot set, and in a case that the indicated SRS resource subset is the second SRS resource subset, a transmission filter applied to the third SRS resource is applied to the PUSCH of a third slot subset of the slot set, and a transmission filter applied to the fourth SRS resource is applied to the PUSCH of a fourth slot subset of the slot set.

(9) A ninth aspect of the present invention is a communication method used for a terminal apparatus, the communication method including the steps of: receiving a first MAC layer command for activating a first spatial relation information set, and receiving a second MAC layer command for activating a second spatial relation information set; and transmitting a PUCCH by applying a transmission filter based on one piece of spatial relation information of the first spatial relation information set, and transmitting a PUSCH in a slot set by applying multiple transmission filters respectively based on multiple pieces of spatial relation information included in a first spatial relation information subset of the second spatial relation information set, wherein the first spatial relation information subset at least includes first spatial relation information and second spatial relation information, a transmission filter of the multiple transmission filters based on the first spatial relation information is applied to the PUSCH of a first slot subset of the slot set, and a transmission filter of the multiple transmission filters based on the second spatial relation information is applied to the PUSCH of a second slot subset of the slot set.

(10) A tenth aspect of the present invention is a communication method used for a base station apparatus, the communication method including the steps of: transmitting a command of a MAC layer for activating a spatial relation information set; and receiving a PUCCH to which a transmission filter based on any one piece of spatial relation information of the spatial relation information set is applied, and receiving, in a slot set, a PUSCH to which multiple transmission filters respectively based on multiple pieces of spatial relation information included in a spatial relation information subset of the spatial relation information set is applied, wherein the spatial relation information subset at least includes first spatial relation information and second spatial relation information different from the first spatial relation information, a transmission filter of the multiple transmission filters based on the first spatial relation information is applied to the PUSCH of a first slot subset of the slot set, and a transmission filter of the multiple transmission filters based on the second spatial relation information is applied to the PUSCH of a second slot subset of the slot set.

(11) An eleventh aspect of the present invention is a communication method used for a base station apparatus, the communication method including the steps of: receiving a DCI format including at least one SRS resource indication field; and receiving a PUSCH scheduled by the DCI format in a slot set, wherein one SRS resource set is configured for a terminal apparatus by an RRC parameter, a first SRS resource subset of the one SRS resource set and a second SRS resource subset of the one SRS resource set are determined, the first SRS resource subset or the second SRS resource subset is indicated based on a value of the one SRS resource indication field, the first SRS resource subset at least includes a first SRS resource and a second SRS resource, the second SRS resource subset at least includes a third SRS resource and a fourth SRS resource, in a case that the indicated SRS resource subset is the first SRS resource subset, a transmission filter applied to the first SRS resource is applied to the PUSCH of a first slot subset of the slot set, and a transmission filter applied to the second SRS resource is applied to the PUSCH of a second slot subset of the slot set, and in a case that the indicated SRS resource subset is the second SRS resource subset, a transmission filter applied to the third SRS resource is applied to the PUSCH of a third slot subset of the slot set, and a transmission filter applied to the fourth SRS resource is applied to the PUSCH of a fourth slot subset of the slot set.

(12) A twelfth aspect of the present invention is a communication method used for a base station apparatus, the communication method including the steps of: transmitting a first MAC layer command for activating a first spatial relation information set, and transmitting a second MAC layer command for activating a second spatial relation information set; and receiving a PUCCH to which a transmission filter based on one piece of spatial relation information of the first spatial relation information set is applied, and receiving, in a slot set, a PUSCH to which multiple transmission filters respectively based on multiple pieces of spatial relation information included in a first spatial relation information subset of the second spatial relation information set is applied, wherein the first spatial relation information subset at least includes first spatial relation information and second spatial relation information, a transmission filter of the multiple transmission filters based on the first spatial relation information is applied to the PUSCH of a first slot subset of the slot set, and a transmission filter of the multiple transmission filters based on the second spatial relation information is applied to the PUSCH of a second slot subset of the slot set.

(13) A thirteenth aspect of the present invention is a terminal apparatus including: a receiver configured to receive a control signal indicating information for identifying a first precoder subset of a first precoder set, and receive a DCI format including a field indicating a first precoder out of precoders included in the first precoder subset; and a transmitter configured to transmit a PUSCH scheduled by the DCI format, wherein the first precoder subset at least includes a second precoder, the second precoder is determined based on the first precoder, and the transmitter applies the first precoder to the PUSCH of a first slot subset of the slot set, and applies the second precoder to the PUSCH of a second slot subset of the slot set.

(14) A fourteenth aspect of the present invention is a base station apparatus including: a transmitter configured to transmit a control signal indicating information for identifying a first precoder subset of a first precoder set, and transmit a DCI format including a field indicating a first precoder out of precoders included in the first precoder subset; and a receiver configured to receive a PUSCH scheduled by the DCI format in a slot set, wherein the first precoder subset at least includes a second precoder, the second precoder is determined based on the first precoder, and the first precoder is applied to the PUSCH of a first slot subset of the slot set, and the second precoder is applied to the PUSCH of a second slot subset of the slot set.

(15) A fifteenth aspect of the present invention is a communication method used for a terminal apparatus, the communication method including the steps of: receiving a control signal indicating information for identifying a first precoder subset of a first precoder set, and receiving a DCI format including a field indicating a first precoder out of precoders included in the first precoder subset; and transmitting a PUSCH scheduled by the DCI format, wherein the first precoder subset at least includes a second precoder, the second precoder is determined based on the first precoder, and the first precoder is applied to the PUSCH of a first slot subset of the slot set, and the second precoder is applied to the PUSCH of a second slot subset of the slot set.

(16) A sixteenth aspect of the present invention is a communication method used for a base station apparatus, the communication method including the steps of: transmitting a control signal indicating information for identifying a first precoder subset of a first precoder set, and transmitting a DCI format including a field indicating a first precoder out of precoders included in the first precoder subset; and receiving a PUSCH scheduled by the DCI format in a slot set, wherein the first precoder subset at least includes a second precoder, the second precoder is determined based on the first precoder, and the first precoder is applied to the PUSCH of a first slot subset of the slot set, and the second precoder is applied to the PUSCH of a second slot subset of the slot set.

Advantageous Effects of Invention

According to an aspect of the present invention, the terminal apparatus can efficiently perform communication. The base station apparatus can efficiently perform communication.

BRIEF DESCRIPTION OF DRAWINGS

FIG. 2 is an example illustrating a relationship between a subcarrier spacing configuration $\mu$, the number $N^{slot}_{symb}$ of OFDM symbols per slot, and a cyclic Prefix (CP) configuration according to an aspect of the present embodiment.

FIG. 7 is a diagram illustrating a configuration example of an SS/PBCH block according to an aspect of the present embodiment.

FIG. 12 is a diagram illustrating candidates of a matrix W for transmission of PUSCH of one layer in a case that four antenna ports are used according to an aspect of the present embodiment.

FIG. 14 is a diagram illustrating an example of patterns in which multiple spatial filters included in a spatial filter set 1600 are applied according to an aspect of the present embodiment.

FIG. 15 is a diagram illustrating an example of a determination method of a codebook set 1700 according to an aspect of the present embodiment.

DESCRIPTION OF EMBODIMENTS

Embodiments of the present invention will be described below.

floor(C) may be a floor function for a real number C. For example, floor(C) may be a function that outputs a maximum integer in a range of not exceeding the real number C. ceil(D) may be a roof function for a real number D. For example, ceil(D) may be a function that outputs a minimum integer in a range of not falling below the real number D. mod(E, F) may be a function that outputs a remainder obtained by dividing E by F. mod(E, F) may be a function that outputs a value corresponding to the remainder obtained by dividing E by F. exp(G)=e^G. Here, e is a Napier's constant. H^I represents H to the power of I. max(J, K) is a function that outputs a maximum value out of J and K. Here, in a case that J and K are equal, max(J, K) is a function that outputs J or K. min(L, M) is a function that outputs a maximum value out of L and M. Here, in a case that L and M are equal, min(L, M) is a function that outputs L or M. round(N) is a function that outputs an integer value of a value closest to N.

In the radio communication system according to an aspect of the present embodiment, Orthogonal Frequency Division Multiplex (OFDM) is at least used. An OFDM symbol is a unit of OFDM in the time domain. The OFDM symbol at least includes one or multiple subcarriers. The OFDM symbol is converted into a time-continuous signal in baseband signal generation. In the downlink, Cyclic Prefix-Orthogonal Frequency Division Multiplex (CP-OFDM) is at least used. In the uplink, one of CP-OFDM or Discrete Fourier Transform-spread-Orthogonal Frequency Division Multiplex (DFT-s-OFDM) is used. With Transform precoding being applied to CP-OFDM, DFT-s-OFDM may be given.

The OFDM symbol may be a term including a CP added to the OFDM symbol. In other words, a certain OFDM symbol may include the certain OFDM symbol, and a CP added to the certain OFDM symbol.

Figure 1:
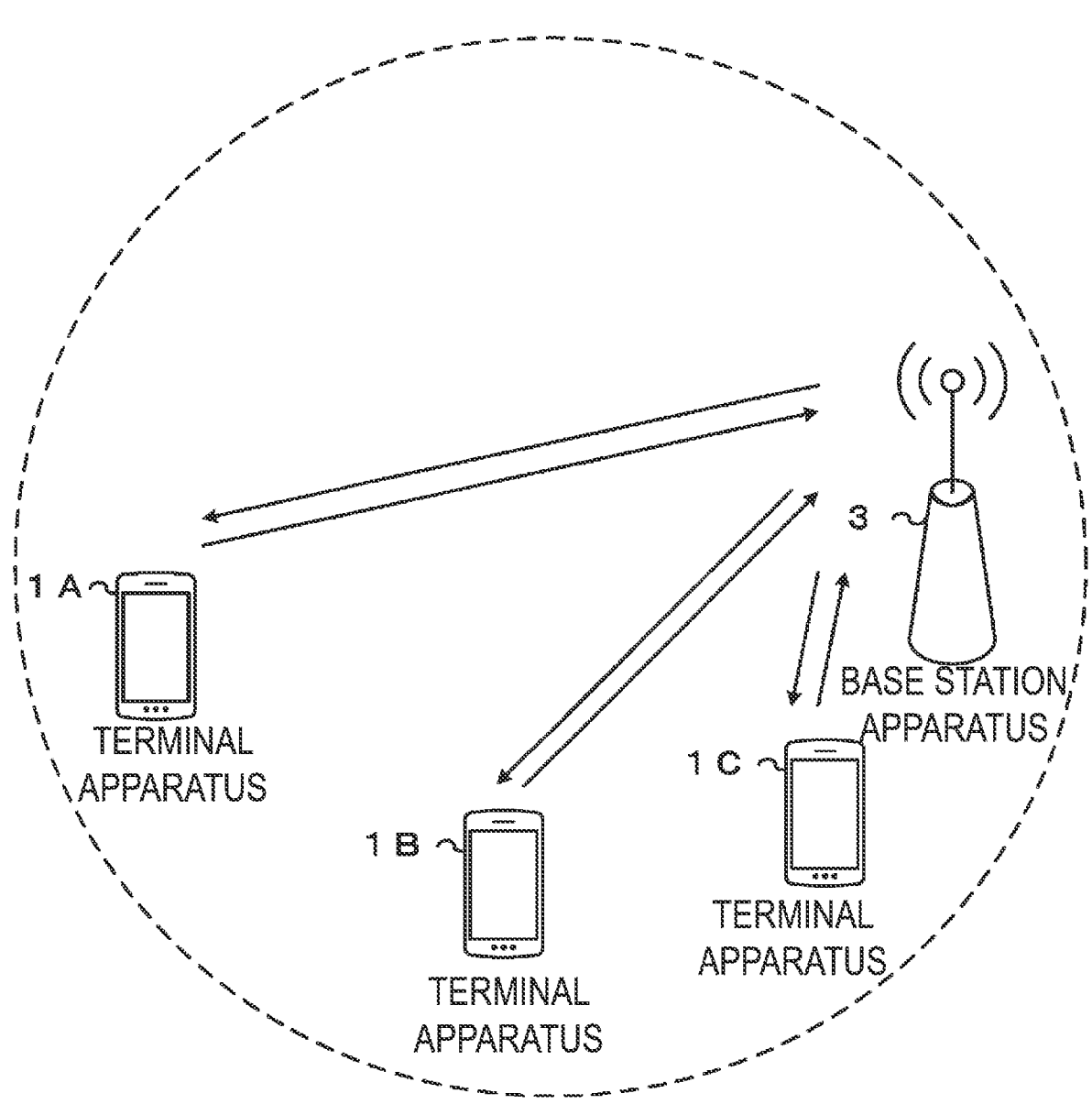
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system at least includes terminal apparatuses 1A to 1C and a base station apparatus 3 (base station #3 (BS #3)). The terminal apparatuses 1A to 1C are hereinafter also referred to as "terminal apparatus 1" (User Equipment #1 (UE #1)).

The base station apparatus 3 may include one or multiple transmission apparatuses (or transmission points, transmission and/or reception apparatuses, transmission and/or reception points). In a case that the base station apparatus 3 includes multiple transmission apparatuses, each of the multiple transmission apparatuses may be deployed at different positions.

The base station apparatus 3 may provide one or multiple serving cells. The serving cell may be defined as a set of resources used for radio communication. The serving cell is also referred to as a cell.

The serving cell may at least include one downlink component carrier (downlink carrier), and/or one uplink component carrier (uplink carrier). The serving cell may at least include two or more downlink component carriers, and/or two or more uplink component carriers. The downlink component carrier and the uplink component carrier are also referred to as "component carrier (carrier)".

For example, for one component carrier, one resource grid may be given. For one component carrier and a certain subcarrier spacing configuration $\mu$, one resource grid may be given. Here, the subcarrier spacing configuration $\mu$ is also referred to as numerology. The resource grid includes $N^{size,\mu}_{grid,x}N^{RB}_{sc}$ subcarriers. The resource grid starts from a common resource block $N^{start,\mu}_{grid,x}$. The common resource block $N^{start,\mu}_{grid,x}$. X is also referred to as a reference point of the resource grid. The resource grid includes $N^{subframe,\mu}_{symb}$ OFDM symbols. x is a subscript indicating a transmission direction, and indicates one of a downlink or an uplink. For a set of a certain antenna port p, a certain subcarrier spacing configuration $\mu$, and a certain transmission direction x, one resource grid is given.

$N^{size,\mu}_{grid,x}$ and $N^{start,\mu}_{grid,x}$ are given based at least on a higher layer parameter (CarrierBandwidth). The higher layer parameter is also referred to as an SCS specific carrier. One resource grid corresponds to one SCS specific carrier. One component carrier may include one or multiple SCS specific carriers. The SCS specific carrier may be included in system information. For each of the SCS specific carriers, one subcarrier spacing configuration $\mu$ may be given.

The SubCarrier Spacing (SCS) $\Delta f$ may be $\Delta f = 2\mu \cdot 15$ kHz. For example, the subcarrier spacing configuration $\mu$ may indicate one of 0, 1, 2, 3, or 4.

FIG. 2 is an example illustrating a relationship between a subcarrier spacing configuration $\mu$, the number $N^{slot}_{symb}$ of OFDM symbols per slot, and a cyclic Prefix (CP) configuration according to an aspect of the present embodiment. In FIG. 2A, for example, in a case that the subcarrier spacing configuration $\mu$ is two and the CP configuration is a normal cyclic prefix (normal CP), $N^{slot}_{symb}=14$, $N^{frame,\mu}_{slot}=40$, and $N^{subframe,\mu}_{slot}=4$. In FIG. 2B, for example, in a case that the subcarrier spacing configuration $\mu$ is two and the CP configuration is an extended cyclic prefix (extended CP), $N^{slot}_{symb}=12$, $N^{frame,\mu}_{slot}=40$, and $N^{subframe,\mu}_{slot}=4$.

In the radio communication system according to an aspect of the present embodiment, time unit $T_c$ may be used for expression of the length of the time domain. The time unit $T_c$ is $T_c=1/(\Delta f_{max} \cdot N_f)$. $\Delta f_{max}=480$ kHz. $N_f=4096$. A constant $\kappa$ is $\kappa=\Delta f_{max} \cdot N_f/(\Delta f_{ref} N_{f,ref})=64$. $\Delta f_{ref}$ is 15 kHz. $N_{f,ref}$ is 2048.

Transmission of a signal in the downlink and/or transmission of a signal in the uplink may be organized into a radio frame (system frame, frame) having the length $T_f$. $T_f=(\Delta f_{max} N_f/100) \cdot T_s=10$ ms. "·" represents multiplication. The radio frame includes 10 subframes. The length $T_{sf}$ of the subframe is $(\Delta f_{max} N_f/1000) \cdot T_s=1$ ms. The number of OFDM symbols per subframe is $N^{subframe,\mu}_{symb}=N^{slot}_{symb} N^{subframe,\mu}_{slot}$.

For a certain subcarrier spacing configuration $\mu$, the number and indexes of slots included in a subframe may be provided. For example, slot indexes $n^{\mu}_s$ may be given in ascending order with integer values in the range from 0 to $N^{subframe,\mu}_{slot}-1$ in the subframe. For the subcarrier spacing configuration $\mu$, the number and indexes of slots included in the radio frame may be given. Slot indexes $n^{\mu}_{s,f}$ may be given in ascending order with integer values in the range from 0 to $N^{frame,\mu}_{slot}-1$ in the radio frame. $N^{slot}_{symb}$ continuous OFDM symbols may be included in one slot. $N^{slot}_{symb}=14$.

Figure 3:
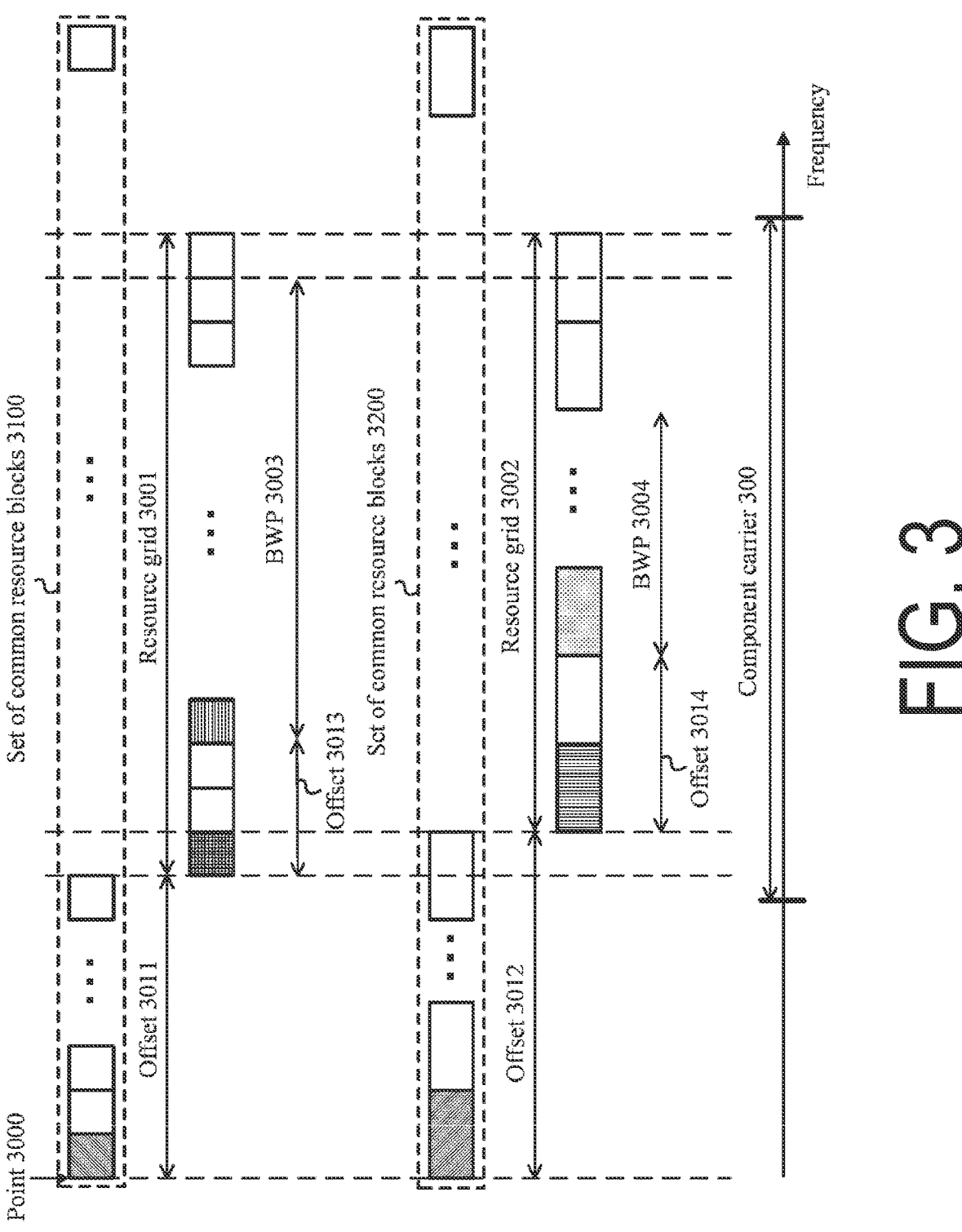
FIG. 3 is a diagram illustrating an example of a configuration method of the resource grid according to an aspect of the present embodiment.

FIG. 3 is a diagram illustrating an example of a configuration method of the resource grid according to an aspect of the present embodiment. The horizontal axis of FIG. 3 represents a frequency domain. FIG. 3 illustrates a configuration example of a resource grid of a subcarrier spacing $\mu_1$ in a component carrier 300, and a configuration example of a resource grid of subcarrier spacing $\mu_2$ in the certain component carrier. As described above, for a certain component carrier, one or multiple subcarrier spacings may be configured. In FIG. 3, it is assumed that $\mu_1=\mu_2-1$. However, various aspects of the present embodiment are not limited to the condition of $\mu_1=\mu_2-1$.

The component carrier 300 is a band having a prescribed width in the frequency domain.

A Point 3000 is an identifier for identifying a certain subcarrier. The point 3000 is also referred to as a point A. A set 3100 of Common resource blocks (CRBs) is a set of common resource blocks for the subcarrier spacing configuration $\mu_1$.

Of the common resource block set 3100, a common resource block (block hatched with lines rising diagonally up and to the right in FIG. 3) including the point 3000 is also referred to as a reference point of the common resource block set 3100. The reference point of the common resource block 3100 may be a common resource block having an index of 0 in the common resource block set 3100.

An offset 3011 is an offset from the reference point of the common resource block set 3100 to a reference point of a resource grid 3001. The offset 3011 is represented by the number of common resource blocks for the subcarrier spacing configuration $\mu_1$. The resource grid 3001 includes $N^{size,\mu}_{grid1,x}$ common resource blocks starting from the reference point of the resource grid 3001.

An offset 3013 is an offset from the reference point of the resource grid 3001 to a reference point ($N^{start,\mu}_{BWP,i1}$) of a Bandwidth Part (BWP) 3003 having an index of i1.

A common resource block set 3200 is a set of common resource blocks for the subcarrier spacing configuration $\mu_2$.

Of the common resource block set 3200, a common resource block (block hatched with lines rising diagonally up and to the left in FIG. 3) including the point 3000 is also referred to as a reference point of the common resource block set 3200. The reference point of the common resource block set 3200 may be a common resource block having an index of 0 in the common resource block set 3200.

An offset 3012 is an offset from the reference point of the common resource block set 3200 to a reference point of a resource grid 3002. The offset 3012 is represented by the number of common resource blocks for the subcarrier spacing configuration $\mu_2$. The resource grid 3002 includes $N^{size,\mu}_{grid2,x}$ common resource blocks starting from the reference point of the resource grid 3002.

An offset 3014 is an offset from the reference point of the resource grid 3002 to a reference point ($N^{start,\mu}_{BWP,i2}$) of a BWP 3004 having an index of i2.

Figure 4:
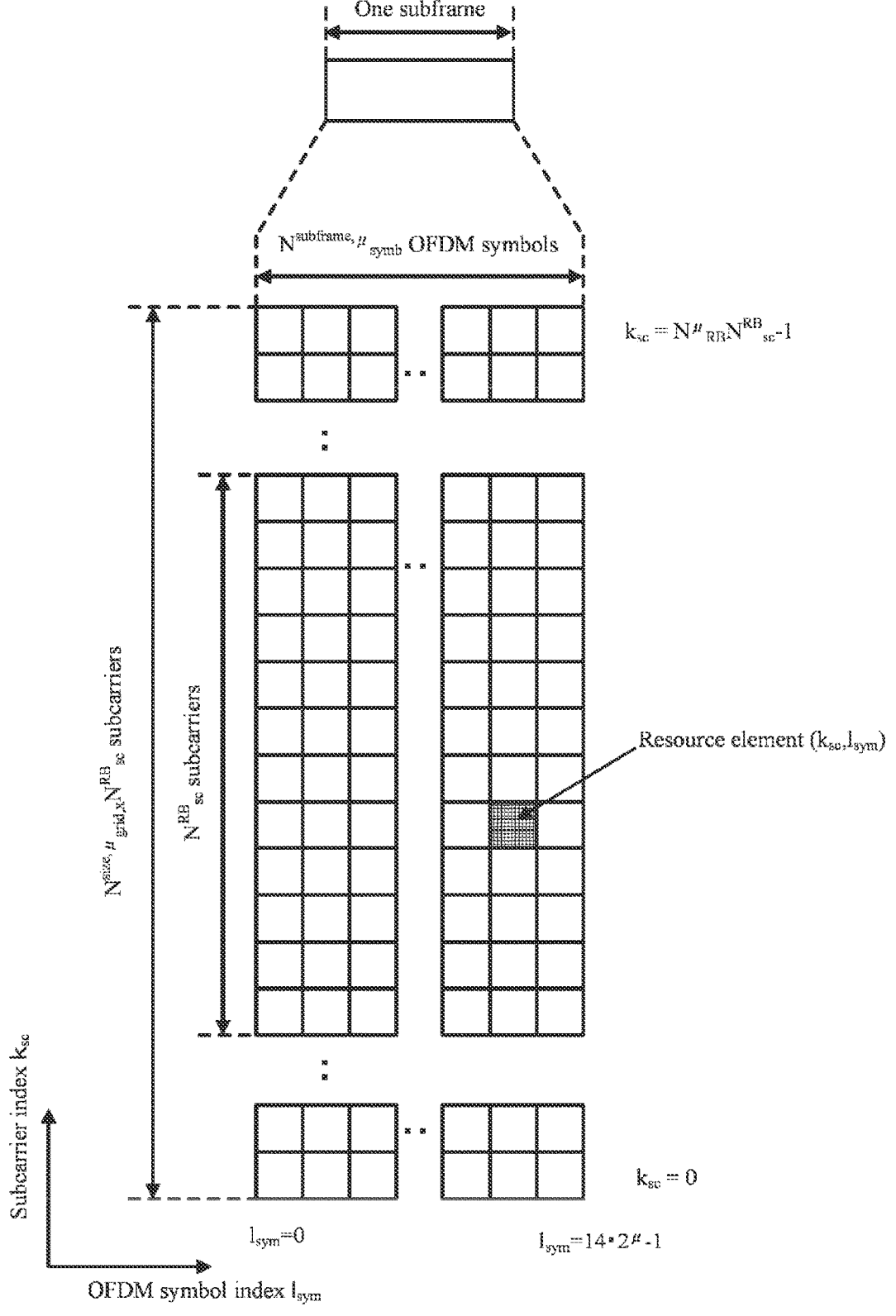
FIG. 4 is a diagram illustrating a configuration example of a resource grid 3001 according to an aspect of the present embodiment.

FIG. 4 is a diagram illustrating a configuration example of the resource grid 3001 according to an aspect of the present embodiment. In the resource grid of FIG. 4, the horizontal axis corresponds to an OFDM symbol index $1_{sym}$, and the vertical axis corresponds to a subcarrier index $k_{sc}$. The resource grid 3001 includes $N^{size,\mu}_{grid1,x} N^{RB}_{sc}$ subcarriers, and $N^{subframe,\mu}_{symb}$ OFDM symbols. In the resource grid, a resource identified with the subcarrier index $k_{sc}$ and the OFDM symbol index $1_{sym}$ is also referred to as a Resource Element (RE).

The Resource Block (RB) includes $N^{RB}_{sc}$ continuous subcarriers. The resource block is a general term for a common resource block, a Physical Resource Block (PRB), and a Virtual Resource Block (VRB). Here, $N^{RB}_{sc}=12$.

A resource block unit is a set of resources corresponding to one OFDM symbol in one resource block. In other words, one resource block unit includes 12 resource elements corresponding to one OFDM symbol in one resource block.

The common resource blocks for a certain subcarrier spacing configuration $\mu$ are assigned with indexes (indexing) in ascending order from 0 in the frequency domain in a certain common resource block set. The common resource block having an index of 0 for a certain subcarrier spacing configuration $\mu$ includes (or collides with, matches) the point 3000. An index $n^{\mu}_{CRB}$ of the common resource block for a certain subcarrier spacing configuration $\mu$ satisfies a relationship of $n^{\mu}_{CRB}=\text{ceil}(k_{sc}/N^{RB}_{sc})$. Here, a subcarrier with $k_{sc}=0$ is a subcarrier having the same center frequency as the center frequency of a subcarrier corresponding to the point 3000.

The physical resource blocks for a certain subcarrier spacing configuration $\mu$ are assigned with indexes in ascending order from 0 in the frequency domain in a certain BWP. An index $n^{\mu}_{PRB}$ of the physical resource block for a certain subcarrier spacing configuration $\mu$ satisfies a relationship of $n^{\mu}_{CRB}=n^{\mu}_{PRB}+N^{start,\mu}_{BWP,i}$. Here, $N^{start,\mu}_{BWP,i}$ indicates a reference point of the BWP having an index of i.

The BWP is defined as a subset of common resource blocks included in the resource grid. The BWP includes $N^{size,\mu}{}_{BWP,i}$ common resource blocks starting from the reference point $N^{start,\mu}{}_{BWP,i}$ of the BWP. A BWP configured for a downlink carrier is also referred to as a downlink BWP. The BWP configured for the uplink component carrier is also referred to as an uplink BWP.

An antenna port may be defined by that a channel on which a symbol in a certain antenna port is conveyed can be inferred from a channel on which another symbol in the certain antenna port is conveyed (An antenna port is defined such that the channel over which a symbol on the antenna port is conveyed can be inferred from the channel over which another symbol on the same antenna port is conveyed). For example, the channel may correspond to a physical channel. The symbol may correspond to an OFDM symbol. The symbol may correspond to a resource block unit. The symbol may correspond to a resource element.

The fact that large scale property of a channel on which a symbol is conveyed in one antenna port can be inferred from a channel on which a symbol is conveyed in another antenna port is described that the two antenna ports are quasi co-located (QCL). The large scale property may at least include long term performance of a channel. The large scale property may at least include a part or all of delay spread, Doppler spread, Doppler shift, an average gain, an average delay, and a beam parameter (spatial Rx parameters). The fact that the first antenna port and the second antenna port are QCL with respect to a beam parameter may mean that a receive beam assumed by a receiver for the first antenna port and a receive beam assumed by the receiver for the second antenna port are the same. The fact that the first antenna port and the second antenna port are QCL with respect to a beam parameter may mean that a transmit beam assumed by a receiver for the first antenna port and a transmit beam assumed by the receiver for the second antenna port are the same. In a case that the large scale property of a channel through which a symbol is transmitted in one antenna port can be estimated from a channel through which a symbol is transmitted in another antenna port, the terminal apparatus 1 may assume that the two antenna ports are QCL. The fact that two antenna ports are QCL may mean that it is assumed that the two antenna ports are QCL.

Carrier aggregation may mean that communication is performed by using multiple serving cells being aggregated. Carrier aggregation may mean that communication is performed by using multiple component carriers being aggregated. Carrier aggregation may mean that communication is performed by using multiple downlink component carriers being aggregated. Carrier aggregation may mean that communication is performed by using multiple uplink component carriers being aggregated.

Figure 5:
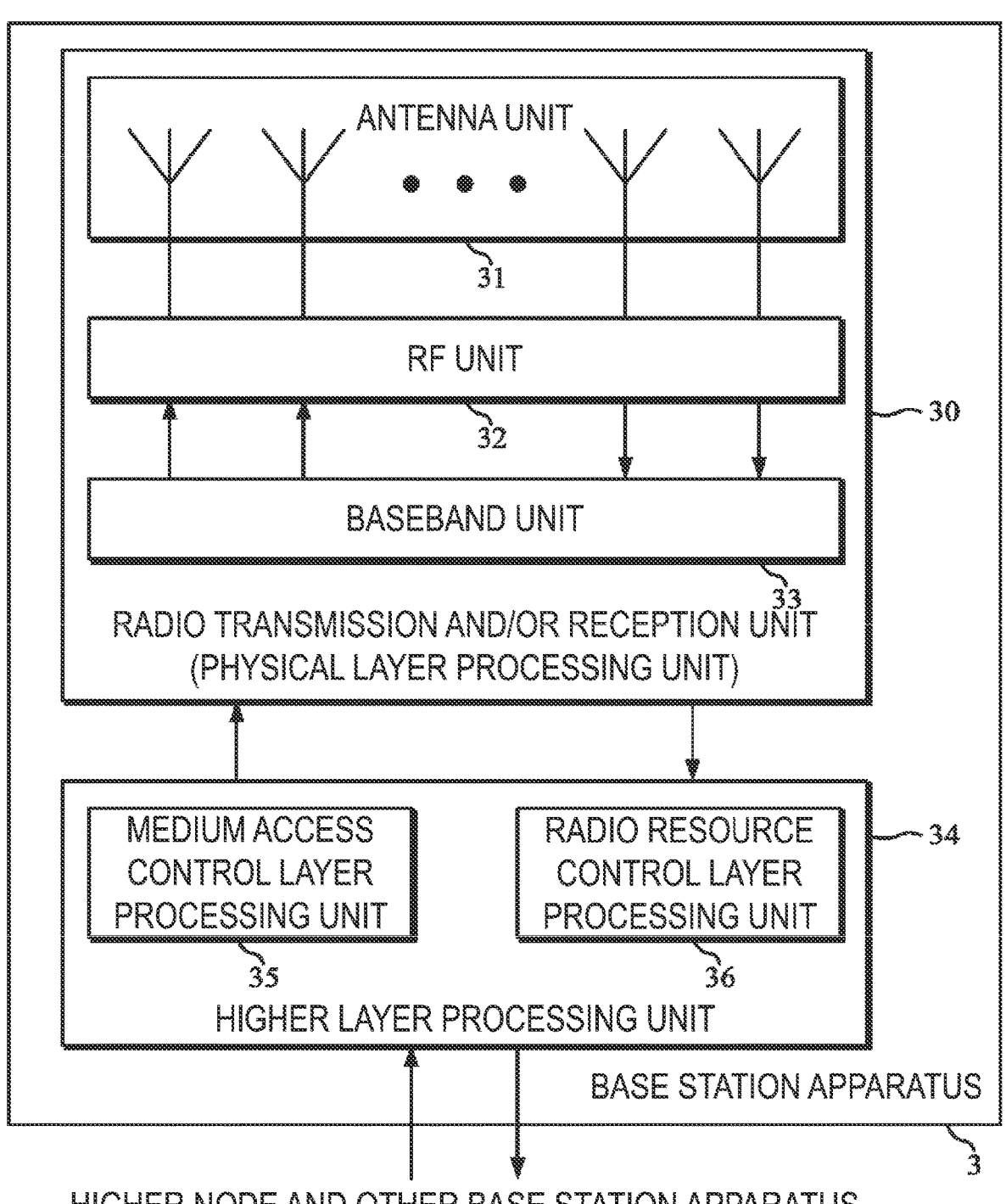
FIG. 5 is a schematic block diagram illustrating a configuration example of a base station apparatus 3 according to an aspect of the present embodiment.

FIG. 5 is a schematic block diagram illustrating a configuration example of the base station apparatus 3 according to an aspect of the present embodiment. As illustrated in FIG. 5, the base station apparatus 3 at least includes a part or all of a radio transmission and/or reception unit (physical layer processing unit) 30 and/or a higher layer processing unit 34. The radio transmission and/or reception unit 30 at least includes a part or all of an antenna unit 31, a Radio Frequency (RF) unit 32, and a baseband unit 33. The higher layer processing unit 34 at least includes a part or all of a medium access control layer processing unit 35 and a Radio Resource Control (RRC) layer processing unit 36.

The radio transmission and/or reception unit 30 at least includes a part or all of a radio transmitting unit 30a and a radio receiving unit 30b. Here, apparatus configurations of the baseband unit included in the radio transmitting unit 30a and the baseband unit included in the radio receiving unit 30b may be the same or different from each other. Apparatus configurations of the RF unit included in the radio transmitting unit 30a and the RF unit included in the radio receiving unit 30b may be the same or different from each other. Apparatus configurations of the antenna unit included in the radio transmitting unit 30a and the antenna unit included in the radio receiving unit 30b may be the same or different from each other.

For example, the radio transmitting unit 30a may generate and transmit a baseband signal of a PDSCH. For example, the radio transmitting unit 30a may generate and transmit a baseband signal of a PDCCH. For example, the radio transmitting unit 30a may generate and transmit a baseband signal of a PBCH. For example, the radio transmitting unit 30a may generate and transmit a baseband signal of a synchronization signal. For example, the radio transmitting unit 30a may generate and transmit a baseband signal of a PDSCH DMRS. For example, the radio transmitting unit 30a may generate and transmit a baseband signal of a PDCCH DMRS. For example, the radio transmitting unit 30a may generate and transmit a baseband signal of a CSI-RS. For example, the radio transmitting unit 30a may generate and transmit a baseband signal of a DL PTRS.

For example, the radio receiving unit 30b may receive a PRACH. For example, the radio receiving unit 30b may receive and demodulate a PUCCH. The radio receiving unit 30b may receive and demodulate a PUSCH. For example, the radio receiving unit 30b may receive a PUCCH DMRS. For example, the radio receiving unit 30b may receive a PUSCH DMRS. For example, the radio receiving unit 30b may receive a UL PTRS. For example, the radio receiving unit 30b may receive an SRS.

The higher layer processing unit 34 outputs downlink data (transport block) to the radio transmission and/or reception unit 30 (or the radio transmitting unit 30a). The higher layer processing unit 34 performs processing of a Medium Access Control (MAC) layer, a Packet Data Convergence Protocol (PDCP) layer, a Radio Link Control (RLC) layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 manages various pieces of configuration information/parameters (RRC parameters) of the terminal apparatus 1. The radio resource control layer processing unit 36 sets the RRC parameter, based on an RRC message received from the terminal apparatus 1.

The radio transmission and/or reception unit 30 (or the radio transmitting unit 30a) performs processing such as modulation and coding. The radio transmission and/or reception unit 30 (or the radio transmitting unit 30a) performs modulation, coding, baseband signal generation (conversion into a time-continuous signal) on downlink data to generate a physical signal, and transmits the physical signal to the terminal apparatus 1. The radio transmission and/or reception unit 30 (or the radio transmitting unit 30a) may map the physical signal to a certain component carrier, and transmit the mapped physical signal to the terminal apparatus 1.

The radio transmission and/or reception unit 30 (or the radio receiving unit 30b) performs processing such as demodulation and decoding. The radio transmission and/or reception unit 30 (or the radio receiving unit 30*b*) separates, demodulates, and decodes a received physical signal, and outputs decoded information to the higher layer processing unit 34. The radio transmission and/or reception unit 30 (or the radio receiving unit 30*b*) may perform a channel access procedure prior to transmission of the physical signal.

The RF unit 32 converts (down converts) a signal received via the antenna unit 31 into a baseband signal by means of orthogonal demodulation, and removes unnecessary frequency components. The RF unit 32 outputs a processed analog signal to the baseband unit.

The baseband unit 33 converts an analog signal input from the RF unit 32 into a digital signal. The baseband unit 33 removes a portion corresponding to a Cyclic Prefix (CP) from the converted digital signal, performs a Fast Fourier Transform (FFT) on the signal from which the CP has been removed, and extracts a signal in the frequency domain.

The baseband unit 33 performs inverse fast Fourier transform (IFFT) on data to generate an OFDM symbol, adds a CP to the generated OFDM symbol, generates a baseband digital signal, and converts the baseband digital signal into an analog signal. The baseband unit 33 outputs the converted analog signal to the RF unit 32.

The RF unit 32 removes an unnecessary frequency component from the analog signal input from the baseband unit 33 by using a low-pass filter, up converts the analog signal into a carrier frequency, and transmits the converted analog signal via the antenna unit 31. The RF unit 32 may have a function of controlling transmission power. The RF unit 32 is also referred to as a transmission power control unit.

For the terminal apparatus 1, one or multiple serving cells (or component carriers, downlink component carriers, uplink component carriers) may be configured.

Each of the serving cells configured for the terminal apparatus 1 may be one of a Primary cell (PCell), a Primary SCG cell (PSCell), or a Secondary Cell (SCell).

The PCell is a serving cell included in a Master Cell Group (MCG). The PCell is a cell in which an initial connection establishment procedure or a connection re-establishment procedure is performed (has been performed) by the terminal apparatus 1.

The PSCell is a serving cell included in a Secondary Cell Group (SCG). The PSCell is a serving cell in which random access is performed by the terminal apparatus 1 in a reconfiguration procedure with synchronization (Reconfirmation with synchronization).

The SCell may be included in one of the MCG or the SCG.

A serving cell group (cell group) is a term at least including an MCG and an SCG. The serving cell group may include one or multiple serving cells (or component carriers). One or multiple serving cells (or component carriers) included in the serving cell group may be operated by means of carrier aggregation.

One or multiple downlink BWPs may be configured for each of the serving cells (or downlink component carriers). One or multiple uplink BWPs may be configured for each of the serving cells (or uplink component carriers).

Among one or multiple downlink BWPs configured for the serving cell (or the downlink component carrier), one downlink BWP may be configured as an active downlink BWP (or one downlink BWP may be activated). Among one or multiple uplink BWPs configured for the serving cell (or the uplink component carrier), one uplink BWP may be configured as an active uplink BWP (or one uplink BWP may be activated).

The PDSCH, the PDCCH, and the CSI-RS may be received in the active downlink BWP. The terminal apparatus 1 may receive the PDSCH, the PDCCH, and the CSI-RS in the active downlink BWP. The PUCCH and the PUSCH may be transmitted in the active uplink BWP. The terminal apparatus 1 may transmit the PUCCH and the PUSCH in the active uplink BWP. The active downlink BWP and the active uplink BWP are also referred to as an active BWP.

The PDSCH, the PDCCH, and the CSI-RS need not be received in downlink BWPs (inactive downlink BWPs) other than the active downlink BWP. The terminal apparatus 1 need not receive the PDSCH, the PDCCH, and the CSI-RS in the downlink BWP other than the active downlink BWP. The PUCCH and the PUSCH need not be transmitted in uplink BWPs (inactive uplink BWPs) other than the active uplink BWP. The terminal apparatus 1 need not transmit the PUCCH and the PUSCH in an uplink BWP other than the active uplink BWP. The inactive downlink BWP and the inactive uplink BWP are also referred to as an inactive BWP.

Downlink BWP switch is used for deactivating one active downlink BWP, and activating any one of the inactive downlink BWPs other than the one active downlink BWP. The downlink BWP switch may be controlled by a BWP field included in downlink control information. The downlink BWP switch may be controlled based on a higher layer parameter.

Uplink BWP switch is used for deactivating one active uplink BWP, and activating any one of the inactive uplink BWPs other than the one active uplink BWP. The uplink BWP switch may be controlled by a BWP field included in downlink control information. The uplink BWP switch may be controlled based on a higher layer parameter.

Among one or multiple downlink BWPs configured for the serving cell, two or more downlink BWPs need not be configured for the active downlink BWP. For the serving cell, at certain time, one downlink BWP may be active.

Among one or multiple uplink BWPs configured for the serving cell, two or more uplink BWPs need not be configured for the active uplink BWP. For the serving cell, at certain time, one uplink BWP may be active.

Figure 6:
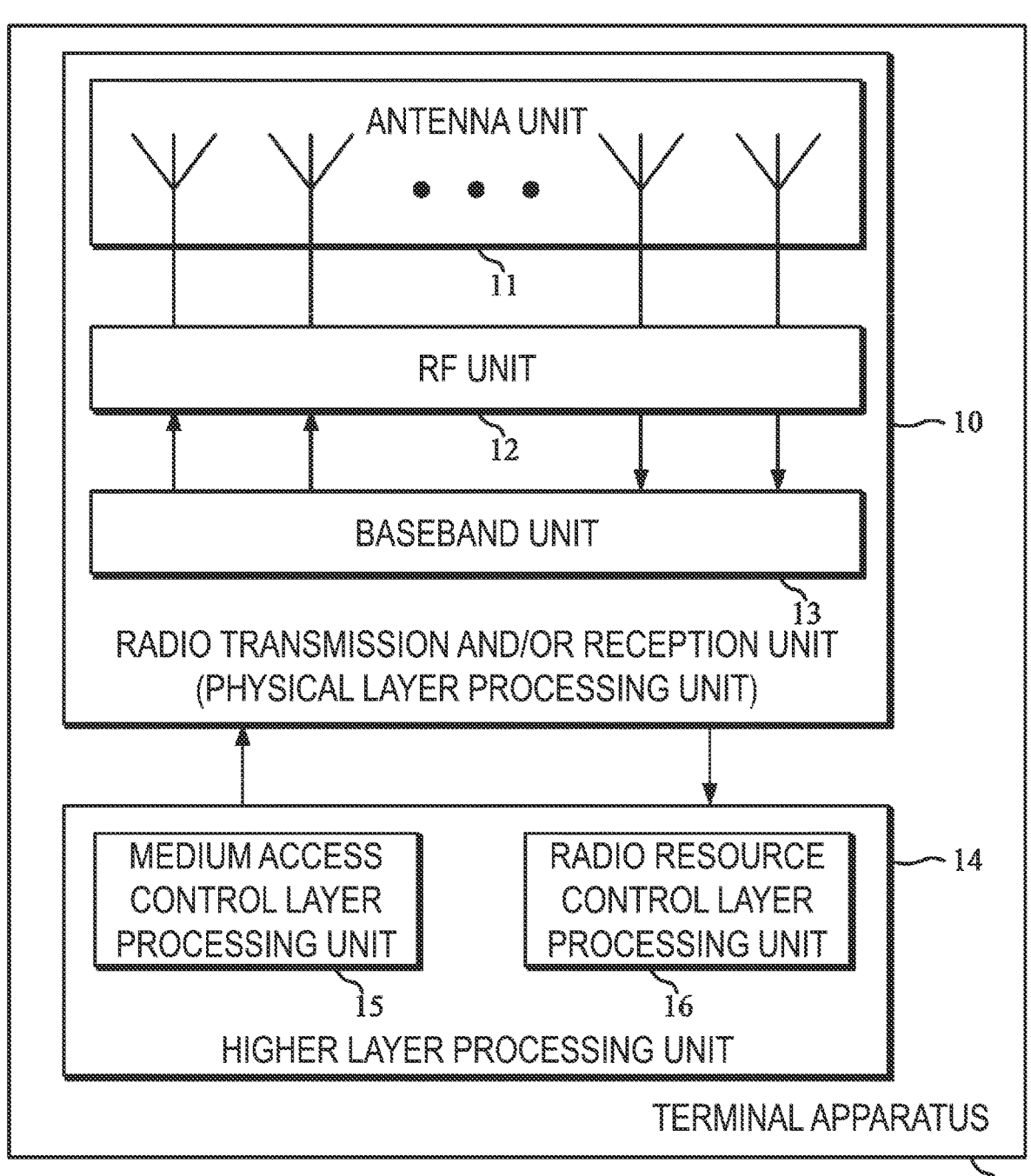
FIG. 6 is a schematic block diagram illustrating a configuration example of a terminal apparatus 1 according to an aspect of the present embodiment.

FIG. 6 is a schematic block diagram illustrating a configuration example of the terminal apparatus 1 according to an aspect of the present embodiment. As illustrated in FIG. 6, the terminal apparatus 1 at least includes one or all of a radio transmission and/or reception unit (physical layer processing unit) 10 and a higher layer processing unit 14. The radio transmission and/or reception unit 10 at least includes a part or all of an antenna unit 11, an RF unit 12, and a baseband unit 13. The higher layer processing unit 14 at least includes a part or all of a medium access control layer processing unit 15 and a radio resource control layer processing unit 16.

The radio transmission and/or reception unit 10 at least includes a part or all of a radio transmitting unit 10*a* and a radio receiving unit 10*b*. Here, apparatus configurations of the baseband unit 13 included in the radio transmitting unit 10*a* and the baseband unit 13 included in the radio receiving unit 10*b* may be the same or different from each other. Apparatus configurations of the RF unit 12 included in the radio transmitting unit 10*a* and the RF unit 12 included in the radio receiving unit 10*b* may be the same or different from each other. Apparatus configurations of the antenna unit 11 included in the radio transmitting unit 10*a* and the antenna unit 11 included in the radio receiving unit 10*b* may be the same or different from each other.

For example, the radio transmitting unit 10a may generate and transmit a baseband signal of a PRACH. For example, the radio transmitting unit 10a may generate and transmit a baseband signal of a PUCCH. The radio transmitting unit 10a may generate and transmit a baseband signal of a PUSCH. For example, the radio transmitting unit 10a may generate and transmit a baseband signal of a PUCCH DMRS. For example, the radio transmitting unit 10a may generate and transmit a baseband signal of a PUSCH DMRS. For example, the radio transmitting unit 10a may generate and transmit a baseband signal of a UL PTRS. For example, the radio transmitting unit 10a may generate and transmit a baseband signal of an SRS.

For example, the radio receiving unit 10b may receive and demodulate a PDSCH. For example, the radio receiving unit 10b may receive and demodulate a PDCCH. For example, the radio receiving unit 10b may receive and demodulate a PBCH. For example, the radio receiving unit 10b may receive a synchronization signal. For example, the radio receiving unit 10b may receive a PDSCH DMRS. For example, the radio receiving unit 10b may receive a PDCCH DMRS. For example, the radio receiving unit 10b may receive a CSI-RS. For example, the radio receiving unit 10b may receive a DL PTRS.

The higher layer processing unit 14 outputs uplink data (transport block) to the radio transmission and/or reception unit 10 (or the radio transmitting unit 10a). The higher layer processing unit 14 performs processing of the MAC layer, the packet data convergence protocol layer, the radio link control layer, and the RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various pieces of configuration information/parameters (RRC parameters) of the terminal apparatus 1. The radio resource control layer processing unit 16 sets the RRC parameters, based on an RRC message received from the base station apparatus 3.

The radio transmission and/or reception unit 10 (or the radio transmitting unit 10a) performs processing such as modulation and coding. The radio transmission and/or reception unit 10 (or the radio transmitting unit 10a) performs modulation, coding, baseband signal generation (conversion into a time-continuous signal) on uplink data to generate a physical signal, and transmits the physical signal to the base station apparatus 3. The radio transmission and/or reception unit 10 (or the radio transmitting unit 10a) may map the physical signal to a certain BWP (active uplink BWP), and transmit the mapped physical signal to the base station apparatus 3.

The radio transmission and/or reception unit 10 (or the radio receiving unit 10b) performs processing such as demodulation and decoding. The radio transmission and/or reception unit 10 (or the radio receiving unit 30b) may receive a physical signal in a certain BWP (active downlink BWP) of a certain serving cell. The radio transmission and/or reception unit 10 (or the radio receiving unit 10b) separates, demodulates, and decodes the received physical signal, and outputs decoded information to the higher layer processing unit 14. The radio transmission and/or reception unit 10 (radio receiving unit 10b) may perform a channel access procedure prior to transmission of the physical signal.

The RF unit 12 converts (down converts) a signal received via the antenna unit 11 into a baseband signal by means of orthogonal demodulation, and removes an unnecessary frequency component. The RF unit 12 outputs a processed analog signal to the baseband unit 13.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed, and extracts a signal in the frequency domain.

The baseband unit 13 performs inverse fast Fourier transform (IFFT) on uplink data to generate an OFDM symbol, adds a CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up converts the analog signal into a signal of a carrier frequency, and transmits the up converted signal via the antenna unit 11. The RF unit 12 may have a function of controlling transmission power. The RF unit 12 is also referred to as a transmission power control unit.

The physical signal (signal) will be described below.

The physical signal is a general term for a downlink physical channel, a downlink physical signal, an uplink physical channel, and an uplink physical channel. The physical channel is a general term for a downlink physical channel and an uplink physical channel. The physical signal is a general term for a downlink physical signal and an uplink physical signal.

The uplink physical channel may correspond to a set of resource elements for carrying information that is generated in a higher layer. The uplink physical channel may be a physical channel used in the uplink component carrier. The uplink physical channel may be transmitted by the terminal apparatus 1. The uplink physical channel may be received by the base station apparatus 3. In the radio communication system according to an aspect of the present embodiment, at least a part or all of the following uplink physical channels may be used.

Physical Uplink Control CHannel (PUCCH)

Physical Uplink Shared CHannel (PUSCH)

Physical Random Access CHannel (PRACH)

The PUCCH may be used to transmit Uplink Control Information (UCI). The PUCCH may be transmitted for conveying (delivering, transmitting) the uplink control information. The uplink control information may be mapped to the PUCCH. The terminal apparatus 1 may transmit the PUCCH to which the uplink control information is mapped. The base station apparatus 3 may receive the PUCCH to which the uplink control information is mapped.

The uplink control information (uplink control information bit, uplink control information sequence, uplink control information type) at least includes a part or all of Channel State Information (CSI), a Scheduling Request (SR), and Hybrid Automatic Repeat request Acknowledgement (HARQ-ACK) information.

The channel state information is also referred to as a channel state information bit or a channel state information sequence. The scheduling request is also referred to as a scheduling request bit or a scheduling request sequence. The HARQ-ACK information is also referred to as an HARQ-ACK information bit or an HARQ-ACK information sequence.

The HARQ-ACK information may at least include an HARQ-ACK corresponding to a Transport block (or TB, Medium Access Control Protocol Data Unit (MAC PDU), Downlink-Shared Channel (DL-SCH), Uplink-Shared Channel (UL-SCH), Physical Downlink Shared Channel (PDSCH), Physical Uplink Shared CHannel (PUSCH)). The HARQ-ACK may indicate an acknowledgement (ACK) or a negative-acknowledgement (NACK) corresponding to the transport block. The ACK may indicate that decoding of the transport block has been completed successfully (has been decoded). The NACK may indicate that decoding of the transport block has not completed successfully (has not been decoded). The HARQ-ACK information may include an HARQ-ACK codebook including one or multiple HARQ-ACK bits.

The fact that the HARQ-ACK information and the transport block correspond to each other may mean that the HARQ-ACK information and the PDSCH used for conveying the transport block correspond to each other.

The HARQ-ACK may indicate an ACK or a NACK corresponding to one Code Block Group (CBG) included in the transport block.

The scheduling request may be at least used for requesting a resource of the PUSCH (or the UL-SCH) for initial transmission (new transmission). The scheduling request bit may be used for indicating one of a positive SR or a negative SR. The scheduling request bit indicating the positive SR is also referred to as "the positive SR being transmitted". The positive SR may indicate that a resource of the PUSCH (or the UL-SCH) for initial transmission is requested by the terminal apparatus 1. The positive SR may indicate that a scheduling request is triggered by a higher layer. The positive SR may be transmitted in a case that the higher layer indicates transmission of the scheduling request. The scheduling request bit indicating the negative SR is also referred to as "the negative SR being transmitted". The negative SR may indicate that a resource of the PUSCH (or the UL-SCH) for initial transmission is not requested by the terminal apparatus 1. The negative SR may indicate that the scheduling request is not triggered by the higher layer. The negative SR may be transmitted in a case that transmission of a scheduling request is not indicated by the higher layer.

Channel state information may include at least some or all of a Channel Quality Indicator (CQI), a Precoder Matrix Indicator (PMI), and a Rank Indicator (RI). The CQI is an indicator related to quality (for example, propagation strength) of a channel or quality of a physical channel, and the PMI is an indicator related to a precoder. The RI is an indicator related to a transmission rank (or the number of transmission layers).

The channel state information may be given based at least on reception of a physical signal (for example, a CSI-RS) at least used for channel measurement. The channel state information may be selected by the terminal apparatus 1, based at least on reception of the physical signal at least used for channel measurement. Channel measurement may include interference measurement.

The PUCCH may correspond to a PUCCH format. The PUCCH may be a set of resource elements used for conveying the PUCCH format. The PUCCH may include the PUCCH format.

The PUSCH may be used for transmitting a transport block and/or uplink control information. The PUSCH may be used for transmitting the transport block and/or the uplink control information corresponding to the UL-SCH. The PUSCH may be used for conveying the transport block and/or the uplink control information. The PUSCH may be used for conveying the transport block and/or the uplink control information corresponding to the UL-SCH. The transport block may be mapped to the PUSCH. The transport block corresponding to the UL-SCH may be mapped to the PUSCH. The uplink control information may be mapped to the PUSCH. The terminal apparatus 1 may transmit the PUSCH to which the transport block and/or the uplink control information is mapped. The base station apparatus 3 may receive the PUSCH to which the transport block and/or the uplink control information is mapped.

The PRACH may be used for transmitting a random access preamble. The PRACH may be used for conveying a random access preamble. A PRACH sequence $x_{u,\,v}(n)$ is defined by $x_{u,\,v}(n)=x_u(\mathrm{mod}(n+C_v, L_{RA}))$. $x_u$ may be a Zad-off-Chu (ZC) sequence. $x_u$ is defined by $x_u=\exp(-j\pi ui(i+1)/L_{RA})$. j is an imaginary unit. $\pi$ is ratio of the circumference of a circle to its diameter. $C_v$ corresponds to a cyclic shift of the PRACH sequence. $L_{RA}$ corresponds to the length of the PRACH sequence. $L_{RA}$ is 839, or 139. i is an integer in the range from 0 to $L_{RA}-1$. u is a sequence index for the PRACH sequence. The terminal apparatus 1 may transmit the PRACH. The base station apparatus 3 may receive the PRACH.

For a certain PRACH occasion, 64 random access preambles are defined. The random access preamble is identified (determined, given) based at least on the cyclic shift C, of the PRACH sequence and the sequence index u for the PRACH sequence.

The uplink physical signal may correspond to a set of resource elements. The uplink physical signal need not carry information generated in a higher layer. The uplink physical signal may be a physical signal used in the uplink component carrier. The terminal apparatus 1 may transmit the uplink physical signal. The base station apparatus 3 may receive the uplink physical signal. In the radio communication system according to an aspect of the present embodiment, at least a part or all of the following uplink physical signals may be used.

UpLink Demodulation Reference Signal (UL DMRS)

Sounding Reference Signal (SRS)

UpLink Phase Tracking Reference Signal (UL PTRS)

The UL DMRS is a general term for a DMRS for the PUSCH and a DMRS for the PUCCH.

A set of antenna ports of the DMRS for the PUSCH (DMRS related to the PUSCH, DMRS included in the PUSCH, DMRS corresponding to the PUSCH) may be given based on a set of antenna ports for the PUSCH. In other words, the set of antenna ports of the DMRS for the PUSCH may be the same as a set of antenna ports of the PUSCH.

Transmission of the PUSCH and transmission of the DMRS for the PUSCH may be indicated by one DCI format (or may be scheduled). The PUSCH and the DMRS for the PUSCH may be collectively referred to as a PUSCH. Transmission of the PUSCH may mean transmission of the PUSCH and the DMRS for the PUSCH.

The PUSCH may be inferred from the DMRS for the PUSCH. In other words, a channel (propagation path) of the PUSCH may be inferred from the DMRS for the PUSCH.

A set of antenna ports of the DMRS for the PUCCH (DMRS related to the PUCCH, DMRS included in the PUCCH, DMRS corresponding to the PUCCH) may be the same as a set of antenna ports of the PUCCH.

Transmission of the PUCCH and transmission of the DMRS for the PUCCH may be indicated by one DCI format (or may be triggered). Mapping of the PUCCH to resource elements (resource element mapping) and/or mapping of the DMRS for the PUCCH to resource elements may be given by one PUCCH format. The PUCCH and the DMRS for the PUCCH may be collectively referred to as a PUCCH. Transmission of the PUCCH may mean transmission of the PUCCH and the DMRS for the PUCCH.

The PUCCH may be inferred from the DMRS for the PUCCH. In other words, a channel of the PUCCH may be inferred from the DMRS for the PUCCH.

The downlink physical channel may correspond to a set of resource elements for carrying information generated in a higher layer. The downlink physical channel may be a physical channel used in a downlink component carrier. The base station apparatus 3 may transmit the downlink physical channel. The terminal apparatus 1 may receive the downlink physical channel. In the radio communication system according to an aspect of the present embodiment, at least a part or all of the following downlink physical channels may be used.

Physical Broadcast Channel (PBCH)
Physical Downlink Control Channel (PDCCH)
Physical Downlink Shared Channel (PDSCH)

The PBCH may be used for transmitting a Master Information Block (MIB) and/or physical layer control information. The PBCH may be transmitted for conveying (delivering, transmitting) the MIB and/or the physical layer control information. The BCH may be mapped to the PBCH. The terminal apparatus 1 may receive the PBCH to which the MIB and/or the physical layer control information is mapped. The base station apparatus 3 may transmit the PBCH to which the MIB and/or the physical layer control information is mapped. The physical layer control information is also referred to as a PBCH payload, or a PBCH payload related to timing. The MIB may include one or multiple higher layer parameters.

The physical layer control information includes 8 bits. The physical layer control information may at least include a part or all of the following 0A to 0D.

0A) Radio frame bit
0B) Half radio frame (half system frame, half frame) bit
0C) SS/PBCH block index bit
0D) Subcarrier offset bit The radio frame bit is used for indicating a radio frame in which the PBCH is transmitted (radio frame including a slot in which the PBCH is transmitted). The radio frame bit includes 4 bits. The radio frame bit may include 4 bits of a 10-bit radio frame indicator. For example, the radio frame indicator may be at least used for identifying radio frames from index 0 to index 1023.

The half radio frame bit is used for indicating, out of the radio frame in which the PBCH is transmitted, which of the first five subframes or the last five subframes is used for transmission of the PBCH. Here, the half radio frame may include five subframes. The half radio frame may include the first five subframes out of the 10 subframes included in the radio frame. The half radio frame may include the last five subframes out of the 10 subframes included in the radio frame.

The SS/PBCH block index bit is used for indicating an SS/PBCH block index. The SS/PBCH block index bit includes 3 bits. The SS/PBCH block index bit may include 3 bits of a 6-bit SS/PBCH block index indicator. The SS/PBCH block index indicator may be at least used for identifying SS/PBCH blocks from index 0 to index 63.

The subcarrier offset bit is used for indicating a subcarrier offset. The subcarrier offset may be used for indicating a difference between the first subcarrier to which the PBCH is mapped and the first subcarrier to which the control resource set having an index of 0 is mapped.

The PDCCH may be used for transmitting Downlink Control Information (DCI). The PDCCH may be transmitted for conveying (delivering, transmitting) the downlink control information. The downlink control information may be mapped to the PDCCH. The terminal apparatus 1 may receive the PDCCH to which the downlink control information is mapped. The base station apparatus 3 may transmit the PDCCH to which the downlink control information is mapped.

The downlink control information may correspond to a DCI format. The downlink control information may be included in the DCI format. The downlink control information may be mapped to each field of the DCI format.

DCI format 0_0, DCI format 0_1, DCI format 1_0, and DCI format 1_1 are DCI formats including a set of fields different from each other. An uplink DCI format is a general term for DCI format 0_0 and DCI format 0_1. A downlink DCI format is a general term for DCI format 1_0 and DC format 1_1.

DCI format 0_0 is at least used for scheduling the PUSCH of a certain cell (or mapped to a certain cell). DCI format 0_0 at least includes a part or all of fields from 1A to 1E.

1A) DCI format identification field (Identifier field for DCI formats)
1B) Frequency domain resource allocation field (Frequency domain resource assignment field)
1C) Time domain resource allocation field (Time domain resource assignment field)
1D) Frequency hopping flag field
1E) Modulation and Coding Scheme field (MCS field)

The DCI format identification field may indicate whether the DCI format including the DCI format identification field is an uplink DCI format or a downlink DCI format. The DCI format identification field included in DCI format 0_0 may indicate 0 (or may indicate that DCI format 0_0 is an uplink DCI format).

The frequency domain resource assignment field included in DCI format 0_0 may be at least used for indicating allocation of frequency resources for the PUSCH.

The time domain resource assignment field included in DCI format 00 may be at least used for indicating allocation time resources for the PUSCH.

The frequency hopping flag field may be at least used for indicating whether or not frequency hopping is applied to the PUSCH.

The MCS field included in DCI format 0_0 may be at least used for indicating a part or all of a modulation scheme for the PUSCH and/or a target coding rate. The target coding rate may be a target coding rate for the transport block of the PUSCH. The size of the transport block (Transport Block Size (TBS)) of the PUSCH may be given based at least on a part or all of the target coding rate and the modulation scheme for the PUSCH.

DCI format 0_0 need not include a field used for a CSI request. In other words, CSI need not be requested using DCI format 0_0.

DCI format 0_0 need not include a carrier indicator field. In other words, the uplink component carrier to which the PUSCH scheduled using DCI format 0_0 is mapped may be the same as the uplink component carrier to which the PDCCH including DCI format 0_0 is mapped.

DCI format 0_0 need not include the BWP field. In other words, the uplink BWP to which the PUSCH scheduled using DCI format 0_0 is mapped may be the same as the uplink BWP to which the PDCCH including DCI format 0_0 is mapped.

DCI format 0_1 is at least used for scheduling of the PUSCH of a certain cell (mapped to a certain cell). DCI format 0_1 at least includes a part or all of fields of 2A to 2H.

2A) DCI format identification field

2B) Frequency domain resource assignment field

2C) Uplink time domain resource assignment field

2D) Frequency hopping flag field

2E) MCS field

2F) CSI request field

2G) BWP field

2H) Carrier indicator field

The DCI format identification field included in DCI format 0_1 may indicate 0 (or may indicate that DCI format 0_1 is an uplink DCI format).

The frequency domain resource assignment field included in DCI format 0_1 may be at least used for indicating allocation of frequency resources for the PUSCH.

The time domain resource assignment field included in DCI format 0_1 may be at least used for indicating allocation time resources for the PUSCH.

The MCS field included in DCI format 0_1 may be at least used for indicating a part or all of a modulation scheme for the PUSCH and/or a target coding rate.

In a case that the BWP field is included in DCI format 0_1, the BWP field may be used for indicating an uplink BWP to which the PUSCH is mapped. In a case that the BWP field is not included in DCI format 0_1, the uplink BWP to which the PUSCH is mapped may be the same as the uplink BWP to which the PDCCH including DCI format 0_1 used for scheduling of the PUSCH is mapped. In a case that the number of uplink BWPs configured for the terminal apparatus 1 in a certain uplink component carrier is two or more, the number of bits of the BWP field included in DCI format 0_1 used for scheduling of the PUSCH mapped to the certain uplink component carrier may be 1 bit or more. In a case that the number of uplink BWPs configured for the terminal apparatus 1 in a certain uplink component carrier is one, the number of bits of the BWP field included in DCI format 0_1 used for scheduling of the PUSCH mapped to the certain uplink component carrier may be 0 bits (or the BWP field need not be included in DCI format 0_1 used for scheduling of the PUSCH mapped to the certain uplink component carrier).

The CSI request field is at least used for indicating the report of the CSI.

In a case that the carrier indicator field is included in DCI format 0_1, the carrier indicator field may be used for indicating the uplink component carrier to which the PUSCH is mapped. In a case that the carrier indicator field is not included in DCI format 0_1, the uplink component carrier to which the PUSCH is mapped may be the same as the uplink component carrier to which the PDCCH including DCI format 0_1 used for scheduling of the PUSCH is mapped. In a case that the number of uplink component carriers configured for the terminal apparatus 1 in a certain serving cell group is two or more (case that uplink carrier aggregation is operated in a certain serving cell group), the number of bits of the carrier indicator field included in DCI format 0_1 used for scheduling of the PUSCH mapped to the certain serving cell group may be 1 bit or more (for example, 3 bits). In a case that the number of uplink component carriers configured for the terminal apparatus 1 in a certain serving cell group is one (case that uplink carrier aggregation is not operated in a certain serving cell group), the number of bits of the carrier indicator field included in DCI format 0_1 used for scheduling of the PUSCH mapped to the certain serving cell group may be 0 bits (or the carrier indicator field need not be included in DCI format 0_1 used for scheduling of the PUSCH mapped to the certain serving cell group).

DCI format 1_0 is at least used for scheduling of the PDSCH of a certain cell (mapped to a certain cell). DCI format 1_0 at least includes a part or all of 3A to 3F.

3A) DCI format identification field

3B) Frequency domain resource assignment field

3C) Time domain resource assignment field

3D) MCS field

3E) PDSCH_HARQ feedback timing indication field (PDSCH to HARQ feedback timing indicator field)

3F) PUCCH resource indication field (PUCCH resource indicator field)

The DCI format identification field included in DCI format 1_0 may indicate 1 (or may indicate that DCI format 1_0 is a downlink DCI format).

The frequency domain resource assignment field included in DCI format 1_0 may be at least used for indicating allocation of frequency resources for the PDSCH.

The time domain resource assignment field included in DCI format 10 may be at least used for indicating allocation of time resources for the PDSCH.

The MCS field included in DCI format 1_0 may be at least used for indicating a part or all of a modulation scheme for the PDSCH and/or a target coding rate. The target coding rate may be a target coding rate for the transport block of the PDSCH. The size of the transport block (Transport Block Size (TBS)) of the PDSCH may be given based at least on a part or all of the target coding rate and the modulation scheme for the PDSCH.

The PDSCH_HARQ feedback timing indication field may be at least used for indicating an offset from the slot including the last OFDM symbol of the PDSCH to the slot including the first OFDM symbol of the PUCCH.

The PUCCH resource indication field may be a field indicating an index of one of one or multiple PUCCH resources included in a PUCCH resource set. The PUCCH resource set may include one or multiple PUCCH resources.

DCI format 1_0 need not include the carrier indicator field. In other words, the downlink component carrier to which the PDSCH scheduled using DCI format 1_0 is mapped may be the same as the downlink component carrier to which the PDCCH including DCI format 1_0 is mapped.

DCI format 1_0 need not include the BWP field. In other words, the downlink BWP to which the PDSCH scheduled using DCI format 1_0 is mapped may be the same as the downlink BWP to which the PDCCH including DCI format 1_0 is mapped.

DCI format 1_1 is at least used for scheduling the PDSCH of a certain cell (or mapped to a certain cell). DCI format 1_1 at least includes a part or all of 4A to 4I. 4A) DCI format identification field 4B) Frequency domain resource assignment field 4C) Time domain resource assignment field 4E) MCS field 4F) PDSCH_HARQ feedback timing indication field 4G) PUCCH resource indication field 4H) BWP field 4I) Carrier indicator field The DCI format identification field included in DCI format 1_1 may indicate 1 (or may indicate that DCI format 1_1 is a downlink DCI format).

The frequency domain resource assignment field included in DCI format 1_1 may be at least used for indicating allocation of frequency resources for the PDSCH.

The time domain resource assignment field included in DCI format 1_1 may be at least used for indicating allocation of time resources for the PDSCH.

The MCS field included in DCI format 1_1 may be at least used for indicating a part or all of the modulation scheme for the PDSCH and/or the target coding rate.

In a case that the PDSCH_HARQ feedback timing indication field is included in DCI format 1_1, the PDSCH_HARQ feedback timing indication field may be at least used for indicating an offset from the slot including the last OFDM symbol of the PDSCH to the slot including the first OFDM symbol of the PUCCH. In a case that the PDSCH_HARQ feedback timing indication field is not included in DCI format 1_1, an offset from the slot including the last OFDM symbol of the PDSCH to the slot including the first OFDM symbol of the PUCCH may be identified by a higher layer parameter.

The PUCCH resource indication field may be a field indicating an index of one of one or multiple PUCCH resources included in a PUCCH resource set.

In a case that the BWP field is included in DCI format 1_1, the BWP field may be used for indicating the downlink BWP to which the PDSCH is mapped. In a case that the BWP field is not included in DCI format 1_1, the downlink BWP to which the PDSCH is mapped may be the same as the downlink BWP to which the PDCCH including DCI format 1_1 used for scheduling of the PDSCH is mapped. In a case that the number of downlink BWPs configured for the terminal apparatus 1 in a certain downlink component carrier is two or more, the number of bits of the BWP field included in DCI format 1_1 used for scheduling of the PDSCH mapped to the certain downlink component carrier may be 1 bit or more. In a case that the number of downlink BWPs configured for the terminal apparatus 1 in a certain downlink component carrier is one, the number of bits of the BWP field included in DCI format 1_1 used for scheduling of the PDSCH mapped to the certain downlink component carrier may be 0 bits (or the BWP field need not be included in DCI format 1_1 used for scheduling of the PDSCH mapped to the certain downlink component carrier).

In a case that the carrier indicator field is included in DCI format 1_1, the carrier indicator field may be used for indicating the downlink component carrier to which the PDSCH is mapped. In a case that the carrier indicator field is not included in DCI format 1_1, the downlink component carrier to which the PDSCH is mapped may be the same as the downlink component carrier to which the PDCCH including DCI format 1_1 used for scheduling of the PDSCH is mapped. In a case that the number of downlink component carriers configured for the terminal apparatus 1 in a certain serving cell group is two or more (case that downlink carrier aggregation is operated in a certain serving cell group), the number of bits of the carrier indicator field included in DCI format 1_1 used for scheduling of the PDSCH mapped to the certain serving cell group may be 1 bit or more (for example, 3 bits). In a case that the number of downlink component carriers configured for the terminal apparatus 1 in a certain serving cell group is one (case that downlink carrier aggregation is not operated in a certain serving cell group), the number of bits of the carrier indicator field included in DCI format 1_1 used for scheduling of the PDSCH mapped to the certain serving cell group may be 0 bits (or the carrier indicator field need not be included in DCI format 1_1 used for scheduling of the PDSCH mapped to the certain serving cell group).

The PDSCH may be used for transmitting the transport block. The PDSCH may be used for transmitting the transport block corresponding to the DL-SCH. The PDSCH may be used for conveying the transport block. The PDSCH may be used for conveying the transport block corresponding to the DL-SCH. The transport block may be mapped to the PDSCH. The transport block corresponding to the DL-SCH may be mapped to the PDSCH. The base station apparatus 3 may transmit the PDSCH. The terminal apparatus 1 may receive the PDSCH.

The downlink physical signal may correspond to a set of resource elements. The downlink physical signal need not carry information generated in a higher layer. The downlink physical signal may be a physical signal used in the downlink component carrier. The downlink physical signal may be transmitted by the base station apparatus 3. The downlink physical signal may be transmitted by the terminal apparatus 1. In the radio communication system according to an aspect of the present embodiment, at least a part or all of the following downlink physical signals may be used.

Synchronization Signal (SS)

DownLink DeModulation Reference Signal (DL DMRS)

Channel State Information-Reference Signal (CSI-RS)

DownLink Phase Tracking Reference Signal (DL PTRS)

The synchronization signal may be at least used for the terminal apparatus 1 to establish synchronization of the frequency domain and/or the time domain in the downlink. The synchronization signal is a general term for the Primary Synchronization Signal (PSS) and the Secondary Synchronization Signal (SSS).

Figure 7:
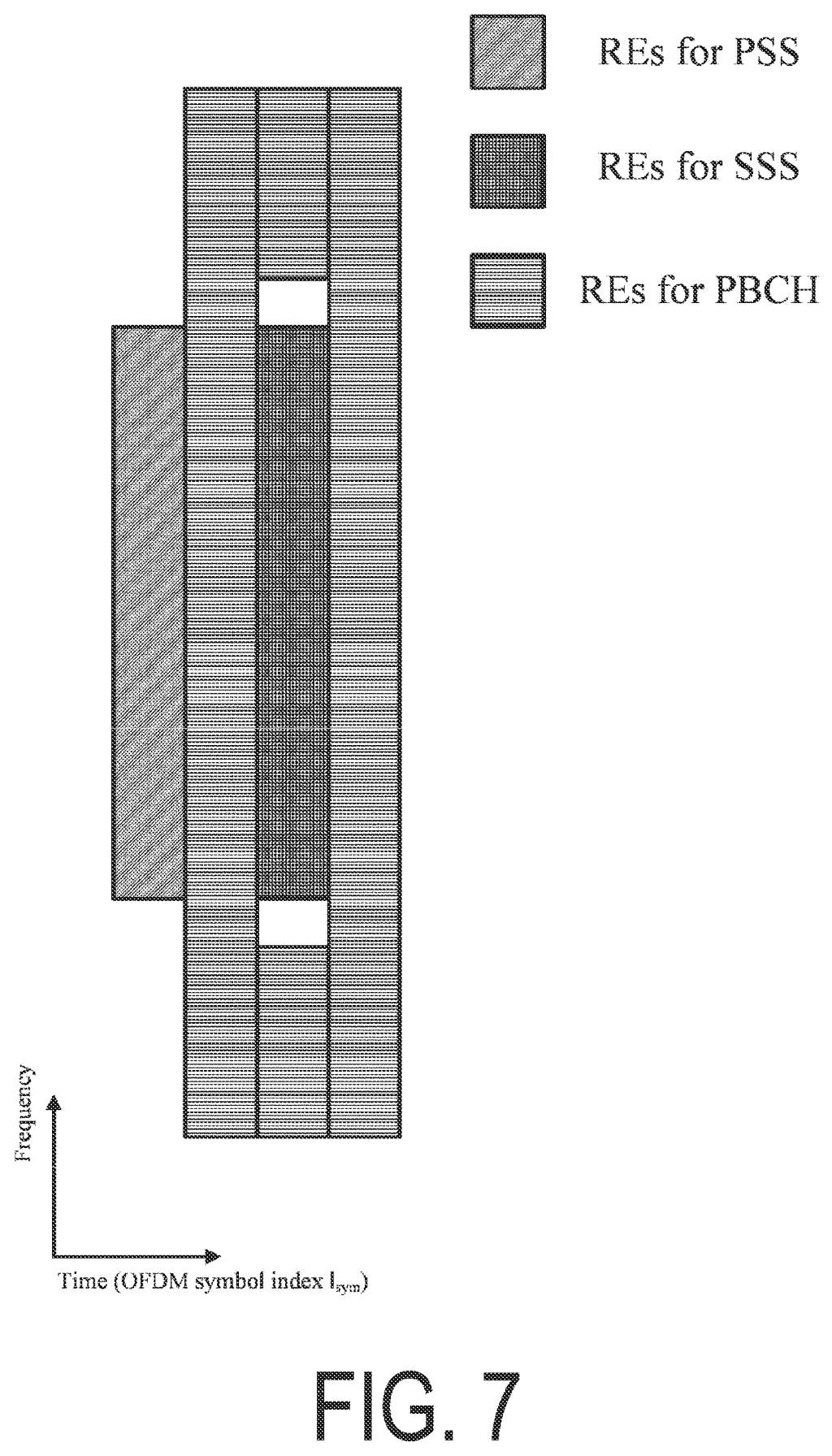

FIG. 7 is a diagram illustrating a configuration example of the SS/PBCH block according to an aspect of the present embodiment. In FIG. 7, the horizontal axis corresponds to a time axis (OFDM symbol index $l_{sym}$), and the vertical axis represents the frequency domain. The block hatched with diagonal lines represents a set of resource elements for the PSS. The block hatched with grid lines represents a set of resource elements for the SSS. The block hatched with horizontal lines represents a set of resource elements for the PBCH and the DMRS for the PBCH (DMRS related to the PBCH, DMRS included in the PBCH, DMRS corresponding to the PBCH).

As illustrated in FIG. 7, the SS/PBCH block includes the PSS, the SSS, and the PBCH. The SS/PBCH block includes four continuous OFDM symbols. The SS/PBCH block includes 240 subcarriers. The PSS is mapped to the 57th to 183rd subcarriers in the first OFDM symbol. The SSS is mapped to the 57th to 183rd subcarriers in the third OFDM symbol. Zero may be set to the 1st to 56th subcarriers of the first OFDM symbol. Zero may be set to the 184th to 240th subcarriers of the first OFDM symbol. Zero may be set to the 49th to 56th subcarriers of the third OFDM symbol. Zero may be set to the 184th to 192nd subcarriers of the third OFDM symbol. The PBCH is mapped to subcarriers which are the 1st to 240th subcarriers of the second OFDM symbol and to which the DMRS for the PBCH is not mapped. The PBCH is mapped to subcarriers which are the 1st to 48th subcarriers of the third OFDM symbol and to which the DMRS for the PBCH is not mapped. The PBCH is mapped to subcarriers which are the 193rd to 240th subcarriers of the third OFDM symbol and to which the DMRS for the PBCH is not mapped. The PBCH is mapped to subcarriers which are the 1st to 240th subcarriers of the fourth OFDM symbol and to which the DMRS for the PBCH is not mapped.

The PSS, the SSS, the PBCH, and the antenna port of the DMRS for the PBCH may be the same.

The PBCH on which the symbol of the PBCH in a certain antenna port is conveyed may be inferred by the DMRS for the PBCH mapped to the slot to which the PBCH is mapped and for the PBCH included in the SS/PBCH block including the PBCH.

The DL DMRS is a general term for a DMRS for the PBCH, a DMRS for the PDSCH, and a DMRS for the PDCCH.

A set of antenna ports of the DMRS for the PDSCH (DMRS related to the PDSCH, DMRS included in the PDSCH, DMRS corresponding to the PDSCH) may be given based on a set of antenna ports for the PDSCH. In other words, the set of antenna ports of the DMRS for the PDSCH may be the same as the set of antenna ports for the PDSCH.

Transmission of the PDSCH and transmission of the DMRS for the PDSCH may be indicated (or may be scheduled) by one DCI format. The PDSCH and the DMRS for the PDSCH may be collectively referred to as a PDSCH. Transmission of the PDSCH may be transmission of the PDSCH and the DMRS for the PDSCH.

The PDSCH may be inferred from the DMRS for the PDSCH. In other words, a channel of the PDSCH may be inferred from the DMRS for the PDSCH. In a case that a set of resource elements in which the symbol of a certain PDSCH and a set of resource elements in which the symbol of the DMRS for the certain PDSCH is conveyed are included in the same Precoding Resource Group (PRG), the PDSCH on which the symbol of the PDSCH in a certain antenna port is conveyed may be inferred by the DMRS for the PDSCH.

The antenna port of the DMRS for the PDCCH (DMRS related to the PDCCH, DMRS included in the PDCCH, DMRS corresponding to the PDCCH) may be the same as the antenna port for the PDCCH.

The PDCCH may be inferred from the DMRS for the PDCCH. In other words, a channel of the PDCCH may be inferred from the DMRS for the PDCCH. In a case that the same precoder is applied to a set of resource elements in which the symbol of a certain PDCCH is conveyed and a set of resource elements in which the symbol of the DMRS for the certain PDCCH is conveyed (assumed to be applied), the PDCCH on which the symbol of the PDCCH in a certain antenna port is conveyed may be inferred by the DMRS for the PDCCH.

A Broadcast CHannel (BCH), an Uplink-Shared CHannel (UL-SCH), and a Downlink-Shared CHannel (DL-SCH) are transport channels. A channel used in the MAC layer is referred to as a transport channel. A unit of the transport channel used in the MAC layer is also referred to as a transport block (TB) or a MAC Protocol Data Unit (PDU). Control of the Hybrid Automatic Repeat reQuest (HARQ) is performed for each transport block in the MAC layer. The transport block is a unit of data that the MAC layer delivers to the physical layer. In the physical layer, the transport block is mapped to a codeword, and modulation processing is performed for each codeword.

For each serving cell, one UL-SCH and one DL-SCH may be given. The BCH may be given to the PCell. The BCH need not be given to the PSCell and the SCell.

A Broadcast Control CHannel (BCCH), a Common Control CHannel (CCCH), and a Dedicated Control CHannel (DCCH) are logical channels. For example, the BCCH is a channel of the RRC layer used for transmitting the MIB or system information. A Common Control CHannel (CCCH) may be used for transmitting a common RRC message in multiple terminal apparatuses 1. Here, the CCCH may be, for example, used for the terminal apparatus 1 that is not in a state of RRC connection. A Dedicated Control CHannel (DCCH) may be at least used for transmitting a dedicated RRC message to the terminal apparatus 1. Here, the DCCH may be, for example, used for the terminal apparatus 1 that is in a state of RRC connection.

The RRC message includes one or multiple RRC parameters (information elements). For example, the RRC message may include the MIB. The RRC message may include the system information. The RRC message may include a message corresponding to the CCCH. The RRC message may include a message corresponding to the DCCH. The RRC message including a message corresponding to the DCCH is also referred to as a specific RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

The higher layer parameter is a parameter included in the RRC message or a Medium Access Control Control Element (MAC CE). In other words, the higher layer parameter is a general term for an MIB, system information, a message corresponding to the CCCH, a message corresponding to the DCCH, and parameters included in the MAC CE. The parameters included in the MAC CE are transmitted by a MAC Control Element (CE) command.

Procedures performed by the terminal apparatus 1 at least include a part or all of the following 5A to 5C.

5A) Cell search

5B) Random access

5C) Data communication

The cell search is a procedure in which synchronization with a certain cell related to the time domain and the frequency domain is performed by the terminal apparatus 1, which is used for detecting a physical cell identity (physical cell ID). In other words, the terminal apparatus 1 may perform synchronization with a certain cell in the time domain and the frequency domain by means of cell search, and detect a physical cell ID.

A sequence of the PSS is given based at least on the physical cell ID. A sequence of the SSS is given based at least on the physical cell ID.

An SS/PBCH block candidate indicates a resource allowed to (capable of, scheduled to, configured to, defined to, having a possibility of) transmit the SS/PBCH block.

A set of SS/PBCH block candidates in a certain half radio frame is also referred to as an SS burst set. The SS burst set is also referred to as a transmission window, an SS transmission window, or a Discovery Reference Signal transmission window (DRS transmission window). The SS burst set is a general term at least including a first SS burst set and a second SS burst set.

The base station apparatus 3 transmits SS/PBCH blocks with one or multiple indexes in a prescribed period. The terminal apparatus 1 may detect at least one SS/PBCH block out of the SS/PBCH blocks with one or multiple indexes, and attempt decoding of the PBCH included in the SS/PBCH block.

The random access is a procedure at least including a part or all of a message 1, a message 2, a message 3, and a message 4.

The message 1 is a procedure in which the PRACH is transmitted by the terminal apparatus 1. The terminal apparatus 1 transmits the PRACH in one PRACH occasion selected out of one or multiple PRACH occasions, based at least on the index of the SS/PBCH block candidate detected based on cell search. Each of the PRACH occasions is defined based at least on resources in the time domain and the frequency domain.

The terminal apparatus 1 transmits one random access preamble selected out of the PRACH occasion corresponding to the index of the SS/PBCH block candidate in which the SS/PBCH block is detected.

The message 2 is a procedure in which detection of DCI format 1_0 with a Cyclic Redundancy Check (CRC) scrambled with a Random Access-Radio Network Temporary Identifier (RA-RNTI) by the terminal apparatus 1 is attempted. The terminal apparatus 1 attempts detection of the PDCCH including the DCI format in a control resource set given based on the MIB included in the PBCH included in the SS/PBCH block detected based on cell search, and resources indicated based on a configuration of a search space set.

The message 3 is a procedure in which the PUSCH scheduled using a random access response grant included in DCI format 1_0 detected through the procedure of the message 2 is transmitted. Here, the random access response grant is indicated by the MAC CE included in the PDSCH scheduled using DCI format 1_0.

The PUSCH scheduled based on the random access response grant is one of a message 3 PUSCH or a PUSCH. The message 3 PUSCH includes a contention resolution identifier (contention resolution ID) MAC CE. The contention resolution ID MAC CE includes a contention resolution ID.

Retransmission of the message 3 PUSCH is scheduled using DCI format 0_0 with a CRC scrambled based on a Temporary Cell-Radio Network Temporary Identifier (TC-RNTI).

The message 4 is a procedure in which detection of DCI format 1_0 with a CRC scrambled based on one of a Cell-Radio Network Temporary Identifier (C-RNTI) or a TC-RNTI is attempted. The terminal apparatus 1 receives the PDSCH scheduled based on DCI format 1_0. The PDSCH may include a contention resolution ID.

Data communication is a general term for downlink communication and uplink communication.

In data communication, the terminal apparatus 1 attempts detection of the PDCCH (monitors the PDCCH) in a control resource set and resources identified based on a search space set.

The control resource set is a set of resources including a certain number of resource blocks and a certain number of OFDM symbols. In the frequency domain, the control resource set may include continuous resources (non-interleaved mapping), or may include distributed resources (interleaver mapping).

A set of resource blocks constituting the control resource set may be indicated by a higher layer parameter. The number of OFDM symbols constituting the control resource set may be indicated by a higher layer parameter.

The terminal apparatus 1 attempts detection of the PDCCH in a search space set. Here, an attempt to detect the PDCCH in the search space set may be an attempt to detect a candidate of the PDCCH in the search space set, may be an attempt to detect a DCI format in the search space set, may be an attempt to detect the PDCCH in the control resource set, may be an attempt to detect a candidate of the PDCCH in the control resource set, or may be an attempt to detect a DCI format in the control resource set.

The search space set is defined as a set of candidates of the PDCCH. The search space set may be a Common Search Space (CSS) set, or may be a UE-specific Search Space (USS) set. The terminal apparatus 1 attempts detection of candidates of the PDCCH in a part or all of a Type 0 PDCCH common search space set, a Type 0a PDCCH common search space set, a Type 1 PDCCH common search space set, a Type 2 PDCCH common search space set, a Type 3 PDCCH common search space set, and/or a UE-specific PDCCH search space set (UE-specific search space set).

The Type 0 PDCCH common search space set may be used as a common search space set having an index of 0. The Type 0 PDCCH common search space set may be a common search space set having an index of 0.

The CSS set is a general term for the Type 0 PDCCH common search space set, the Type 0a PDCCH common search space set, the Type 1 PDCCH common search space set, the Type 2 PDCCH common search space set, and the Type 3 PDCCH common search space set. The USS set is also referred to as a UE-specific PDCCH search space set.

A certain search space set is related to (included in, corresponds to) a certain control resource set. The index of the control resource set related to the search space set may be indicated by a higher layer parameter.

For a certain search space set, a part or all of 6A to 6C may be indicated by at least a higher layer parameter.

6A) Monitoring interval of the PDCCH (PDCCH monitoring periodicity)

6B) Monitoring pattern of the PDCCH in a slot (PDCCH monitoring pattern within a slot)

6C) Monitoring offset of the PDCCH (PDCCH monitoring offset)

The monitoring occasion of a certain search space set may correspond to the OFDM symbol to which the first OFDM symbol of the control resource set related to the certain search space set is mapped. The monitoring occasion of a certain search space set may correspond to a resource of the control resource set starting from the first OFDM symbol of the control resource set related to the certain search space set. The monitoring occasion of the search space set is given based at least on a part or all of the monitoring interval of the PDCCH, the monitoring pattern of the PDCCH in a slot, and the monitoring offset of the PDCCH.

Figure 8:
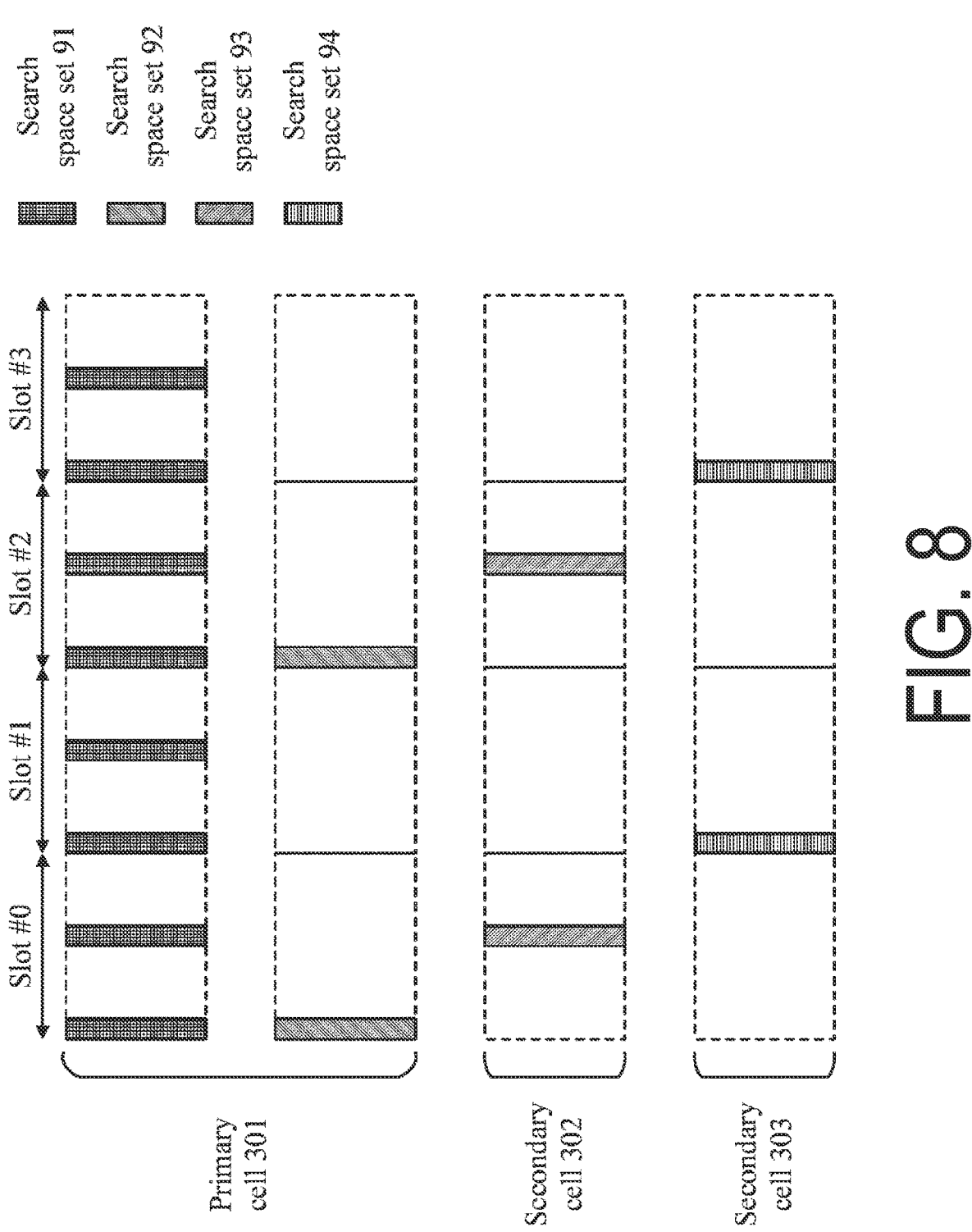
FIG. 8 is a diagram illustrating an example of monitoring occasions for search space sets according to an aspect of the present embodiment.

FIG. 8 is a diagram illustrating an example of the monitoring occasion for the search space set according to an aspect of the present embodiment. In FIG. 8, a search space set 91 and a search space set 92 are configured in a primary cell 301, a search space set 93 is configured in a secondary cell 302, and a search space set 94 is configured in a secondary cell 303.

In FIG. 8, each block hatched with grid lines represents the search space set 91, each block hatched with lines rising diagonally up and to the right represents the search space set 92, each block hatched with lines rising diagonally up and to the left represents the search space set 93, and each block hatched with horizontal lines represents the search space set 94.

The monitoring periodicity of the search space set 91 is set to one slot, the monitoring offset of the search space set 91 is set to zero slots, and the monitoring pattern of the search space set 91 is set to [1, 0, 0, 0, 0, 0, 0, 1, 0, 0, 0, 0, 0, 0]. In other words, the monitoring occasion for the search space set 91 corresponds to the first OFDM symbol (OFDM symbol #0) and the eighth OFDM symbol (OFDM symbol #7) in each of the slots.

The monitoring periodicity of the search space set 92 is set to two slots, the monitoring offset of the search space set 92 is set to zero slots, and the monitoring pattern of the search space set 92 is set to [1, 0, 0, 0, 0, 0, 0, 0, 0, 0, 0, 0, 0, 0]. In other words, the monitoring occasion for the search space set 92 corresponds to the first OFDM symbol (OFDM symbol #0) in each of the even-numbered slots.

The monitoring periodicity of the search space set 93 is set to two slots, the monitoring offset of the search space set 93 is set to zero slots, and the monitoring pattern of the search space set 93 is set to [0, 0, 0, 0, 0, 0, 0, 1, 0, 0, 0, 0, 0, 0]. In other words, the monitoring occasion for the search space set 93 corresponds to the eighth OFDM symbol (OFDM symbol #7) in each of the even-numbered slots.

The monitoring periodicity of the search space set 94 is set to two slots, the monitoring offset of the search space set 94 is set to one slot, and the monitoring pattern of the search space set 94 is set to [1, 0, 0, 0, 0, 0, 0, 0, 0, 0, 0, 0, 0, 0]. In other words, the monitoring occasion for the search space set 94 corresponds to the first OFDM symbol (OFDM symbol #0) in each of the odd-numbered slots.

The Type 0 PDCCH common search space set may be at least used for the DCI format with a Cyclic Redundancy Check (CRC) sequence scrambled with a System Information-Radio Network Temporary Identifier (SI-RNTI).

The Type 0a PDCCH common search space set may be at least used for the DCI format with a Cyclic Redundancy Check (CRC) sequence scrambled with a System Information-Radio Network Temporary Identifier (SI-RNTI).

The Type 1 PDCCH common search space set may be at least used for the DCI format with a CRC sequence scrambled with a Random Access-Radio Network Temporary Identifier (RA-RNTI) and/or a CRC sequence scrambled with a Temporary Cell-Radio Network Temporary Identifier (TC-RNTI).

The Type 2 PDCCH common search space set may be used for the DCI format with a CRC sequence scrambled with a Paging-Radio Network Temporary Identifier (P-RNTI).

The Type 3 PDCCH common search space set may be used for the DCI format with a CRC sequence scrambled with a CELL-RADIO NETWORK TEMPORARY IDENTIFIER (C-RNTI).

The UE-specific PDCCH search space set may be at least used for the DCI format with a CRC sequence scrambled with a C-RNTI.

In downlink communication, the terminal apparatus 1 detects a downlink DCI format. The detected downlink DCI format is at least used for resource allocation of the PDSCH. The detected downlink DCI format is also referred to as downlink allocation (downlink assignment). The terminal apparatus 1 attempts reception of the PDSCH. Based on the PUCCH resource indicated based on the detected downlink DCI format, the HARQ-ACK corresponding to the PDSCH (HARQ-ACK corresponding to the transport block included in the PDSCH) is reported to the base station apparatus 3.

In uplink communication, the terminal apparatus 1 detects an uplink DCI format. The detected DCI format is at least used for resource allocation of the PUSCH. The detected uplink DCI format is also referred to as an uplink grant. The terminal apparatus 1 performs transmission of the PUSCH.

In configured scheduling (configured grant), the uplink grant for scheduling the PUSCH is configured for each transmission period of the PUSCH. A part or all of information indicated by the uplink DCI format in a case that the PUSCH is scheduled by the uplink DCI format may be indicated by the uplink grant configured in a case of the configured scheduling.

The time resources of one or multiple PUSCHs may be determined by allocation of the time resources of the PUSCH indicated by the uplink grant. In other words, one or multiple PUSCHs may be scheduled by one uplink grant. Note that "one or multiple PUSCHs" may be hereinafter referred to as "PUSCH". In particular, in a case that technical details can be described without distinguishing each of one or multiple PUSCHs, "one or multiple PUSCHs" may be referred to as "PUSCH".

The format of the PUSCH may be given based at least on a part or all of a mapping period of the transport block, a mapping period of a sequence of modulation symbols, a mapping period of the DMRS for the PUSCH, and a coherence period of the PUSCH. In a case that the terminal apparatus 1 transmits the PUSCH, the terminal apparatus 1 may determine the format of the PUSCH, based at least on a part or all of the mapping period of the transport block, the mapping period of the sequence of the modulation symbols, the mapping period of the DMRS for the PUSCH, and the coherence period of the PUSCH. In a case that the base station apparatus 3 receives the PUSCH transmitted from the terminal apparatus 1, the base station apparatus 3 may determine the format of the PUSCH, based at least on a part or all of the mapping period of the transport block, the mapping period of the sequence of the modulation symbols, the mapping period of the DMRS for the PUSCH, and the coherence period of the PUSCH.

For example, in a format of a certain PUSCH, the time resources of the PUSCH may be 8 slots, the mapping period of the transport block may be 4 slots, the mapping period of the sequence of the modulation symbols may be 2 slots, the mapping period of the DMRS for the PUSCH may be 2 slots, and the coherence period of the PUSCH may be 4 slots. Here, by configuring the coherence period of the PUSCH to be equal to the mapping period of the transport block, channel estimation used for demodulation/decoding of the transport block can be collectively performed, and thus improvement of transmission performance may be anticipated.

For example, in a format of a certain PUSCH, the time resources of the PUSCH may be 8 slots, the mapping period of the transport block may be 8 slots, the mapping period of the sequence of the modulation symbols may be 1 slot, the mapping period of the DMRS for the PUSCH may be 1 slot, and the coherence period of the PUSCH may be 4 slots. Here, by reducing the mapping period of the DMRS for the coherence period of the PUSCH, the number of resources of the DMRS in the time domain that can be utilized for single channel estimation can be increased, and thus improvement of transmission performance may be anticipated.

For example, in a format of a certain PUSCH, the time resources of the PUSCH may be 8 slots, the mapping period of the transport block may be 8 slots, the mapping period of the sequence of the modulation symbols may be 4 slots, the mapping period of the DMRS for the PUSCH may be 1 slot, and the coherence period of the PUSCH may be 1 slot. Here, by configuring the mapping period of the sequence of the modulation symbols to be long, the modulation symbols of coded bits can be more effectively mapped in the time domain, and thus transmission performance may be anticipated.

For example, the time resources of the PUSCH indicated by the uplink grant may include multiple slots. Here, also in a case that the time resources of the PUSCH indicated by one uplink grant are included in multiple slots, the number of PUSCHs may be one or more than one. For example, in a case that the PUSCH is defined for each slot, the number of PUSCHs may be the same as the number of slots.

Figure 9:
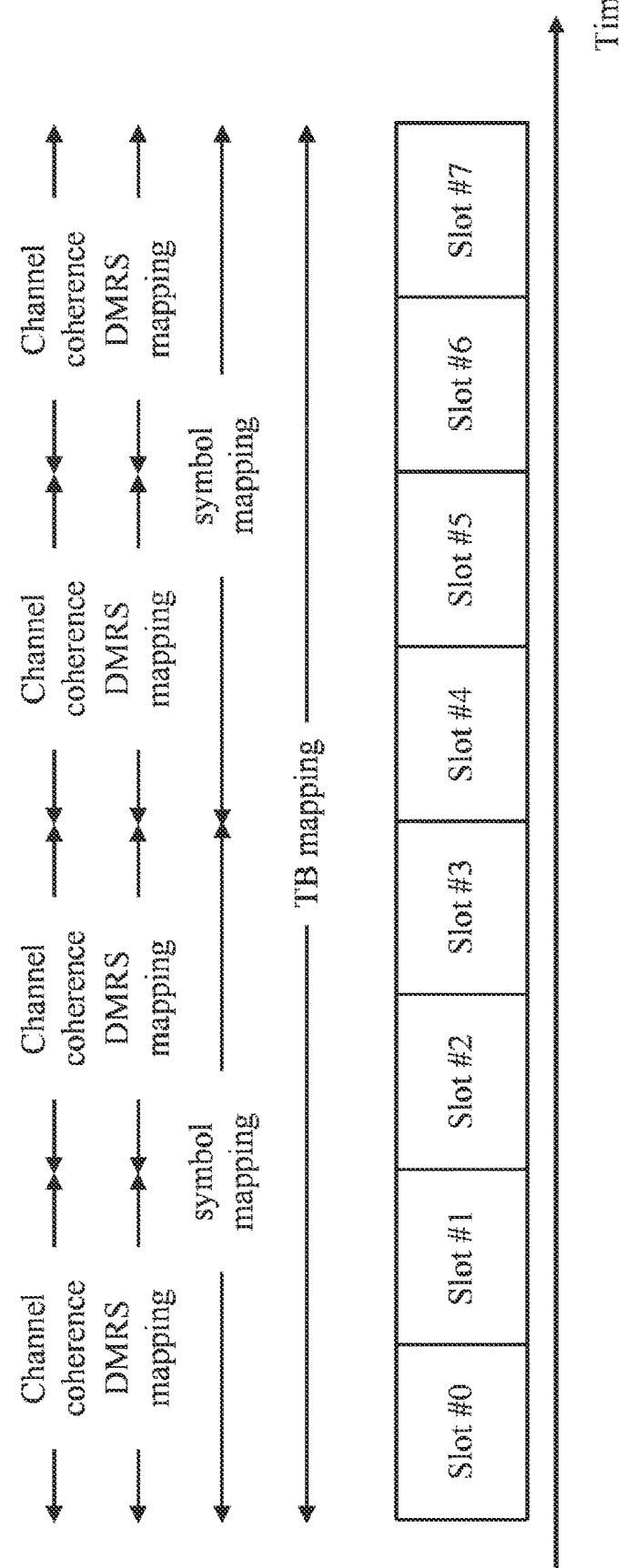
FIG. 9 is a diagram illustrating an example of a format of a PUSCH according to an aspect of the present embodiment.

FIG. 9 is a diagram illustrating an example of a format of the PUSCH according to an aspect of the present embodiment. In FIG. 9, the horizontal axis indicates the time axis. In FIG. 9, multiple slots (in FIG. 9, 8 slots) are indicated on the time axis. Here, the multiple slots of FIG. 9 are assigned with indexes in a manner of slot #0 to slot #7 in order from the earliest one with respect to time. In FIG. 9, multiple slots are continuously mapped in the time domain; however, the aspect of the present invention is not limited to the configuration in which multiple slots are continuously mapped in the time domain. For example, in the aspect of the present invention, multiple slots may be configured with slots capable of uplink transmission. In other words, in the aspect of the present invention, multiple slots may not include slots capable of downlink transmission.

In an example illustrated in FIG. 9, one uplink grant may indicate the PUSCH transmitted in 8 slots including slot #0 to slot #7. Here, the PUSCH may include one transport block. Here, the mapping period (TB mapping period) of the transport block of the PUSCH may be 8 slots.

The mapping period (modulation symbol mapping period) of the sequence of the modulation symbols of the PUSCH may be 4 slots. The mapping period (DMRS mapping period) of the DMRS for the PUSCH may be 2. The coherence period (Channel coference) of the DMRS for the PUSCH may be 2.

The mapping period of the transport block may correspond to the number of slots including a certain transport block. For example, the certain transport block may be mapped over a length X0 corresponding to one period of the mapping period of the transport block. For example, X0 may be determined based at least on an RRC parameter. For example, X0 may be indicated by an RRC parameter. For example, X0 may be determined based at least on higher layer signaling. For example, X0 may be indicated by higher layer signaling. For example, X0 may be indicated by an uplink grant used for scheduling of a transmitted PUSCH including the transport block. For example, X0 may be determined based at least on an uplink grant used for scheduling of a transmitted PUSCH including the transport block. For example, X0 may be indicated by one DCI format. For example, X0 may be determined based at least on one DCI format.

For example, X0 may indicate the number of slots. For example, X0 may indicate the number of OFDM symbols.

For example, X0 may be given based at least on configuration of the PUSCH scheduled by one uplink grant in the time domain (for example, the time resources of the PUSCH). For example, X0 may be determined based at least on the configuration of the PUSCH scheduled by one uplink grant in the time domain. For example, the terminal apparatus 1 may determine X0, based at least on the configuration of the PUSCH scheduled by one uplink grant in the time domain. For example, the base station apparatus 3 may determine X0, based at least on the configuration of the PUSCH scheduled by one uplink grant in the time domain.

By controlling X0 based at least on the configuration of the PUSCH in the time domain, a desired data rate may be implemented regardless of the configuration of the PUSCH in the time domain. In dynamic TDD or the like, prescribed configuration cannot always be used as the configuration of the PUSCH in the time domain, and control of X0 is preferable.

For example, in a case that the configuration of the PUSCH in the time domain is first configuration, X0 may be a first value. In a case that the configuration of the PUSCH in the time domain is second configuration different from the first configuration, X0 may be a second value different from the first value. For example, in a case that the time resources of the PUSCH have a first slot number, X0 may be the first value. In a case that the time resources of the PUSCH are a second slot different from the first slot, X0 may be the second value different from the first value.

For example, the configuration of the PUSCH in the time domain may be the number of slots to which the PUSCH is mapped. For example, the configuration of the PUSCH in the time domain may be the number of OFDM symbols to which the PUSCH is mapped. For example, the configuration of the PUSCH in the time domain may be configuration of the DMRS for the PUSCH in the time domain.

Figure 10:
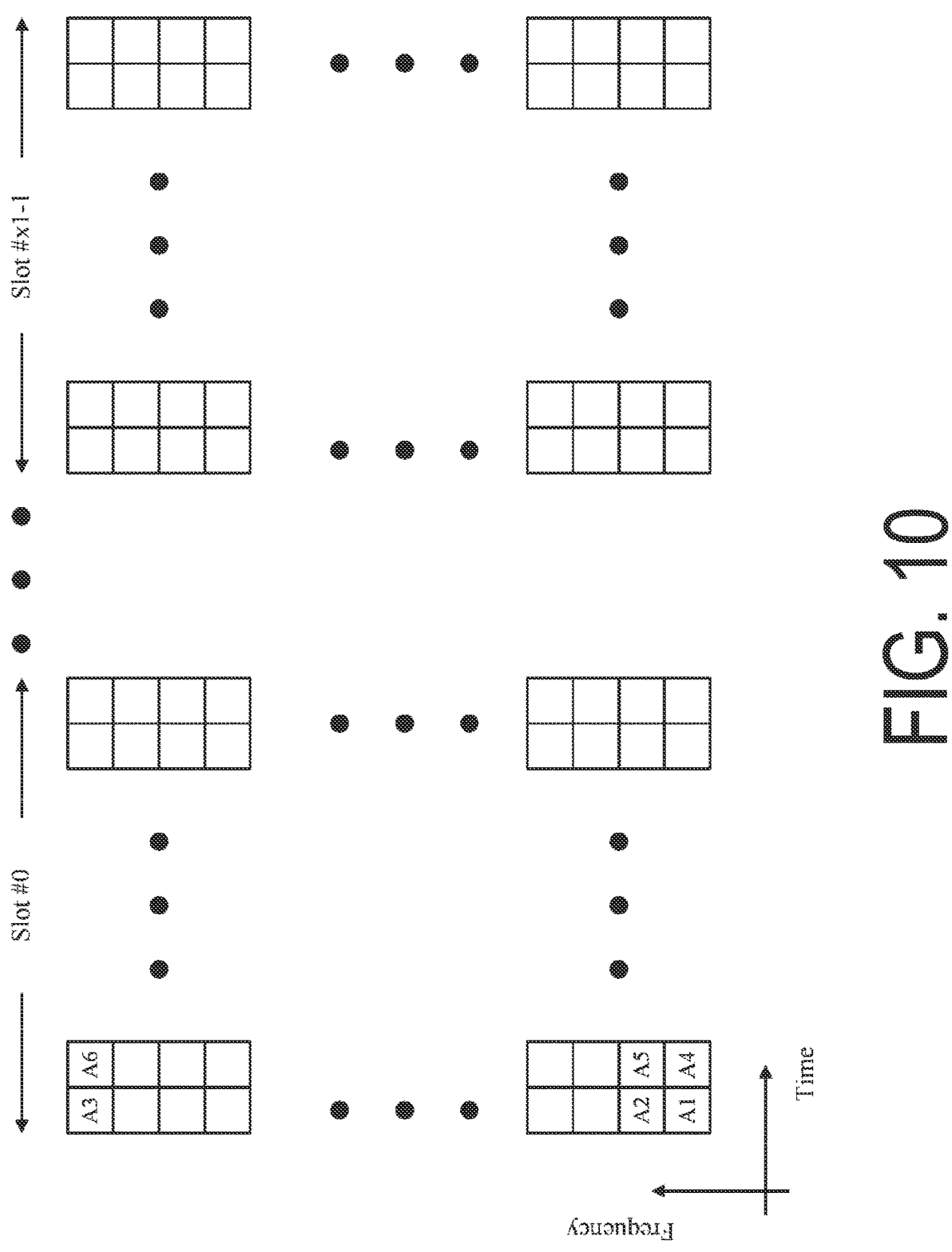
FIG. 10 is a diagram illustrating an example of mapping of modulation symbols according to an aspect of the present embodiment.

FIG. 10 is a diagram illustrating an example of mapping of the modulation symbols according to an aspect of the present embodiment. In FIG. 10, the horizontal axis indicates the time axis, and the vertical axis indicates the frequency axis. In FIG. 10, each of the blocks laid in the time frequency domain indicates one resource element. FIG. 10 illustrates a configuration in which x1 slots are mapped.

The sequence of modulation symbols generated from one transport block may be mapped to resource elements included in x1 slots, based on a Frequency-first Time-second manner. The frequency-first time-second manner may be a manner of mapping the modulation symbols to multiple resource elements arranged in the time frequency domain, based on the following procedures. Procedure 1) Identify a set of initial resource elements in the time domain, and proceed to procedure 2 Procedure 2) Map the modulation symbols in order from the initial resource element in the frequency domain in the identified set of resource elements Procedure 3) Compare with the identified set of resource elements, identify a subsequent set of resource elements in the time domain, and proceed to procedure 2)

For example, procedure 1 in FIG. 10 may be identifying a set of resource elements at least including a resource element A1, a resource element A2, and a resource element A3. Procedure 2 in FIG. 10 may be mapping the modulation symbols in order from the resource element A1 to the resource element A3 via the resource element A2. Procedure 3 in FIG. 10 may be identifying a set of resource elements at least including a resource element A4, a resource element A5, and a resource element A6. Procedure 2 after procedure 3 in FIG. 10 may be mapping the modulation symbols in order from the resource element A4 to the resource element A6 via the resource element A5.

For example, the sequence of modulation symbols generated from one transport block may be mapped to the resource elements included in a length X1 corresponding to one period of the mapping period of the modulation symbols, based on the frequency-first time-second manner. For example, X1 may be indicated by an RRC parameter. For example, X1 may be determined based at least on an RRC parameter. For example, X1 may be determined based at least on higher layer signaling. For example, X1 may be indicated by an uplink grant used for scheduling of a transmitted PUSCH including the transport block. For example, X1 may be determined based at least on an uplink grant used for scheduling of a PUSCH to be transmitted including the transport block. For example, X1 may be indicated by one DCI format. For example, X1 may be determined based at least on one DCI format.

For example, X1 may indicate the number of slots. For example, X1 may indicate the number of OFDM symbols.

For example, in a case that the terminal apparatus 1 determines X1 based at least on first control information, the sequence of modulation symbols generated from one transport block may be mapped to the resource elements included in the length X1 corresponding to one period of the mapping period of the sequence of the modulation symbols, based on the frequency-first time-second manner. For example, the first control information may be determined based at least on a part or all of an RRC parameter, higher layer signaling, an uplink grant used for scheduling of a transmitted PUSCH including the transport block, and one DCI format.

Also, in a case that the terminal apparatus 1 retains the first control information, the sequence of modulation symbols generated from the transport block included in the message 3 PUSCH may be mapped to the resource elements included in one slot, based on the frequency-first time-second manner. In other words, also in a case that the terminal apparatus 1 retains the first control information, X1 may be 1 slot for the transport block included in the message 3 PUSCH.

For example, the case that the terminal apparatus 1 retains certain control information may be a case that configuration based on the certain control information is performed on the terminal apparatus 1. For example, the case that the terminal apparatus 1 retains certain control information may be a case that the terminal apparatus 1 performs processing based on the certain control information.

For example, the case that the terminal apparatus 1 retains the first control information may be a case that the terminal apparatus 1 retains X1. For example, the first control information may be information indicating X1. For example, the first control information may be information used for determining X1, although being information other than information indicating X1.

Also, in a case that the terminal apparatus 1 retains the first control information, the sequence of modulation symbols generated from the transport block included in the PUSCH scheduled by the random access response grant may be mapped to the resource elements included in one slot, based on the frequency-first time-second manner. In other words, also in a case that the terminal apparatus 1 retains the first control information, X1 may be 1 slot for the transport block included in the PUSCH scheduled by the random access response grant.

In a case that the terminal apparatus 1 does not retain the first control information, the sequence of modulation symbols generated from the transport block included in the PUSCH may be mapped to the resource elements included in one slot, based on the frequency-first time-second manner. In other words, in a case that the terminal apparatus 1 does not retain the first control information, X1 may be 1 slot for the transport block included in the PUSCH.

For example, X1 may be given based at least on the configuration of the PUSCH scheduled by one uplink grant in the time domain. For example, X1 may be determined based at least on the configuration of the PUSCH scheduled by one uplink grant in the time domain. For example, the terminal apparatus 1 may determine X1, based at least on the configuration of the PUSCH scheduled by one uplink grant in the time domain. For example, the base station apparatus 3 may determine X1, based at least on the configuration of the PUSCH scheduled by one uplink grant in the time domain.

By controlling X1 based at least on the configuration of the PUSCH in the time domain, the modulation symbols of coded bits may be able to be appropriately mapped based on the configuration of the PUSCH in the time domain.

For example, in a case that the configuration of the PUSCH in the time domain is first configuration, X1 may be a first value. In a case that the configuration of the PUSCH in the time domain is second configuration different from the first configuration, X1 may be a second value different from the first value. For example, in a case that the time resources of the PUSCH have a first slot number, X1 may be the first value. In a case that the time resources of the PUSCH are a second slot different from the first slot, X1 may be the second value different from the first value.

For example, X1 may be given based at least on X0. For example, X1 may be determined based at least on X0. For example, the terminal apparatus 1 may determine X1, based at least on X0. For example, the base station apparatus 3 may determine X1, based at least on X0.

By controlling X1 based at least on X0, the modulation symbols of coded bits may be able to be appropriately mapped based on the mapping period of the transport block.

For example, in a case that X0 is the first value, X1 may be the second value. In a case that X0 is a third value different from the first value, X1 may be a fourth value different from the second value.

For example, the sequence of modulation symbols may be generated by modulation of the sequence of coded bits generated from one transport block. For example, the modulation scheme may be Quadarature Phase Shift Keying (QPSK), or 16 Quadarature Amplitude Modulation (QAM), 64QAM, 256QAM, or (½)π Binary Phase Shift Keying (BPSK). Here, prior to generation of the sequence of modulation symbols, prescribed scramble may be performed on the sequence of coded bits.

For example, the position of the coded bit included in the initial modulation symbol of the sequence of modulation symbols may be given by a Redandancy Version (RV). The RV is information indicating the position of the initial coded bit of the sequence of coded bits used in generation of the sequence of modulation symbols. For example, information indicating the RV may be included in at least any one of an RRC parameter, higher layer signaling, an uplink grant used for scheduling information of a transmitted PUSCH including the transport block, or one DCI format. For example, the RV may be given based at least on any one of an RRC parameter, higher layer signaling, an uplink grant used for scheduling information of a transmitted PUSCH including the transport block, or one DCI format.

For example, one RV may be given for each single period of the mapping period of the sequence of the modulation symbols. For example, the coded bit included in the initial modulation symbol of the sequence of modulation symbols may be given for each single period of the mapping period of the sequence of the modulation symbols. For example, information indicating one RV for each single period of the mapping period of the sequence of the modulation symbols may be included in at least any one of an RRC parameter, higher layer signaling, an uplink grant used for scheduling information of a transmitted PUSCH including the transport block, or one DCI format. For example, one RV for each single period of the mapping period of the sequence of the modulation symbols may be determined based at least on any one of an RRC parameter, higher layer signaling, an uplink grant used for scheduling information of a transmitted PUSCH including the transport block, or one DCI format.

In an example illustrated in FIG. 9, one RV may be indicated for one period including slot #0 to slot #3, and one RV may be indicated for one period including slot #4 to slot #7.

For example, one RV may be indicated for the initial one period among one or multiple mapping periods of the sequence of the modulation symbols included in the time domain of the PUSCH in the PUSCH scheduled by one uplink grant. Here, information indicating the one RV may be included in at least any one of an RRC parameter, higher layer signaling, an uplink grant used for scheduling information of a transmitted PUSCH including the transport block, or one DCI format. Here, the RV for each of one or multiple mapping periods of the sequence of the modulation symbols included in the time domain of the PUSCH except for the initial one period may be given based at least on the one RV.

The mapping period of the DMRS is a period to which a pattern of mapping of the DMRS in the time domain is applied. For example, in a case that the length of one period of the mapping period of the DMRS is X2, the mapping pattern of the DMRS in the time domain may be applied for each length X2.

For example, the mapping pattern of the DMRS may be information indicating a set of indexes of OFDM symbols to which the DMRS is mapped in the length X2. Here, the index of the OFDM symbol may be an index of the OFDM symbol with respect to a reference point (the OFDM symbol whose index is considered to be 0). For example, the reference point for one certain period among the mapping periods of the DMRS included in the time domain of the PUSCH may be the initial OFDM symbol included in the one period. For example, the reference point for one certain period among the mapping periods of the DMRS included in the time domain of the PUSCH may be determined by a certain OFDM symbol included in the one period. For example, X2 may be determined based at least on an RRC parameter. For example, X2 may be indicated by an RRC parameter. For example, X2 may be determined based at least on higher layer signaling. For example, X2 may be indicated by a higher layer parameter. For example, X2 may be indicated by an uplink grant used for scheduling of a transmitted PUSCH including the transport block. For example, X2 may be determined based at least on an uplink grant used for scheduling of a transmitted PUSCH including the transport block. For example, X2 may be indicated by one DCI format. For example, X2 may be determined based at least on one DCI format.

For example, X2 may indicate the number of slots. For example, X2 may indicate the number of OFDM symbols.

In other words, in a case that the terminal apparatus 1 determines X2 based at least on second control information, the mapping pattern of the DMRS for the PUSCH may be applied for each X2 slot. For example, the second control information may be determined based at least on a part or all of an RRC parameter, higher layer signaling, an uplink grant used for scheduling of the PUSCH, and one DCI format.

Also, in a case that the terminal apparatus 1 retains the second control information, the mapping pattern of the DMRS for the message 3 PUSCH may be applied for each single slot. In other words, also in a case that the terminal apparatus 1 retains the second control information, X2 may be 1 slot for the message 3 PUSCH.

For example, a case that the terminal apparatus 1 retains the second control information may be a case that the terminal apparatus 1 retains X2. For example, the second control information may be information indicating X2. For example, the second control information may be information used for determining X2, although being information other than information indicating X2.

Also, in a case that the terminal apparatus 1 retains the second control information, the mapping pattern of the DMRS for the PUSCH scheduled by the random access response grant may be applied for each single slot. In other words, also in a case that the terminal apparatus 1 retains the second control information, X2 may be 1 slot for the PUSCH scheduled by the random access response grant.

In a case that the terminal apparatus 1 does not retain the second control information, the mapping pattern of the DMRS for the PUSCH may be applied for each single slot. In other words, in a case that the terminal apparatus 1 does not retain the second control information, X2 may be 1 slot for the PUSCH.

For example, X2 may be given based at least on the configuration of the PUSCH scheduled by one uplink grant in the time domain. For example, X2 may be determined based at least on the configuration of the PUSCH scheduled by one uplink grant in the time domain. For example, the terminal apparatus 1 may determine X2, based at least on the configuration of the PUSCH scheduled by one uplink grant in the time domain. For example, the base station apparatus 3 may determine X2, based at least on the configuration of the PUSCH scheduled by one uplink grant in the time domain.

By controlling X2 based at least on the configuration of the PUSCH in the time domain, mapping of the DMRS may be able to be appropriately performed based on the configuration of the PUSCH in the time domain. Density of the DMRS in the time domain is controlled by X2, and thus preferable density of the DMRS in the time domain may be different for different configurations of the PUSCH in the time domain.

For example, in a case that the configuration of the PUSCH in the time domain is first configuration, X2 may be a first value. In a case that the configuration of the PUSCH in the time domain is second configuration different from the first configuration, X2 may be a second value different from the first value. For example, in a case that the time resources of the PUSCH have a first slot number, X2 may be the first value. In a case that the time resources of the PUSCH are a second slot different from the first slot, X2 may be the second value different from the first value.

For example, X2 may be given based at least on X0. For example, X2 may be determined based at least on X0. For example, the terminal apparatus 1 may determine X1, based at least on X0. For example, the base station apparatus 3 may determine X1, based at least on X0.

By controlling X2 based at least on X0, mapping of the DMRS may be able to be appropriately performed based on the mapping period of the transport block.

For example, in a case that X0 is the first value, X2 may be the second value. In a case that X0 is a third value different from the first value, X2 may be a fourth value different from the second value.

For example, X2 may be given based at least on XL. For example, X2 may be determined based at least on X1. For example, the terminal apparatus 1 may determine X2, based at least on X1. For example, the base station apparatus 3 may determine X2, based at least on X1.

By controlling X2 based at least on X1, mapping of the DMRS may be able to be appropriately performed based on the mapping period of the sequence of the modulation symbols. Mapping of the sequence of modulation symbols and mapping of the DMRS are processing of the same layer (processing of a resource element mapping layer), and thus, for example, X2=X1 may be configured.

For example, in a case that X1 is the first value, X2 may be the second value. In a case that X1 is a third value different from the first value, X2 may be a fourth value different from the second value.

The coherence period may be a period considered to have the same radio section information. For example, the radio section information may be information related to phase and/or amplitude that fluctuates in a case that the modulation symbol mapped to a certain resource element is transmitted in a radio section. The radio section information may be information having influence of a precoder applied prior to transmission of the modulation symbol.

The terminal apparatus 1 need not generate the PUSCH so that the radio section information is considered to be the same beyond the coherence period. The terminal apparatus 1 may generate the PUSCH so that the radio section information is considered to be the same in the coherence period.

The base station apparatus 3 need not consider that the radio section information is the same beyond the coherence period. The base station apparatus 3 may consider that the radio section information is the same in the coherence period.

For example, based on a certain modulation symbol in the coherence period, the radio section information of another modulation symbol in the coherence period may be able to be estimated. The coherence period may be configured so that, based on a certain modulation symbol in the coherence period, the radio section information of another modulation symbol in the coherence period can be estimated.

For example, a length X3 of one period of the coherence period of the PUSCH may be determined based at least on an RRC parameter. For example, X3 may be indicated by an RRC parameter. For example, X3 may be determined based at least on higher layer signaling. For example, X3 may be indicated by higher layer signaling. For example, X3 may be indicated by an uplink grant used for scheduling of a transmitted PUSCH including the transport block. For example, X3 may be determined based at least on an uplink grant used for scheduling of a transmitted PUSCH including the transport block. For example, X3 may be indicated by one DCI format. For example, X3 may be determined based at least on one DCI format.

In other words, in a case that the terminal apparatus 1 determines X3 based at least on third control information, the radio section information may be considered to be the same in X3 slots. For example, the third control information may be determined based at least on a part or all of an RRC parameter, higher layer signaling, an uplink grant used for scheduling of the PUSCH, and one DCI format.

Also, in a case that the terminal apparatus 1 retains the third control information, regarding the radio section information for the message 3 PUSCH, the radio section information may be considered to be the same in 1 slot. In other words, also in a case that the terminal apparatus 1 retains the third control information, X3 may be 1 slot for the message 3 PUSCH.

For example, a case that the terminal apparatus 1 retains the third control information may be a case that the terminal apparatus 1 retains X3. For example, the third control information may be information indicating X3. For example, the third control information may be information used for determining X3, although being information other than information indicating X3.

Also, in a case that the terminal apparatus 1 retains the third control information, regarding the radio section information for the PUSCH scheduled by the random access response grant, the radio section information may be considered to be the same in 1 slot. In other words, also in a case that the terminal apparatus 1 retains the third control information, X3 may be 1 slot for the PUSCH scheduled by the random access response grant.

In a case that the terminal apparatus 1 does not retains the third control information, regarding the radio section information for the PUSCH, the radio section information may be considered to be the same in 1 slot. In other words, in a case that the terminal apparatus 1 does not retain the third control information, X3 may be 1 slot for the PUSCH.

For example, X3 may be given based at least on the configuration of the PUSCH scheduled by one uplink grant in the time domain. For example, X3 may be determined based at least on the configuration of the PUSCH scheduled by one uplink grant in the time domain. For example, the terminal apparatus 1 may determine X3, based at least on the configuration of the PUSCH scheduled by one uplink grant in the time domain. For example, the base station apparatus 3 may determine X3, based at least on the configuration of the PUSCH scheduled by one uplink grant in the time domain.

By controlling X3 based at least on the configuration of the PUSCH in the time domain, operation of channel estimation of the base station apparatus 3 may be able to be appropriately controlled based on the configuration of the PUSCH in the time domain.

For example, in a case that the configuration of the PUSCH in the time domain is first configuration, X3 may be a first value. In a case that the configuration of the PUSCH in the time domain is second configuration different from the first configuration, X3 may be a second value different from the first value. For example, in a case that the time resources of the PUSCH have a first slot number, X3 may be the first value. In a case that the time resources of the PUSCH are a second slot different from the first slot, X3 may be the second value different from the first value.

For example, X3 may be given based at least on X0. For example, X3 may be determined based at least on X0. For example, the terminal apparatus 1 may determine X3, based at least on X0. For example, the base station apparatus 3 may determine X3, based at least on X0.

By controlling X3 based at least on X0, operation of the channel estimation of the base station apparatus 3 may be able to be appropriately controlled based on the mapping period of the transport block.

For example, in a case that X0 is the first value, X3 may be the second value. In a case that X0 is a third value different from the first value, X3 may be a fourth value different from the second value.

For example, X3 may be given based at least on X1. For example, X3 may be determined based at least on X1. For example, the terminal apparatus 1 may determine X3, based at least on X1. For example, the base station apparatus 3 may determine X3, based at least on X1.

By controlling X3 based at least on X1, operation of the channel estimation of the base station apparatus 3 may be able to be appropriately controlled based on the mapping period of the sequence of the modulation symbols.

For example, in a case that X1 is the first value, X3 may be the second value. In a case that X1 is a third value different from the first value, X3 may be a fourth value different from the second value.

For example, X3 may be given based at least on X2. For example, X3 may be determined based at least on X2. For example, the terminal apparatus 1 may determine X3, based at least on X2. For example, the base station apparatus 3 may determine X3, based at least on X2.

By controlling X3 based at least on X2, operation of the channel estimation of the base station apparatus 3 may be able to be appropriately controlled based on the mapping period of the DMRS. Density of the time domain can be controlled by the mapping period of the DMRS, and thus it is preferable to control operation of the channel estimation of the base station apparatus 3.

For example, in a case that X2 is the first value, X3 may be the second value. In a case that X2 is a third value different from the first value, X3 may be a fourth value different from the second value.

For example, X2 may be given based at least on X3. For example, X2 may be determined based at least on X3. For example, the terminal apparatus 1 may determine X2, based at least on X3. For example, the base station apparatus 3 may determine X2, based at least on X3.

As illustrated in FIG. 9, each of the mapping period of the transport block, the mapping period of the sequence of the modulation symbols, the mapping period of the DMRS for the PUSCH, and the coherence period of the PUSCH may be different values from each other, or may be individually configured.

For example, in one period of the coherence period, the terminal apparatus 1 may apply the same precoding. For example, in one period of the coherence period, the terminal apparatus 1 may apply the same spatial filter.

Figure 11:
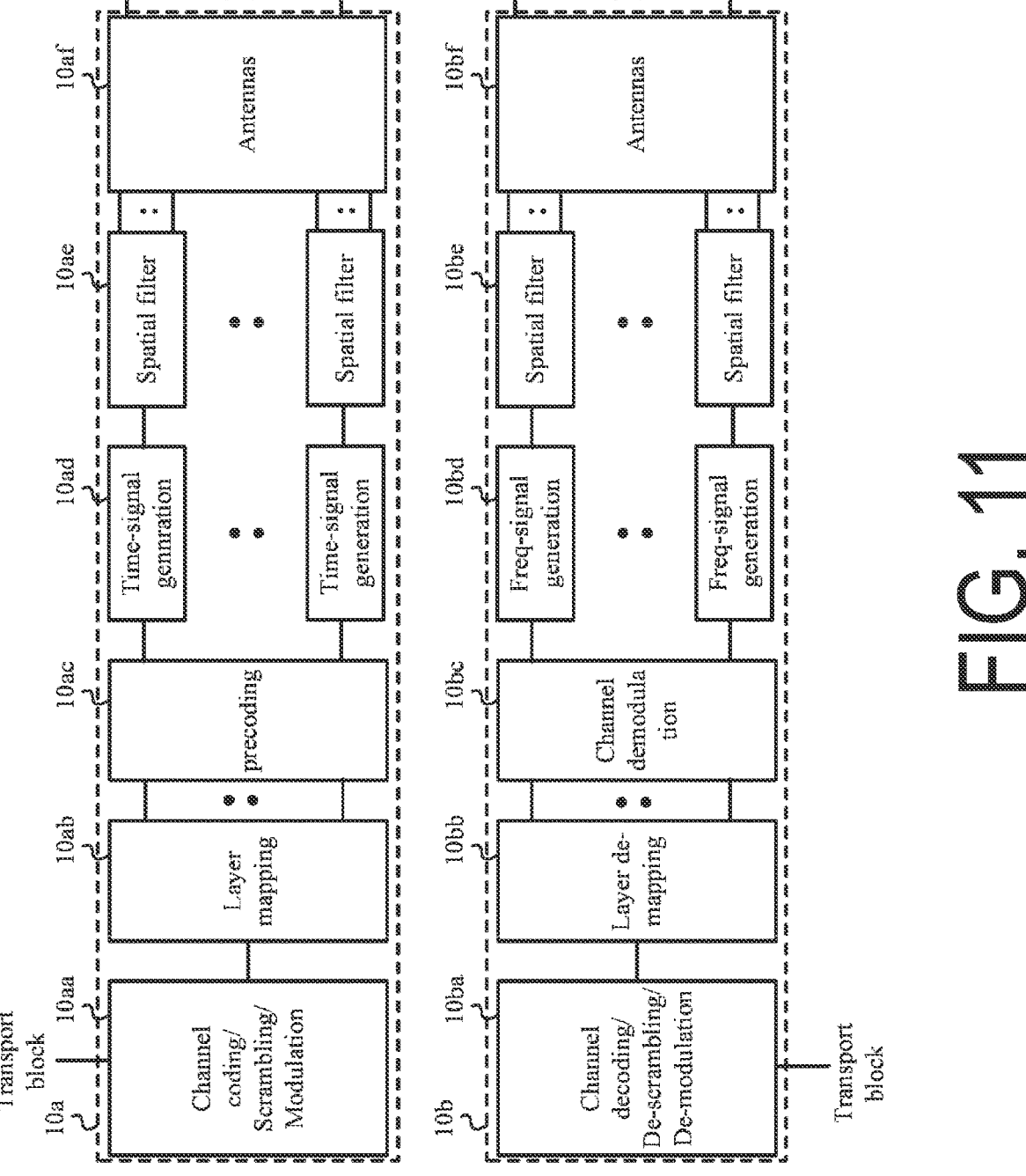
FIG. 11 is a diagram illustrating a configuration example of a radio transmission and/or reception unit 10 according to an aspect of the present embodiment.

FIG. 11 is a diagram illustrating a configuration example of the radio transmission and/or reception unit 10 according to an aspect of the present embodiment. Here, the configuration of the radio transmission and/or reception unit 30 is configuration that is the same as or at least similar to the configuration of the radio transmission and/or reception unit 10. In FIG. 11, the transport block is input to a Channel coding/Scrambling/Modulation unit 10aa. In the channel coding/scrambling/modulation unit 10aa, a procedure of channel coding is applied to the input transport block, and thereby a sequence bi of coded bits is generated. Here, the transport block is also referred to as a codeword. Here, the procedure of channel coding may at least include a part or all of addition of a CRC sequence to the transport block, division of the transport block with the added CRC into code blocks, coding of the code blocks, and interleaving of the sequence of coded bits.

In the channel coding/scrambling/modulation unit 10aa, a prescribed scramble sequence is applied to the sequence $b^a{}_k$ of coded bits, and thereby a scrambled sequence $b^a{}_k$ of coded bits is generated.

In the channel coding/scrambling/modulation unit 10aa, modulation is applied to the scrambled sequence $b^a{}_k$ of coded bits, and thereby a sequence $d_k$ of modulation symbols is generated. For example, the modulation may be QPSK, 16QAM, 64QAM, 256QAM, or $(\frac{1}{2})\pi$ BPSK.

In a Layer mapping unit 10ab, the sequence $d_k$ of modulation symbols is distributed into $v$ layers, and thereby $v$ sequences $x^{(\lambda)}{}_k$ of modulation symbols are generated. For example, $v$ may be an integer of 1 or greater. Here, $\lambda$ is an index of a layer, and indicates any one of integer values in the range from 0 to $v-1$.

For example, transform precoding may be or may not be applied to each of the $v$ sequences $x^{(\lambda)}{}_k$ of modulation symbols after layer mapping.

In a Precoding unit 10ac, precoding as shown in Equation (1) is applied to the $v$ sequences $x^{(\lambda)}{}_k$ of modulation symbols after layer mapping, and thereby precoded sequences $z^{(p\lambda)}{}_k$ of modulation symbols are generated.

$$\begin{bmatrix} z_k^{(p_0)} \\ \vdots \\ z_k^{(p_{\rho-1})} \end{bmatrix} = W \begin{bmatrix} z_k^{(0)} \\ \vdots \\ z_k^{(p_{v-1})} \end{bmatrix}$$ [Equation 1]

In Equation (1), W is a matrix used for precoding. Here, the number of elements in a row (horizontal axis) of the matrix W is $\rho$. The number of elements in a column (vertical axis) of the matrix W is $v$. $P_\xi$ indicates an antenna port of index $\xi$. Here, $\xi$ is an index of an antenna port, and indicates any one of integer values in the range from 0 to $\rho-1$.

For example, in non-codebook based transmission, the matrix W may be a unit matrix. For example, in codebook based transmission, the matrix W may be indicated by the DCI format for scheduling the PUSCH. For example, in the codebook based transmission, the matrix W may be indicated by an RRC parameter, or the matrix W may be given based at least on an RRC parameter. For example, regardless of the non-codebook based transmission or the codebook based transmission, in a case (case of $\rho=1$) that the PUSCH is transmitted in a single antenna port, W may be 1.

For example, which of the non-codebook based transmission or the codebook based transmission is applied to the PUSCH may be indicated by an RRC parameter. For example, which of the non-codebook based transmission or the codebook based transmission is applied to the PUSCH may be determined based at least on an RRC parameter.

FIG. 12 is a diagram illustrating candidates of the matrix W for transmission of the PUSCH of one layer in a case that four antenna ports are used according to an aspect of the present embodiment. Note that the candidate of the matrix W is also referred to as a codebook. In FIG. 12, the upper part of the list indicates indexes of a Transmission Precoding Matrix Indicator (TPMI), and the lower part of the list indicates codebooks corresponding to the indexes of the upper part. In FIG. 12, j is an imaginary unit.

The codebooks can be classified into three types of codebook groups. The first codebook group includes such codebooks that, among multiple elements constituting one codebook, only one element is non-zero and elements other than the one element are zero. In FIG. 12, four codebooks corresponding to any one of index 0 to index 3 are included in the first codebook group. The first codebook group may be utilized for switching the antenna ports used for transmission of the PUSCH. The codebooks included in the first codebook group may be at least used in a case that there is no coherence among multiple antenna ports included in the terminal apparatus 1. The fact that there is no coherence among multiple antenna ports may mean that it cannot be ensured that, among characteristics of a signal transmitted from each of the multiple antenna ports, a part or all of transmission timing, transmission power, expected received power, and initial phase of the signal are the same.

The second codebook group includes such codebooks that, among multiple elements constituting one codebook, more than one element is non-zero and elements other than the more than one element are zero. In FIG. 12, eight codebooks corresponding to any one of index 4 to index 11 are included in the second codebook group. The codebooks included in the second codebook group may be at least used in a case that, among multiple antenna ports included in the terminal apparatus 1, 1) there is coherence between the first antenna port and the second antenna port, and 2) there is no coherence between the first antenna port and a third antenna port. Here, the fact that there is coherence among multiple antenna ports may mean that it can be ensured that, among characteristics of a signal transmitted from each of the multiple antenna ports, a part or all of transmission timing, transmission power, expected received power, and initial phase of the signal are the same.

The second codebook group may be divided into multiple codebook subgroups. For example, in FIG. 12, the codebook corresponding to any one of index 4 to index 7 may be included in the first codebook subgroup, and the codebook corresponding to any one of index 8 to index 11 may be included in the second codebook subgroup. Here, the codebooks included in the first codebook subgroup are such codebooks that the first element from the top and the third element from the top of the codebook are non-zero, and the second element from the top and the fourth element from the top of the codebook are zero. The codebooks included in the second codebook subgroup are such codebooks that the first element from the top and the third element from the top of the codebook are zero, and the second element from the top and the fourth element from the top of the codebook are non-zero. In other words, each of the codebooks included in one codebook subgroup may be such a codebook that includes non-zero elements at positions the same as each other.

The third codebook group includes such codebooks that all of the multiple elements constituting one codebook are non-zero. In FIG. 12, 16 codebooks corresponding to any one of index 12 to index 27 may be included in the third codebook group. The codebooks included in the third codebook group may be at least used in a case that there is coherence among multiple antenna ports included in the terminal apparatus 1.

The terminal apparatus 1 may report function information indicating the codebook group supported by the terminal apparatus 1 to the base station apparatus 3. Here, the function information may be information that can at least indicate a part or all of state 1, state 2, and state 3. Here, the state 1 may be a state of the terminal apparatus 1 in which precoding of the PUSCH based on the first codebook group is supported, precoding of the PUSCH based on the second codebook group is not supported, and precoding of the PUSCH based on the third codebook group is not supported. The state 2 may be a state of the terminal apparatus 1 in which precoding of the PUSCH based on the first codebook group is supported, precoding of the PUSCH based on the second codebook group is supported, and precoding of the PUSCH based on the third codebook group is not supported. The state 3 may be a state of the terminal apparatus 1 in which precoding of the PUSCH based on the first codebook group is supported, precoding of the PUSCH based on the second codebook group is supported, and precoding of the PUSCH based on the third codebook group is supported.

For example, the function information may be included in RRC signaling.

A time-signal generation unit 10$ad$ generates a time signal $s^{(p\lambda)}$ (t), based on the precoded sequences $z^{(p\lambda)}{}_k$ of modulation symbols of an antenna port $p_\lambda$. A time signal generation procedure may at least include a part or all of a procedure of mapping the precoded sequences $z^{(p\lambda)}{}_k$ of modulation symbols of the antenna port $p_\lambda$ to the resource elements and generation of an OFDM signal. Here, t is a variable on the time axis.

A Spatial filter unit 10$ae$ applies a spatial filter to the time signal $s^{(p\lambda)}$ (t) of the antenna port $p_\lambda$, and thereby generates a time signal $u^{(p\lambda)}$ (t). The spatial filter is also referred to as an analog beam, a transmit beam, a beam, a spatial relation, spatial processing, or the like. For example, the spatial filter may be determined by a combination of multiple phase shifters. For example, the spatial filter may be determined by a power strength pattern of an antenna or the like.

Antennas unit 10$af$ transmits the time signal $u^{(p\lambda)}$ (t) into a radio space.

Antennas unit 10$bf$ receives the time signal $u^{(p\lambda)}$ (t) transmitted into the radio space.

A spatial filter unit 10$be$ applies a spatial filter to the received time signal $u^{(p\lambda)}$ (t), and restores the time signal $s^{(p\lambda)}$ (t) of the antenna port $p_\lambda$.

A frequency signal generation (Freq-signal generation) unit 10$bd$ restores the frequency signal $z^{(p\lambda)}{}_k$, based on the time signal $s^{(p\lambda)}$ (t) of the antenna port $p_\lambda$.

A Channel demodulation unit 10$bc$ applies channel demodulation based on the DMRS to the frequency signal $z^{(p\lambda)}{}_k$ of the antenna port $p_\lambda$, and thereby restores the sequence $x^{(\lambda)}{}_k$ of modulation symbols. A procedure of channel demodulation may at least include a part or all of estimation of phase fluctuation of the DMRS and phase demodulation based on the estimated phase fluctuation.

A layer demapping (Layer de-mapping) unit 10$bb$ demaps the sequence $x^{(\lambda)}{}_k$ of modulation symbols, and thereby restores the sequence $d_k$ of modulation symbols.

A channel decoding/descrambling/demodulation (Channel decoding/De-scrambling/De-modulation) unit 10$ba$ demodulates the sequence $d_k$ of modulation symbols, and restores a scrambled sequence $b^a{}_k$ of coded bits.

The channel decoding/descrambling/demodulation unit 10$ba$ descrambles the scrambled sequence $b^a{}_k$ of coded bits, and restores the sequence $b_k$ of coded bits.

The channel decoding/descrambling/demodulation unit 10$ba$ performs channel decoding on the sequence $b_k$ of coded bits, and restores the transport block.

For example, the terminal apparatus 1 may apply a spatial filter in transmission of an uplink signal. Here, the uplink signal is a general term for an uplink physical channel and an uplink physical signal.

Figure 13:
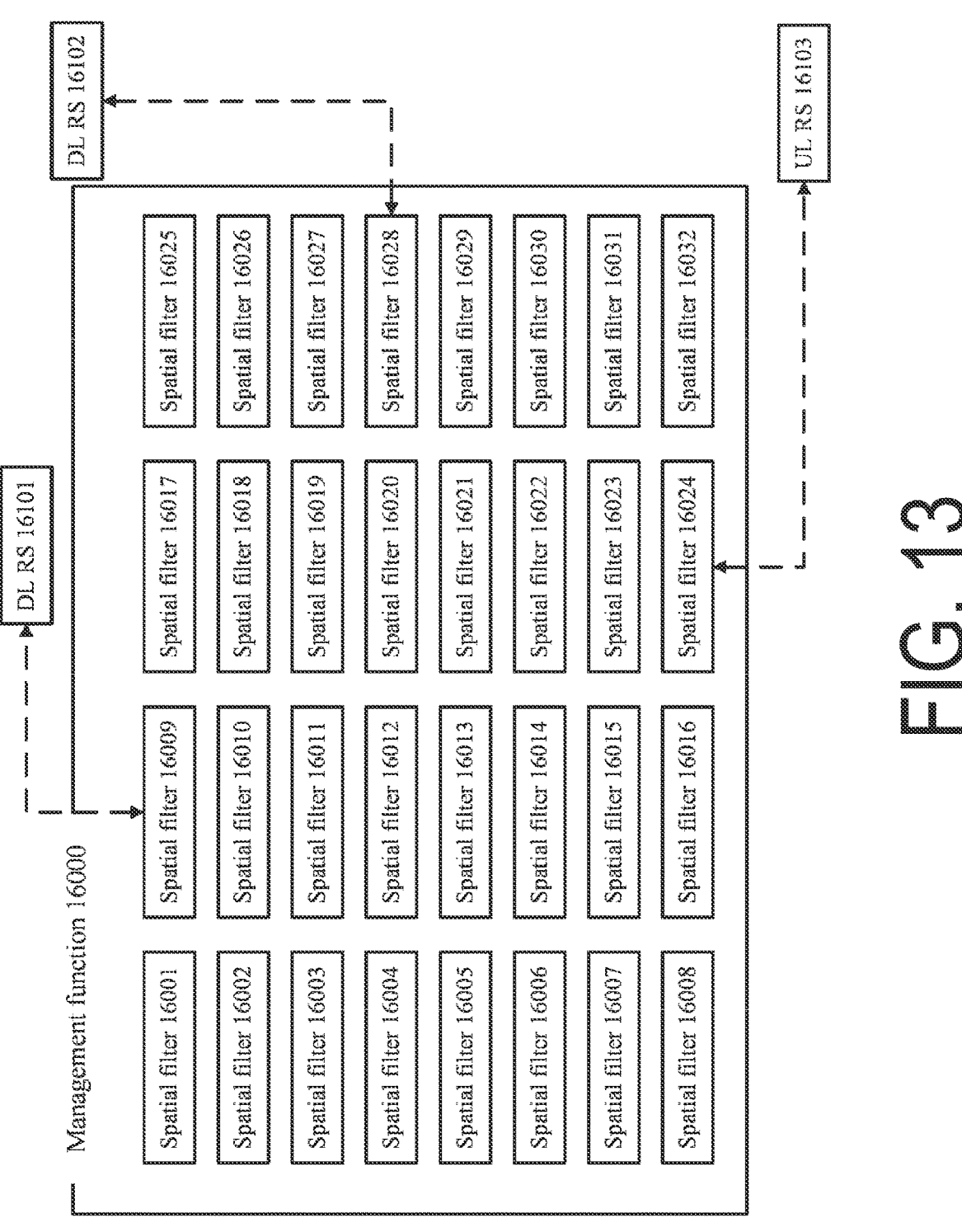
FIG. 13 is a diagram illustrating an example of a management method of spatial filters of the terminal apparatus 1 according to an aspect of the present embodiment.

FIG. 13 is a diagram illustrating an example of a management method of spatial filters of the terminal apparatus 1 according to an aspect of the present embodiment. The terminal apparatus 1 includes a Management function 16000. In FIG. 13, the management function 16000 includes a spatial filter 16001 to a spatial filter 16032. In other words, in FIG. 13, the terminal apparatus 1 can transmit an uplink signal by adaptively using 32 spatial filters. Here, a set of spatial filters included in the management function 16000 is referred to as a spatial filter set. Note that the management function 16000 may include a prescribed number of spatial filters. The prescribed number is not limited to 32.

The terminal apparatus 1 monitors a downlink physical signal that is transmitted periodically or aperiodically. In FIG. 13, the terminal apparatus 1 monitors a downlink physical signal (DL RS) 16101 and a downlink physical signal 16102. The terminal apparatus 1 may apply any one spatial filter of the spatial filter set for each resource of the downlink physical signal 16101 and receive the downlink physical signal 16101. Here, the terminal apparatus 1 determines a preferable spatial filter for monitoring of the downlink physical signal 16101. The terminal apparatus 1 associates the preferable spatial filter for monitoring of the downlink physical signal 16101 with the downlink physical signal 16101. In FIG. 13, a spatial filter 16009 is associated with the downlink physical signal 16101. The terminal apparatus 1 may apply any one spatial filter of the spatial filter set for each resource of the downlink physical signal 16102 and receive the downlink physical signal 16102. Here, the terminal apparatus 1 determines a preferable spatial filter for monitoring of the downlink physical signal 16102. The terminal apparatus 1 associates the preferable spatial filter for monitoring of the downlink physical signal 16102 with the downlink physical signal 16102. In FIG. 13, a spatial filter 16028 is associated with the downlink physical signal 16102.

The terminal apparatus 1 transmits an uplink physical signal periodically or aperiodically. In FIG. 13, the terminal apparatus 1 transmits an uplink physical signal (UL RS) 16103. The terminal apparatus 1 associates an uplink physical signal 16103 with one spatial filter. The terminal apparatus 1 transmits the uplink physical signal 16103 by using the associated one spatial filter. In FIG. 13, a spatial filter 16024 is associated with the uplink physical signal 16103.

The base station apparatus 3 may report spatial relation information for grant/scheduling/configuration of an uplink signal transmitted by the terminal apparatus 1. For example, the spatial relation information may be information indicating an index of a downlink physical signal. Here, a spatial filter associated with certain spatial relation information may be applied to a downlink physical signal indicated by the certain spatial relation information. For example, the base station apparatus 3 may apply a spatial filter associated with certain spatial relation information to a downlink physical signal indicated by the certain spatial relation information. For example, the terminal apparatus 1 may monitor the uplink physical signal, based on that it is assumed that a spatial filter associated with certain spatial relation information is applied to a downlink physical signal indicated by the certain spatial relation information. The spatial relation information may be information indicating an index of an uplink physical signal. Here, a spatial filter associated with certain spatial relation information may be applied to an uplink physical signal indicated by the certain spatial relation information. For example, the terminal apparatus 1 may apply a spatial filter associated with certain spatial relation information to an uplink physical signal indicated by the certain spatial relation information. For example, the base station apparatus 3 may monitor the uplink physical signal, based on that it is assumed that a spatial filter associated with certain spatial relation information is applied to the uplink physical signal indicated by the certain spatial relation information. Here, the uplink physical signal may be an SRS.

In other words, the terminal apparatus 1 may determine one spatial filter based on the spatial relation information reported from the base station apparatus 3, and transmit the uplink signal.

For example, the base station apparatus 3 may report a list of pieces of spatial relation information used for transmission of the PUCCH of the terminal apparatus 1 by using RRC signaling. For example, the candidate list may include one piece of spatial relation information. For example, the candidate list may include more than one piece of spatial relation information.

For example, in a case that the list of pieces of spatial relation information including one piece of spatial relation information is reported using RRC signaling, the terminal apparatus 1 may apply a spatial filter associated with the one piece of spatial relation information to the PUCCH.

For example, in a case that the list of pieces of spatial relation information including more than one piece of spatial relation information is reported using RRC signaling, the terminal apparatus 1 may expect to receive a MAC CE command. For example, the base station apparatus 3 may report one piece of spatial relation information out of the more than one piece of spatial relation information by using the MAC CE command. For example, the terminal apparatus 1 may apply a spatial filter associated with the one piece of spatial relation information to the PUCCH, based on reception of the MAC CE command. A case that a certain spatial filter is activated may be a case that spatial relation information associated with the certain spatial filter is activated.

The spatial filter applied to the PUCCH is also referred to as a spatial filter activated for the PUCCH. In other words, for example, the certain spatial filter may be activated by RRC signaling including the list of pieces of spatial relation information including one piece of spatial relation information. For example, the certain spatial filter may be activated by the MAC CE command indicating one piece of spatial relation information.

For example, the terminal apparatus 1 may activate one spatial filter for each group of PUCCH resources. For example, the group of PUCCH resources may be a group including one or multiple PUCCH resources. For example, the base station apparatus 3 may configure multiple PUCCH resources and multiple groups for the PUCCH resources by using RRC signaling. For example, the base station apparatus 3 may report any one of the multiple groups and one piece of spatial relation information by using one MAC CE command. For example, the base station apparatus 3 may report each of pieces of spatial relation information activated for each of the multiple groups by using one MAC CE command. In a case that the base station apparatus 3 transmits the PUCCH in the PUCCH resources included in a certain group, the base station apparatus 3 may apply a spatial filter activated for the certain group.

For example, the base station apparatus 3 need not report the list of pieces of spatial relation information including the spatial relation information for the PUCCH. For example, based at least on that the list of pieces of spatial relation information including the spatial relation information for the PUCCH is not reported, the terminal apparatus 1 may apply a spatial filter associated with default spatial relation information to the PUCCH (or may activate a spatial filter associated with the default spatial relation information). For example, the default spatial relation information may be given by a Transmission Configuration Indication (TCI) state configured for a prescribed control resource set monitored by the terminal apparatus 1, or a QCL source configured for the prescribed control resource set. For example, in a case that the terminal apparatus 1 is not configured to monitor the prescribed control resource set, the default spatial relation information may be given by any one of the TCI states out of a list of TC states configured for the PDSCH. For example, the prescribed control resource set may be the control resource set of index 0. For example, the prescribed control resource set may be the control resource set of the smallest index out of the control resource sets configured in a certain BWP. For example, the prescribed control resource set may be the control resource set of the smallest index out of the control resource sets configured in a certain cell.

Here, the TCI state is information including an index of one or multiple downlink reference signals. The TCI state is used for indicating a QCL relationship. For example, the TC state configured for a certain control resource set indicates that the PDCCH monitored in the certain control resource set and one or multiple reference signals indicated by the TCI state are quasi co-located (QCL).

Here, the QCL source configured for the certain control resource set is a downlink reference signal that is quasi co-located (QCL) with the PDCCH monitored in the certain control resource set.

For example, the base station apparatus 3 may report the list of pieces of spatial relation information including one or multiple pieces of spatial relation information for the PUSCH.

For example, in a case that the list of pieces of spatial relation information including one piece of spatial relation information for the PUSCH is reported using RRC signaling, the terminal apparatus 1 may apply a spatial filter associated with the one piece of spatial relation information to the PUSCH.

For example, in a case that the base station apparatus 3 reports the list of pieces of spatial relation information including more than one piece of spatial relation information for the PUSCH to the terminal apparatus 1 by using RRC signaling, the base station apparatus 3 may report one piece of spatial relation information out of the more than one piece of spatial relation information to the terminal apparatus 1 by using an SRS resource indication field included in the DCI format used for scheduling the PUSCH. For example, the terminal apparatus 1 may apply a spatial filter associated with the one piece of spatial relation information to the PUSCH, based on reception of the DCI format.

The spatial filter applied to the PUSCH is also referred to as a spatial filter activated for the PUSCH. In other words, for example, the spatial filter applied to the PUSCH may be activated by RRC signaling including the list of pieces of spatial relation information including one piece of spatial relation information. For example, the spatial filter applied to the PUSCH may be activated by the DCI format indicating one piece of spatial relation information.

FIG. 14 is a diagram illustrating an example of patterns in which multiple spatial filters included in a spatial filter set 1600 are applied according to an aspect of the present embodiment. For example, in a format of the PUSCH illustrated in FIG. 14, a different spatial filter may be applied to the PUSCH for each single period of the coherence period. For example, in a case that a format of a certain PUSCH includes X periods of the coherence period, one spatial filter included in the spatial filter set 1600 may be applied to the PUSCH for each single period of the X coherence periods. For example, in example A1 of FIG. 14, the format of the PUSCH includes four periods of the coherence period, and the spatial filter 16001 is applied to the first one period (cycle 1) of the coherence period, the spatial filter 16002 is applied to the second one period (cycle 2) of the coherence period, the spatial filter 16003 is applied to the third one period (cycle 3) of the coherence period, and the spatial filter 16004 is applied to the fourth one period (cycle 4) of the coherence period. Here, the spatial filter 16001, the spatial filter 16002, the spatial filter 16003, and the spatial filter 16004 are included in the spatial filter set 1600. Here, in FIG. 9, the first one period of the coherence period is a period including slot #0 and slot #1, the second one period of the coherence period is a period including slot #2 and slot #3, the third one period of the coherence period is a period including slot #4 and slot #5, and the fourth one period of the coherence period is a period including slot #6 and slot #7.

For example, in a case that a format of a certain PUSCH includes X periods of the coherence period, any one of Y spatial filters included in the spatial filter set 1600 may be applied based on a prescribed pattern. For example, Y=2 spatial filters may be applied to the PUSCH, based on a prescribed pattern. In example A2 of FIG. 14, the spatial filter 16001 is applied to the first one period of the coherence period, the spatial filter 16002 is applied to the second one period of the coherence period, the spatial filter 16001 is applied to the third one period of the coherence period, and the spatial filter 16002 is applied to the fourth one period of the coherence period. Here, in example A2, the spatial filter set 1600 is included in the spatial filter 16001 and the spatial filter set 1600.

In example A3 of FIG. 14, the spatial filter 16002 is applied to the first one period of the coherence period, the spatial filter 16002 is applied to the second one period of the coherence period, the spatial filter 16001 is applied to the third one period of the coherence period, and the spatial filter 16001 is applied to the fourth one period of the coherence period. Here, in example A3, the spatial filter set 1600 is included in the spatial filter 16001 and the spatial filter set 1600.

In example A4 in FIG. 14, the spatial filter 16002 is applied to the first one period of the coherence period, the spatial filter 16001 is applied to the second one period of the coherence period, the spatial filter 16001 is applied to the third one period of the coherence period, and the spatial filter 16002 is applied to the fourth one period of the coherence period. Here, in example A2, the spatial filter set 1600 is included in the spatial filter 16001 and the spatial filter set 1600.

For example, the terminal apparatus 1 may apply multiple spatial filters included in the spatial filter set 1600 to each single period of the coherence period, based on a prescribed pattern. For example, the terminal apparatus 1 may apply multiple spatial filters included in the spatial filter set 1600 to each single period of the coherence period, based on a pattern selected by the terminal apparatus 1.

In the following, a configuration example of the spatial filter set 1600 will be described.

In other words, for example, in a case that a format of a certain PUSCH includes X periods of the coherence period, the first spatial filter of the spatial filter set 1600 may be applied to the PUSCH in the first one period out of the X periods. For example, the second spatial filter of the spatial filter set 1600 may be applied to the PUSCH in the second one period out of the X periods.

For example, the spatial filter set 1600 may at least include the spatial filters activated for the PUCCH. For example, the spatial filter set 1600 may include multiple spatial filters activated for any one of multiple groups of the PUCCH resources. For example, the terminal apparatus 1 may determine the spatial filter set 1600, based on the spatial relation information reported by the MAC CE command. For example, the terminal apparatus 1 may determine the spatial filter set 1600, based on the multiple pieces of spatial relation information corresponding to any one of multiple groups reported by the MAC CE command. The base station apparatus 3 may report the spatial filter set 1600 by using the MAC CE command.

For example, the spatial filter set 1600 may at least include the spatial filter associated with the default spatial relation information. For example, in a case that the terminal apparatus 1 determines the default spatial relation information, the default spatial relation information may be included in the spatial filter set 1600. For example, whether or not the terminal apparatus 1 determines the default spatial relation information may be reported using RRC signaling.

For example, the spatial filter set 1600 may at least include the spatial filter associated with the default spatial relation information for the PUSCH scheduled by a DCI format, regardless of a type of the DCI format. For example, the terminal apparatus 1 may include the spatial filter associated with the default spatial relation information in the spatial filter set 1600 for the PUSCH scheduled by a DCI format, regardless of a type of the DCI format.

For example, the spatial filter set 1600 may at least include the spatial filter associated with the default spatial relation information for the PUSCH scheduled by DCI format 0_0. For example, the terminal apparatus 1 may include the spatial filter associated with the default spatial relation information in the spatial filter set 1600 for the PUSCH scheduled by DCI format 0_0.

For example, the spatial filter set 1600 need not include the spatial filter associated with the default spatial relation information for the PUSCH scheduled by DCI format 0_1. For example, the terminal apparatus 1 need not include the spatial filter associated with the default spatial relation information in the spatial filter set 1600 for the PUSCH scheduled by DCI format 0_1, regardless of whether or not the terminal apparatus 1 determines the default spatial relation information.

For example, the spatial filter set 1600 may at least include multiple spatial filters associated with any one of multiple pieces of spatial relation information indicated by the SRS resource indication field for the PUSCH scheduled by DCI format 0_1 including the SRS resource indication field.

For example, the list of pieces of spatial relation information including more than one piece of spatial relation information for the PUSCH may be reported using RRC signaling, and the SRS resource indication field may be used for indicating a subset of the more than one piece of spatial relation information. The subset may at least include one or multiple pieces of spatial relation information. Here, the spatial filter set 1600 may at least include one or multiple spatial filters associated with any one of the one or multiple pieces of spatial relation information.

For example, in a case that the SRS resource indication field indicates a first subset of the more than one piece of spatial relation information, the spatial filter set 1600 may at least include one or multiple spatial filters associated with any one of one or multiple pieces of spatial relation information included in the first subset. For example, in a case that the SRS resource indication field indicates a second subset of the more than one piece of spatial relation information, the spatial filter set 1600 may at least include one or multiple spatial filters associated with any one of one or multiple pieces of spatial relation information included in the second subset. For example, the second subset may be different from the first subset.

For example, in a case that the codebook based transmission is configured for the PUSCH, and a format of a certain PUSCH includes multiple periods of the coherence period, the SRS resource indication field may indicate one or multiple pieces of spatial relation information. Here, the SRS resource indication field may be set so as to be able to indicate the subset of the list of pieces of spatial relation information indicated by RRC signaling. One or multiple spatial filters associated with any one of one or multiple pieces of spatial relation information included in the subset are included in the spatial filter set 1600. For example, the size of the SRS resource indication field may be given based at least on Expression (2).

$$\mathrm{ceil}\left(\log_2\left(\sum_{k=1}^{min(L_{max},N_{SRS})}\left(C_k^{N_{SRS}}\right)\right)\right) \qquad \text{[Expression 2]}$$

Here, $\log_2(P)$ is a function indicating the logarithm of P to base 2. $L_{max}$ is a prescribed value. For example, $L_{max}$ may be the maximum number of layers for the PUSCH supported by the terminal apparatus 1. The maximum number of layers for the PUSCH supported by the terminal apparatus 1 may be reported from the terminal apparatus 1 to the base station apparatus 3 by using RRC signaling. For example, $L_{max}$ may be determined by RRC signaling reported from the base station apparatus 3 to the terminal apparatus 1. Here, $N_{SRS}$ may be the number of pieces of spatial relation information included in the list of pieces of spatial relation information reported using RRC signaling. $C^{N_{SRS}}_k$ is a function indicating a total number of combinations for selecting k elements from $N_{SRS}$ elements.

For example, in a case that the codebook based transmission is configured for the PUSCH, and a format of a certain PUSCH is configured to include only one period of the coherence period, the SRS resource indication field may indicate one piece of spatial relation information. Here, the SRS resource indication field may be set so as to be able to indicate any one of the list of pieces of spatial relation information indicated by RRC signaling. For example, the size of the SRS resource indication field may be given based at least on Expression (3).

$$\mathrm{ceil}(\log_2(N_{SRS})) \qquad \text{[Expression 3]}$$

For example, in a case that the non-codebook based transmission is configured for the PUSCH, the SRS resource indication field may indicate one or multiple pieces of spatial relation information, regardless of the number of periods of the coherence period included in a format of a certain PUSCH. Here, the SRS resource indication field may be set so as to be able to indicate the subset of the list of pieces of spatial relation information indicated by RRC signaling. One or multiple spatial filters associated with any one of one or multiple pieces of spatial relation information included in the subset are included in the spatial filter set 1600. For example, the size of the SRS resource indication field may be given based at least on Expression (2).

For example, in a case that the non-codebook based transmission is configured for the PUSCH, and a format of a certain PUSCH includes multiple periods of the coherence period, the SRS resource indication field may indicate one or multiple pieces of spatial relation information. Here, the SRS resource indication field may be set so as to be able to indicate the subset of the list of pieces of spatial relation information indicated by RRC signaling. One or multiple spatial filters associated with any one of one or multiple pieces of spatial relation information included in the subset are included in the spatial filter set 1600. For example, the size of the SRS resource indication field may be given based at least on Expression (2).

For example, in a case that the non-codebook based transmission is configured for the PUSCH, and a format of a certain PUSCH includes only one period of the coherence period, the SRS resource indication field may indicate one or multiple pieces of spatial relation information. Here, the SRS resource indication field may be set so as to be able to indicate the subset of the list of pieces of spatial relation information indicated by RRC signaling. One or multiple spatial filters associated with any one of one or multiple pieces of spatial relation information included in the subset are included in the spatial filter set 1600. For example, the size of the SRS resource indication field may be given based at least on Expression (2).

For example, in a case that the list of pieces of spatial relation information including more than one piece of spatial relation information is reported using RRC signaling, the terminal apparatus 1 may expect to further receive a MAC CE command. Here, the MAC CE command may be any one of a first MAC CE command and a second MAC CE command. For example, the base station apparatus 3 may report the subset of the more than one piece of spatial relation information by using the first MAC CE command. For example, the terminal apparatus 1 may apply, to the PUCCH, a spatial filter associated with the spatial relation information determined based at least on reception of the first MAC CE command.

For example, the base station apparatus 3 may report, by using the second MAC CE command, the subset of more than one piece of spatial relation information reported using RRC signaling. For example, the terminal apparatus 1 may include, in the spatial filter set 1600, a spatial filter associated with any one of one or multiple pieces of spatial relation information included in the subset.

In FIG. 14, the spatial filter set 1600 may be replaced with a codebook set 1700. In FIG. 14, the spatial filter 16001 may be replaced with a codebook 17001. In FIG. 14, the spatial filter 16002 may be replaced with a codebook 17002. In FIG. 14, the spatial filter 16003 may be replaced with a codebook 17003. In FIG. 14, the spatial filter 16004 may be replaced with a codebook 17004. In the following, description related to the codebook set 1700 will be given.

For example, in the format of the PUSCH illustrated in FIG. 14, a different codebook may be applied to the PUSCH for each single period of the coherence period. For example, in a case that a format of a certain PUSCH includes Z periods of the coherence period, one codebook included in the codebook set 1700 may be applied to the PUSCH for each single period of the Z coherence periods. In example 1 of FIG. 14, the codebook 17001 is applied to the first one period of the coherence period, the codebook 17002 is applied to the second one period of the coherence period, the codebook 17003 is applied to the third one period of the coherence period, and the codebook 17004 is applied to the fourth one period of the coherence period. Here, the codebook 17001, the codebook 17002, the codebook 17003, and the codebook 17004 are included in the codebook set 1700.

For example, in a case that a format of a certain PUSCH includes Z periods of the coherence period, any one of W codebooks included in the codebook set 1700 may be applied, based on a prescribed pattern. In FIG. 14W=2 codebooks may be applied to the PUSCH, based on a prescribed pattern. In example 2 of FIG. 14, the codebook 17001 is applied to the first one period of the coherence period, the codebook 17002 is applied to the second one period of the coherence period, the codebook 17001 is applied to the third one period of the coherence period, and the codebook 17002 is applied to the fourth one period of the coherence period.

For example, the terminal apparatus 1 may apply multiple codebooks included in the codebook set 1700 to each single period of the coherence period, based on a prescribed pattern. For example, the terminal apparatus 1 may apply multiple codebooks included in the codebook set 1700 to each single period of the coherence period, based on a pattern selected by the terminal apparatus 1.

In other words, for example, in a case that a format of a certain PUSCH includes Z periods of the coherence period, the first codebook of the codebook set 1700 may be applied to the PUSCH in the first one period out of the Z periods. For example, the second codebook of the codebook set 1700 may be applied to the PUSCH in the second one period out of the Z periods.

For example, in a case that a field indicating one TPMI is included in the DCI format used for scheduling of the PUSCH, the codebook corresponding to the one TPMI may be included in the codebook set 1700. Further, one or multiple codebooks corresponding to any one of one or multiple TPMIs determined based on the one TPMI may be included in the codebook set 1700.

For example, in a case that the TPMI of index V is indicated by the DCI format used for scheduling of the PUSCH, the terminal apparatus 1 may determine W codebooks corresponding to any one from index V to index V+W−1. Here, the W codebooks are included in the codebook set 1700. For example, in a case that the TPMI of index V is indicated by the DCI format used for scheduling of the PUSCH, the terminal apparatus 1 may determine the W codebooks corresponding to any one of index V, V+1, . . . mod(V+W−2, $N_{TPMI}$), or mod(V+W−1, $N_{TPMI}$).

FIG. 15 is a diagram illustrating an example of a determination method of the codebook set 1700 according to an aspect of the present embodiment. Here, W=4 is assumed. In FIG. 15, the upper part indicates indexes of the TPMI, the middle part indicates the codebooks, and the lower part indicates whether or not the codebooks can be included in the codebook set 1700. Here, Y indicates that the codebook can be included in the codebook set 1700, and N indicates that the codebook cannot be included in the codebook set 1700. For example, in a case that the TPMI of index 3 is indicated by the DCI format used for scheduling of the PUSCH, and W=4, the terminal apparatus 1 may determine four codebooks corresponding to any one of indexes 3, 4, 5, or 7. Here, the four codebooks are included in the codebook set 1700. In other words, in determination of W codebooks by the terminal apparatus 1, the terminal apparatus 1 may determine the W codebooks, based on the codebooks that can be included in the codebook set 1700.

For example, information indicating whether or not the codebook can be included in the codebook set 1700 may be included in RRC signaling. For example, the information indicating whether or not the codebook can be included in the codebook set 1700 may be included in a MAC CE. For example, the information indicating whether or not the codebook can be included in the codebook set 1700 may be included in a DCI format.

For example, in determination of W codebooks, the codebook group may be taken into consideration. For example, the terminal apparatus 1 may determine the W codebooks so that only one type of codebook group is included in the W codebooks. Here, the W codebooks are included in the codebook set 1700. For example, in FIG. 15, in a case that the TPMI of index 10 is indicated by the DCI format for used for scheduling of the PUSCH, and W=4, the terminal apparatus 1 may determine four codebooks corresponding to any one of indexes 10, 11, 4, or 5.

For example, in determination of W codebooks, the codebook subgroup may be taken into consideration. For example, the terminal apparatus 1 may determine the W codebooks so that only one type of codebook subgroup is included in the W codebooks. Here, the W codebooks are included in the codebook set 1700. For example, in FIG. 15, in a case that the TPMI of index 10 is indicated by the DCI format used for scheduling of the PUSCH, and W=4, the terminal apparatus 1 may determine four codebooks corresponding to any one of indexes 10, 11, 9, or 10. In this manner, multiple same codebooks may be included in the W codebooks.

For example, in a format of a certain PUSCH, the coherence period for the spatial filter and the coherence period for precoding may be configured to have lengths different from each other. For example, in a format of a certain PUSCH, the coherence period for the spatial filter may be 4 slots, and the coherence period for precoding may be 1 slot. For example, each of the coherence period for the spatial filter and the coherence period for precoding may be reported using RRC signaling. For example, each of the coherence period for the spatial filter and the coherence period for precoding may be determined based at least on RRC signaling.

It is preferable that flexible formats of the PUSCH as illustrated in FIG. 9 are supported. For example, in a case that the terminal apparatus 1 supports multiple services (for example, a broadband service, a low-delay service, a service for automobiles, and the like), formats of the PUSCH preferable for respective services can be configured.

To support flexible formats of the PUSCH is also preferable for securing prescribed transmission power. For example, in a case that maximum transmission power per unit time is provided due to treaties, legal regulations of each country, or specifications in conformity with such or the like, by configuring the mapping period of the transport block in multiple slots, large maximum transmission power can be secured as compared to a case that the mapping period is configured in one slot.

At the same time, by configuring the mapping period of the transport block in multiple slots, there is a concern that an expected data rate (also referred to as a transmission rate, throughput, or the like) may deteriorate.

By changing the size of the transport block according to the mapping period of the transport block, it is at least expected that the above concern is dispelled.

The terminal apparatus 1 may determine the transport block, based at least on a part or all of the following procedure 1 to procedure 3. Procedure 1) Determine the number $N_{RE}$ of resource elements in a time length X4 Procedure 2) Determine an intermediate value of information bits (Intermediate number of information bits) $N_{info} = N_{RE} \cdot R \cdot Q_m \cdot v$ Procedure 3) Determine the size of the transport block Procedure 1 may further include at least a part or all of procedure 1a and procedure 1b. Procedure 1a) Determine $N^a_{RE} = N^{RB}_{sc} \cdot N^{sh}_{symb} - N^{PRB}_{DMRS} - N^{PRB}_{oh}$ Procedure 1b) Determine $N_{RE} = \min(X5, N^a_{RE}) \cdot n_{PRB}$ In procedure 1a, $N^{sh}_{symb}$ may be the number of OFDM symbols allocated for the PUSCH in the time length X4. $N^{PRB}_{DMRS}$ is an overhead value in consideration of the resource elements to which the DMRS for the PUSCH is mapped. $N^{PRB}_{DMRS}$ may be the number of resource elements per PRB, to which the DMRS is mapped in the OFDM symbols allocated for the PUSCH. $N^{PRB}_{oh}$ is a value in consideration of overhead due to elements other than the DMRS for the PUSCH. Here, the elements may at least include overhead due to mapping of the control resource set or the CSI-RS. Here, $N^{PRB}_{oh}$ is indicated by an RRC parameter. Also, in a case that the terminal apparatus 1 retains $N^{PRB}_{oh}$, it may be assumed that $N^{PRB}_{oh}$ is 0 in transmission of the message 3 PUSCH. In a case that the terminal apparatus 1 does not retain $N^{PRB}_{oh}$, it may be assumed that $N^{PRB}_{oh}$ is 0 in transmission of the PUSCH.

For example, X4 may be given by fourth control information. The fourth control information may be determined based at least on a part or all of an RRC parameter, higher layer signaling, an uplink grant used for scheduling of the PUSCH, and one DCI format.

Also, in a case that the terminal apparatus 1 retains the fourth control information, X4 may be 1 slot for the message 3 PUSCH.

For example, a case that the terminal apparatus 1 retains the fourth control information may be a case that the terminal apparatus 1 retains X4. For example, the fourth control information may be information indicating X4. For example, the fourth control information may be information used for determining X4, although being information other than information indicating X4.

Also, in a case that the terminal apparatus 1 retains the fourth control information, X4 may be 1 slot for the PUSCH scheduled by the random access response grant.

In a case that the terminal apparatus 1 does not retain the fourth control information, X4 may be 1 slot for the PUSCH.

For example, the fourth control information may be the mapping period of the transport block. For example, the time length X4 may be given based at least on that the mapping period of the transport block is X0. For example, the time length X4 may be determined based at least on that the mapping period of the transport block is X0. For example, the terminal apparatus 1 may determine the time length X4, based at least on that the mapping period of the transport block is X0. For example, the base station apparatus 3 may determine the time length X4, based at least on that the mapping period of the transport block is X0.

For example, the fourth control information may be the mapping period of the sequence of the modulation symbols. For example, the time length X4 may be given based at least on that the mapping period of the sequence of the modulation symbols is X1. For example, the time length X4 may be determined based at least on that the mapping period of the sequence of the modulation symbols is X1. For example, the terminal apparatus 1 may determine the time length X4, based at least on that the mapping period of the sequence of the modulation symbols is X1. For example, the base station apparatus 3 may determine the time length X4, based at least on that the mapping period of the sequence of the modulation symbols is X1.

For example, X4 may be given based at least on the configuration of the PUSCH scheduled by one uplink grant in the time domain. For example, X4 may be determined based at least on the configuration of the PUSCH scheduled by one uplink grant in the time domain. For example, the terminal apparatus 1 may determine X4, based at least on the configuration of the PUSCH scheduled by one uplink grant in the time domain. For example, the base station apparatus 3 may determine X4, based at least on the configuration of the PUSCH scheduled by one uplink grant in the time domain.

By controlling X4 based at least on the configuration of the PUSCH in the time domain, a desired data rate may be able to be implemented regardless of the configuration of the PUSCH in the time domain. For example, configuring X4 to 10 slots in a case that the time resources of the PUSCH are 10 slots, a data rate, which is nearly as high as that in a case that X4 is configured to 1 slot in a case that the time resources of the PUSCH are 1 slot, can be expected.

For example, in a case that the configuration of the PUSCH in the time domain is first configuration, X4 may be a first value. In a case that the configuration of the PUSCH in the time domain is second configuration different from the first configuration, X4 may be a second value different from the first value. For example, in a case that the time resources of the PUSCH have a first slot number, X4 may be the first value. In a case that the time resources of the PUSCH are a second slot different from the first slot, X4 may be the second value different from the first value.

For example, X4 may be given based at least on X0. For example, X4 may be determined based at least on X0. For example, the terminal apparatus 1 may determine X4, based at least on X0. For example, the base station apparatus 3 may determine X4, based at least on X0.

By controlling X4 based at least on X0, a prescribed data rate may be able to be implemented regardless of the mapping period of the transport block. For example, by configuring X4 to 10 slots in a case that X0 is 10 slots, a data rate, which is nearly as high as a case that X4 is configured to 1 slot in a case that X0 is 1 slot, can be expected.

For example, in a case that X0 is the first value, X4 may be the second value. In a case that X0 is a third value different from the first value, X4 may be a fourth value different from the second value.

For example, X4 may be given based at least on X1. For example, X4 may be determined based at least on X1. For example, the terminal apparatus 1 may determine X4, based at least on X1. For example, the base station apparatus 3 may determine X4, based at least on X1.

By controlling X4 based at least on X1, a prescribed data rate may be able to be implemented regardless of the mapping period of the modulation symbols. For example, configuring X4 to 10 slots in a case that X1 is 10 slots, a data rate, which is nearly as high as that in a case that X4 is configured to 1 slot for a case of X1 being 1 slot, can be expected.

For example, in a case that X1 is the first value, X4 may be the second value. In a case that X1 is a third value different from the first value, X4 may be a fourth value different from the second value.

For example, X4 may be given based at least on X2. For example, X4 may be determined based at least on X2. For example, the terminal apparatus 1 may determine X4, based at least on X2. For example, the base station apparatus 3 may determine X4, based at least on X2.

By controlling X4 based at least on X2, a prescribed data rate may be able to be implemented regardless of the mapping period of the DMRS. For example, configuring X4 to 10 slots in a case that X2 is 10 slots, a data rate, which is nearly as high as that in a case that X4 is configured to 1 slot for a case of X2 being 1 slot, can be expected.

For example, in a case that X2 is the first value, X4 may be the second value. In a case that X2 is a third value different from the first value, X4 may be a fourth value different from the second value.

For example, X4 may be given based at least on X3. For example, X4 may be determined based at least on X3. For example, the terminal apparatus 1 may determine X4, based at least on X3. For example, the base station apparatus 3 may determine X4, based at least on X3.

By controlling X4 based at least on X3, a prescribed data rate may be able to be implemented regardless of the coherence period. For example, configuring X4 to 10 slots in a case that X3 is 10 slots, a data rate, which is nearly as high as that in a case that X4 is configured to 1 slot for a case of X3 being 1 slot, can be expected.

For example, in a case that X3 is the first value, X4 may be the second value. In a case that X3 is a third value different from the first value, X4 may be a fourth value different from the second value.

For example, in procedure 1b, $n_{PRB}$ may be the number of PRBs allocated for the PUSCH.

For example, X5 may be determined based at least on fifth control information. The fifth control information may be determined based at least on at least any one of an RRC parameter, higher layer signaling, an uplink grant used for scheduling of the PUSCH, or one DCI format.

For example, also in a case that the terminal apparatus 1 retains the fifth control information, X5 may be 156 REs for the message 3 PUSCH.

For example, a case that the terminal apparatus 1 retains the fifth control information may be a case that the terminal apparatus 1 retains X5. For example, the fifth control information may be information indicating X5. For example, the fourth control information may be information used for determining X5, although being information other than information indicating X5.

For example, also in a case that the terminal apparatus 1 retains the fifth control information, X5 may be 156 REs for the PUSCH scheduled by the random access response grant.

For example, in a case that the terminal apparatus 1 does not retain the fifth control information, X5 may be 156 REs for the PUSCH.

For example, X5 may be given based at least on the configuration of the PUSCH scheduled by one uplink grant in the time domain. For example, X5 may be determined based at least on the configuration of the PUSCH scheduled by one uplink grant in the time domain. For example, the terminal apparatus 1 may determine X5, based at least on the configuration of the PUSCH scheduled by one uplink grant in the time domain. For example, the base station apparatus 3 may determine X5, based at least on the configuration of the PUSCH scheduled by one uplink grant in the time domain.

For example, X5 may be given based at least on X0. For example, X5 may be determined based at least on X0. For example, the terminal apparatus 1 may determine X5, based at least on X0. For example, the base station apparatus 3 may determine X5, based at least on X0.

For example, X5 may be given based at least on X1. For example, X5 may be determined based at least on X1. For example, the terminal apparatus 1 may determine X5, based at least on X1. For example, the base station apparatus 3 may determine X5, based at least on X1.

For example, X5 may be given based at least on X2. For example, X5 may be determined based at least on X2. For example, the terminal apparatus 1 may determine X5, based at least on X2. For example, the base station apparatus 3 may determine X5, based at least on X2.

For example, X5 may be given based at least on X3. For example, X5 may be determined based at least on X3. For example, the terminal apparatus 1 may determine X5, based at least on X3. For example, the base station apparatus 3 may determine X5, based at least on X3.

For example, X5 may be given based at least on X4. For example, X5 may be determined based at least on X4. For example, the terminal apparatus 1 may determine X5, based at least on X4. For example, the base station apparatus 3 may determine X5, based at least on X4.

X5 is a value estimated as a total number of resource elements allocated to data for X4 slots, and thus it is preferable to control X5, based on X4.

For example, in a case that X4 is the first value, X5 may be the second value. In a case that X4 is a third value different from the first value, X5 may be a fourth value different from the second value.

In procedure 2, R is a target coding rate determined by a value of the MCS field included in the uplink grant. In procedure 2, $Q_m$ is an order of the modulation scheme of the PUSCH, or a modulation order of the PUSCH. In procedure 2, ν is the number of layers of the PUSCH. The number of layers is also referred to as a spatial multiplexing number or the like. In other words, the layers may be the number of spatial streams.

In procedure 3, switch between procedure 3a and procedure 3c is performed based on the value of $N_{info}$. For example, in a case that the value of $N_{info}$ is equal to or less than a prescribed value, procedure 3a may be performed. In a case that the value of $N_{info}$ exceeds the prescribed value, procedure 3c may be performed. Here, for example, the prescribed value may be 3824.

In procedure 3a, $N^a_{info}$ is given by $N^a_{info}=\max(24, \text{floor}(N_{info}/2)\cdot 2^{-n})$. In procedure 3a, $n=\max(3, \text{floor}(N_{info})-6)$.

For example, after procedure 3a is performed, procedure 3b may be performed.

In procedure 3b, one value is selected from candidate values of the size of the transport block included in a prescribed table. Here, as the candidate values of the TBS, the prescribed table may at least include a part or all of 24, 32, 40, 48, 56, 64, 72, 80, 88, 96, 104, 112, 120, 128, 136, 144, 152, 160, 168, 176, 184, 192, 208, 224, 240, 256, 272, 288, 304, 320, 336, 352, 368, 384, 408, 432, 456, 480, 504, 528, 552, 576, 608, 640, 672, 704, 736, 768, 808, 848, 888, 928, 984, 1032, 1064, 1128, 1160, 1192, 1224, 1256, 1288, 1320, 1352, 1416, 1480, 1544, 1608, 1672, 1736, 1800, 1864, 1928, 2024, 2088, 2152, 2216, 2280, 2408, 2472, 2536, 2600, 2664, 2728, 2792, 2856, 2976, 3104, 3240, 3368, 3496, 3624, 3753, and 3824. In other words, the prescribed table may include a set of integer values within the range of not exceeding the prescribed value.

For example, in procedure 3b, a candidate value of the TBS whose value is closest to $N^a_{info}$ within the range of not falling below $N^a_{info}$ may be determined from the prescribed table.

In procedure 3c, $N^a_{info}$ is given by $N^a_{info}=\max(3840, 2^n \text{round}((N_{info}\cdot 24)/2^n))$. In procedure 3c, $N^a_{info}$ is given by $n=\text{floor}(\log 2(N_{info}-24))-5$.

For example, after procedure 3c is performed, procedure 3d may be performed.

In procedure 3d, a size $N_{TBS}$ of the transport block is determined. For example, in a case that R is equal to or less than ¼, $N_{TBS}$ is given by $N_{TBS}=8\cdot C\cdot\text{ceil}((N^a_{info}+24)/(8\cdot C))-24$. Here, $N_{TBS}$ is given by $C=\text{ceil}((N^a_{info}+24)/3816)$.

In procedure 3d, for example, in a case that R exceeds ¼, and $N^a_{info}$ exceeds 8424, $N_{TBS}$ is given by $N_{TBS}=8\cdot C\cdot\text{ceil}((N^a_{info}+24)/(8\cdot C))-24$. Here, $N_{TBS}$ is given by $C=\text{ceil}((N^a_{info}+24)/8424)$.

In procedure 3d, for example, in a case that R exceeds ¼, and $N^a_{info}$ is equal to or less than 8424, $N_{TBS}$ is given by $N_{TBS}=8\cdot\text{ceil}((N^a_{info}+24)/8)-24$.

As the mapping period of the transport block is larger, there is a concern that an expected data rate may deteriorate. In view of this, it is preferable to introduce a scheme of controlling the size of the transport block in consideration of a case that the mapping period of the transport block increases.

For example, control of the target coding rate R may be performed. Here, the target coding rate R may be a value exceeding 1. Provided that the mapping period X0 of the transport block is 1 slot in a case that the target coding rate R exceeds 1, it is expected that an effective coding rate of the transport block exceeds 1, and thus communication is not available in general. In contrast, provided that the mapping period X0 of the transport block is a value exceeding 1 slot even in a case that the mapping period of the transport block is a value exceeding 1, the effective coding rate of the transport block falls below 1, and thus preferable communication can be implemented.

For example, the target coding rate R may be a value exceeding a prescribed value. The prescribed value may be a value within a range from 0.93 to 1. The prescribed value is a value close to the effective coding rate supported in New Radio.

A target coding rate Rmax supported in New Radio is approximately 948/1024. In other words, the prescribed value may be a value close to the target coding rate Rmax supported in New Radio.

The effective coding rate may be calculated by dividing the size of the transport block by a product of the number of resource elements of the PUSCH included in a period in which the transport block is mapped and the order of the modulation scheme of the PUSCH.

The MCS field included in the uplink grant used for scheduling of the PUSCH may indicate one index. Here, in a first case, the target coding rate may be given based on a first MCS table and the one index. In a second case, the target coding rate may be given based on a second MCS table and the one index. Here, all of the target coding rates included in the first MCS table may be equal to or less than the prescribed value. At least a part of the target coding rates included in the first MCS table may exceed the prescribed value. All of the target coding rates corresponding to QPSK modulation out of all of the target coding rates included in the first MCS table may be equal to or less than the prescribed value. At least a part of target coding rates corresponding to QPSK out of the target coding rates included in the first MCS table may exceed the prescribed value.

The terminal apparatus 1 may determine whether to refer to the first MCS table or refer to the second MCS table, based on the index indicated by the MCS field included in the uplink grant used for scheduling of the PUSCH.

The base station apparatus 3 may determine whether to refer to the first MCS table or refer to the second MCS table, based on the index indicated by the MCS field included in the uplink grant used for scheduling of the PUSCH.

For example, the first case may be a case that the CRC sequence added to the DCI format of the uplink grant is scrambled with the C-RNTI, a signal waveform of the PUSCH is DFT-s-OFDM, and the mapping period X0 of the transport block is 1 slot.

For example, the first case may be a case that the CRC sequence added to the DCI format of the uplink grant is scrambled with the C-RNTI, the signal waveform of the PUSCH is DFT-s-OFDM, and the mapping period X1 of the sequence of the modulation symbols is 1 slot.

For example, the second case may be a case that the CRC sequence added to the DCI format of the uplink grant is scrambled with the C-RNTI, the signal waveform of the PUSCH is the DFT-s-OFDM, and the mapping period X0 of the transport block is an integer exceeding 1 slot.

For example, the second case may be a case that the CRC sequence added to the DCI format of the uplink grant is scrambled with the C-RNTI, the signal waveform of the PUSCH is the DFT-s-OFDM, and the mapping period X1 of the sequence of the modulation symbols exceeds 1 slot.

In addition, the target coding rate may be given to a third case, based on a third MCS table and the one index.

The third case may be a case that the CRC sequence added to the DCI format of the uplink grant is scrambled with the C-RNTI, the signal waveform of the PUSCH is the DFT-s-OFDM, the mapping period X0 of the transport block is 1 slot, and an RRC parameter indicating that the third MCS table is configured is retained by the terminal apparatus 1.

The third case may be a case that the CRC sequence added to the DCI format of the uplink grant is scrambled with the C-RNTI, the signal waveform of the PUSCH is the DFT-s-

OFDM, the mapping period X1 of the sequence of the modulation symbols is 1 slot, and an RRC parameter indicating that the third MCS table is configured is retained by the terminal apparatus 1.

For example, the first table may include a modulation scheme whose order is that of 64QAM or lower. The first table need not include a modulation scheme whose order exceeds that of 64QAM (for example, 256QAM or the like).

For example, the second table may include a modulation scheme whose order is that of 64QAM or lower. The second table need not include a modulation scheme whose order exceeds that of 64QAM (for example, 256QAM or the like).

For example, the third table may include a modulation scheme whose order exceeds that of 64QAM (for example, 256QAM or the like).

Also, in the second case, the first table may be used for the message 3 PUSCH. Also, in the second case, the first table may be used for the PUSCH scheduled by the random access response grant.

For example, the target coding rate R may be given based at least on the configuration of the PUSCH scheduled by one uplink grant in the time domain. For example, the target coding rate R may be determined based at least on the configuration of the PUSCH scheduled by one uplink grant in the time domain. For example, the terminal apparatus 1 may determine the target coding rate R, based at least on the configuration of the PUSCH scheduled by one uplink grant in the time domain. For example, the base station apparatus 3 may determine the target coding rate R, based at least on the configuration of the PUSCH scheduled by one uplink grant in the time domain.

By controlling the target coding rate R based at least on the configuration of the PUSCH in the time domain, a desired data rate may be able to be implemented regardless of the configuration of the PUSCH in the time domain. For example, by configuring the target coding rate R to approximately 4 in a case that the time resources of the PUSCH are 10 slots, a data rate, which is nearly as high as that in a case that the target coding rate R is configured to 0.4 for a case of the time resources of the PUSCH being 1 slot, can be expected.

For example, in a case that the configuration of the PUSCH in the time domain is first configuration, the target coding rate R may be a first value. In a case that the configuration of the PUSCH in the time domain is second configuration different from the first configuration, the target coding rate R may be a second value different from the first value. For example, in a case that the time resources of the PUSCH have a first slot number, the target coding rate R may be the first value. In a case that the time resources of the PUSCH are a second slot different from the first slot, the target coding rate R may be a second value different from the first value.

For example, the target coding rate R may be given based at least on X0. For example, the target coding rate R may be determined based at least on X0. For example, the terminal apparatus 1 may determine the target coding rate R, based at least on X0. For example, the base station apparatus 3 may determine the target coding rate R, based at least on X0.

By controlling the target coding rate R based at least on X0, a prescribed data rate may be able to be implemented regardless of the mapping period of the transport block. For example, by configuring the target coding rate R to approximately 4 in a case that X0 is 10 slots, a data rate, which is nearly as high as that in a case that the target coding rate R is configured to approximately 0.4 in a case that X0 is 1 slot, can be expected.

For example, in a case that X0 is the first value, the target coding rate R may be the second value. In a case that X0 is a third value different from the first value, the target coding rate R may be a fourth value different from the second value.

For example, the target coding rate R may be given based at least on X1. For example, the target coding rate R may be determined based at least on X1. For example, the terminal apparatus 1 may determine the target coding rate R, based at least on X1. For example, the base station apparatus 3 may determine the target coding rate R, based at least on X1.

By controlling the target coding rate R based at least on X1, a prescribed data rate may be able to be implemented regardless of the mapping period of the modulation symbols. For example, by configuring the target coding rate R to approximately 4 in a case that X1 is 10 slots, a data rate, which is nearly as high as that in a case that the target coding rate R is configured to approximately 0.4 for a case of X1 being 1 slot, can be expected.

For example, in a case that X1 is the first value, the target coding rate R may be the second value. In a case that X1 is a third value different from the first value, the target coding rate R may be a fourth value different from the second value.

For example, the target coding rate R may be given based at least on X2. For example, the target coding rate R may be determined based at least on X2. For example, the terminal apparatus 1 may determine the target coding rate R, based at least on X2. For example, the base station apparatus 3 may determine the target coding rate R, based at least on X2.

By controlling the target coding rate R based at least on X2, a prescribed data rate may be able to be implemented regardless of the mapping period of the DMRS. For example, by configuring the target coding rate R to approximately 4 in a case that X2 is 10 slots, a data rate, which is nearly as high as that in a case that the target coding rate R is configured to 0.4 for a case of X2 being 1 slot, can be expected.

For example, in a case that X2 is the first value, the target coding rate R may be the second value. In a case that X2 is a third value different from the first value, the target coding rate R may be a fourth value different from the second value.

For example, the target coding rate R may be given based at least on X3. For example, the target coding rate R may be determined based at least on X3. For example, the terminal apparatus 1 may determine the target coding rate R, based at least on X3. For example, the base station apparatus 3 may determine the target coding rate R, based at least on X3.

By controlling the target coding rate R based at least on X3, a prescribed data rate may be able to be implemented regardless of the coherence period. For example, by configuring the target coding rate R to approximately 4 in a case that X3 is 10 slots, a data rate, which is nearly as high as that in a case that the target coding rate R is configured to approximately 0.4 for a case of X3 being 1 slot, can be expected.

For example, in a case that X3 is the first value, the target coding rate R may be the second value. In a case that X3 is a third value different from the first value, the target coding rate R may be a fourth value different from the second value.

For example, in the procedure of determining the size of the transport block (a part or all of procedure 1 to procedure 3), the size of the transport block may be controlled.

For example, a first operator may be used for control of the size of the transport block. In other words, the first operator may act on at least any one of variables in the procedure, and be used for controlling the size of the transport block.

For example, in a case that the mapping period X0 of the transport block exceeds 1 slot, a first size of the transport block may be given based at least on the first operator. For example, in the case that the mapping period X0 of the transport block exceeds 1 slot, the size of the transport block may be determined based at least on the first operator. For example, in the case that the mapping period X0 of the transport block exceeds 1 slot, the terminal apparatus 1 may determine the size of the transport block, based at least on the first operator. For example, in the case that the mapping period X0 of the transport block exceeds 1 slot, the base station apparatus 3 may determine the size of the transport block, based at least on the first operator.

For example, in a case that the mapping period X0 of the transport block is 1 slot, a second size of the transport block may be given not based on the first operator. For example, in the case that the mapping period X0 of the transport block is 1 slot, the size of the transport block may be determined not based on the first operator. For example, in the case that the mapping period X0 of the transport block is 1 slot, the terminal apparatus 1 may determine the size of the transport block, not based on the first operator. For example, in a case that the mapping period X0 of the transport block is 1 slot, the base station apparatus 3 may determine the size of the transport block, not based on the first operator. Here, the first operator may be an operator that acts so that the first size is larger than the second size. Here, values of various parameters used for determination of the first size may be the same as values of various parameters used for determination of the second size.

For example, in a case that the mapping period X1 of the sequence of the modulation symbols exceeds 1 slot, the first size of the transport block may be given based at least on the first operator. For example, in the case that the mapping period X1 of the sequence of the modulation symbols exceeds 1 slot, the size of the transport block may be determined based at least on the first operator. For example, in the case that the mapping period X1 of the sequence of the modulation symbols exceeds 1 slot, the terminal apparatus 1 may determine the size of the transport block, based at least on the first operator. For example, in the case that the mapping period X1 of the sequence of the modulation symbols exceeds 1 slot, the base station apparatus 3 may determine the size of the transport block, based at least on the first operator.

For example, in a case that the mapping period X1 of the sequence of the modulation symbols is 1 slot, the second size of the transport block may be given not based on the first operator. For example, in the case that the mapping period X1 of the sequence of the modulation symbols is 1 slot, the size of the transport block may be determined not based on the first operator. For example, in the case that the mapping period X1 of the sequence of the modulation symbols is 1 slot, the terminal apparatus 1 may determine the size of the transport block, not based on the first operator. For example, in the case that the mapping period X1 of the sequence of the modulation symbols is 1 slot, the base station apparatus 3 may determine the size of the transport block, not based on the first operator. Here, the first operator may be an operator that acts so that the first size is larger than the second size. Here, values of various parameters used for determination of the first size may be the same as values of various parameters used for determination of the second size.

For example, the first operator may be used in procedure 1a related to determination of the size of the transport block. For example, in procedure 1a, $N^a_{RE}$ may be controlled based at least on the first operator. For example, in procedure 1a, $N^{RB}_{sc} \cdot N^{sh}_{symb}$ may be multiplied by a value given as the first operator. Here, the value given as the first operator may be a value exceeding 1. For example, in procedure 1a, the value given as the first operator may be $N^{PRB}_{oh}$. For example, in procedure 1a, $N^a_{RE}$ may be given by $N^a_{RE}=N^{RB}_{sc} \cdot N^{sh}_{symb}-N^{PRS}_{DMRS}-N^{PRS}_{oh}+X$, and X may be the value given as the first operator.

For example, the first operator may be used in procedure 1b related to determination of the size of the transport block. For example, in procedure 1b, $N_{RE}$ may be controlled based at least on the first operator. For example, in procedure 1b, $\min(X5, N^a_{RE}) \cdot n_{PRB}$ may be multiplied by the value given as the first operator. For example, in procedure 1b, X5 may be multiplied by the value given as the first operator. For example, in procedure 1b, $N^a_{RE}$ may be multiplied by the value given as the first operator. For example, in procedure 1b, $N_{RE}$ may be given by $N_{RE}=\min(X5, N^a_{RE}) \cdot n_{PRB}+X$, and X may be the value given as the first operator.

For example, the first operator may be at least used in procedure 2 related to determination of the size of the transport block. For example, in procedure 2, $N_{info}=N_{RE} \cdot R \cdot Q_m \cdot v$ may be multiplied by the value given as the first operator. For example, in procedure 2, $N_{info}$ may be given by $N_{info}=N_{RE} \cdot R \cdot Q_m \cdot v+X$, and X may be the value given as the first operator.

For example, the first operator may be at least used in procedure 3 related to determination of the size of the transport block. For example, $N_{TBS}$ may be given by $N_{TBS}=8 \cdot C \cdot \text{ceil}((N^a_{info}+24)/(8 \cdot C)) \cdot X-24$, and X may be the value given as the first operator. For example, $N_{TBS}$ may be given by $N_{TBS}=8 \cdot C \cdot \text{ceil}((N^a_{info}+24) \cdot X/(8 \cdot C))-24$, and X may be the value given as the first operator. For example, $N_{TBS}$ is may be given by $N_{TBS}=8 \cdot C \cdot \text{ceil}((N^a_{info} \cdot X+24)/(8 \cdot C))-24$, and X may be the value given as the first operator. For example, $N_{TBS}$ may be given by $N_{TBS}=8 \cdot C \cdot \text{ceil}((N^a_{info}+24)/(8 \cdot C))-24+X$, and X may be the value given as the first operator.

For example, the first operator may be at least used for $N_{TBS}$. For example, the size of the transport block may be given by multiplying $N_{TBS}$ by the value given as the first operator.

The first operator may be determined based at least on sixth control information. For example, the sixth control information may be determined based at least on at least any one of an RRC parameter, higher layer signaling, an uplink grant used for scheduling the PUSCH, or one DCI format.

For example, a case that the terminal apparatus 1 retains the sixth control information may be a case that the terminal apparatus 1 retains X6. For example, the sixth control information may be information indicating X6. For example, the sixth control information may be information used for determining X6, although being information other than information indicating X6.

Also, in a case that the terminal apparatus 1 retains the sixth control information, the first operator need not be used in determination of the size of the transport block included in the message 3 PUSCH.

Also, in a case that the terminal apparatus 1 retains the sixth control information, the first operator need not be used in determination of the size of the transport block included in the PUSCH scheduled by the random access response grant.

In a case that the terminal apparatus 1 does not retain the sixth control information, the first operator need not be used in determination of the size of the transport block included in the PUSCH.

For example, X6 may be given based at least on the configuration of the PUSCH scheduled by one uplink grant in the time domain. For example, X6 may be determined based at least on the configuration of the PUSCH scheduled by one uplink grant in the time domain. For example, the terminal apparatus 1 may determine X6, based at least on the configuration of the PUSCH scheduled by one uplink grant in the time domain. For example, the base station apparatus 3 may determine X6, based at least on the configuration of the PUSCH scheduled by one uplink grant in the time domain.

By controlling X6 based at least on the configuration of the PUSCH in the time domain, a desired data rate may be able to be implemented regardless of the configuration of the PUSCH in the time domain.

For example, in a case that the configuration of the PUSCH in the time domain is first configuration, X6 may be a first value. In a case that the configuration of the PUSCH in the time domain is second configuration different from the first configuration, X6 may be a second value different from the first value. For example, in a case that the time resources of the PUSCH have a first slot number, X6 may be the first value. In a case that the time resources of the PUSCH are a second slot different from the first slot, X6 may be the second value different from the first value.

For example, X6 may be given based at least on X0. For example, X6 may be determined based at least on X0. For example, the terminal apparatus 1 may determine X6, based at least on X0. For example, the base station apparatus 3 may determine X6, based at least on X0.

By controlling X6 based at least on X0, a prescribed data rate may be able to be implemented regardless of the mapping period of the transport block.

For example, in a case that X0 is the first value, X6 may be the second value. In a case that X0 is a third value different from the first value, X6 may be a fourth value different from the second value.

For example, X6 may be given based at least on X1. For example, X6 may be determined based at least on X1. For example, the terminal apparatus 1 may determine X6, based at least on X1. For example, the base station apparatus 3 may determine X6, based at least on X1.

By controlling the target coding rate R based at least on X1, a prescribed data rate may be able to be implemented regardless of the mapping period of the sequence of the modulation symbols.

For example, in a case that X1 is the first value, X6 may be the second value. In a case that X1 is a third value different from the first value, X6 may be a fourth value different from the second value.

For example, X6 may be given based at least on X2. For example, X6 may be determined based at least on X2. For example, the terminal apparatus 1 may determine X6, based at least on X2. For example, the base station apparatus 3 may determine X6, based at least on X2.

By controlling the target coding rate R based at least on X2, a prescribed data rate may be able to be implemented regardless of the mapping period of the DMRS.

For example, in a case that X2 is the first value, X6 may be the second value. In a case that X2 is a third value different from the first value, X6 may be a fourth value different from the second value.

For example, X6 may be given based at least on X3. For example, X6 may be determined based at least on X3. For example, the terminal apparatus 1 may determine X6, based at least on X3. For example, the base station apparatus 3 may determine X6, based at least on X3.

By controlling the target coding rate R based at least on X3, a prescribed data rate may be able to be implemented regardless of the coherence period.

For example, in a case that X3 is the first value, X6 may be the second value. In a case that X3 is a third value different from the first value, X6 may be a fourth value different from the second value.

For example, X6 may be given based at least on X4. For example, X6 may be determined based at least on X4. For example, the terminal apparatus 1 may determine X6, based at least on X4. For example, the base station apparatus 3 may determine X6, based at least on X4.

By controlling X6 based at least on X4, a prescribed data rate may be able to be implemented regardless of a determination method of the size of the transport block.

For example, in a case that X4 is the first value, X6 may be the second value. In a case that X4 is a third value different from the first value, X6 may be a fourth value different from the second value.

Figure 16:
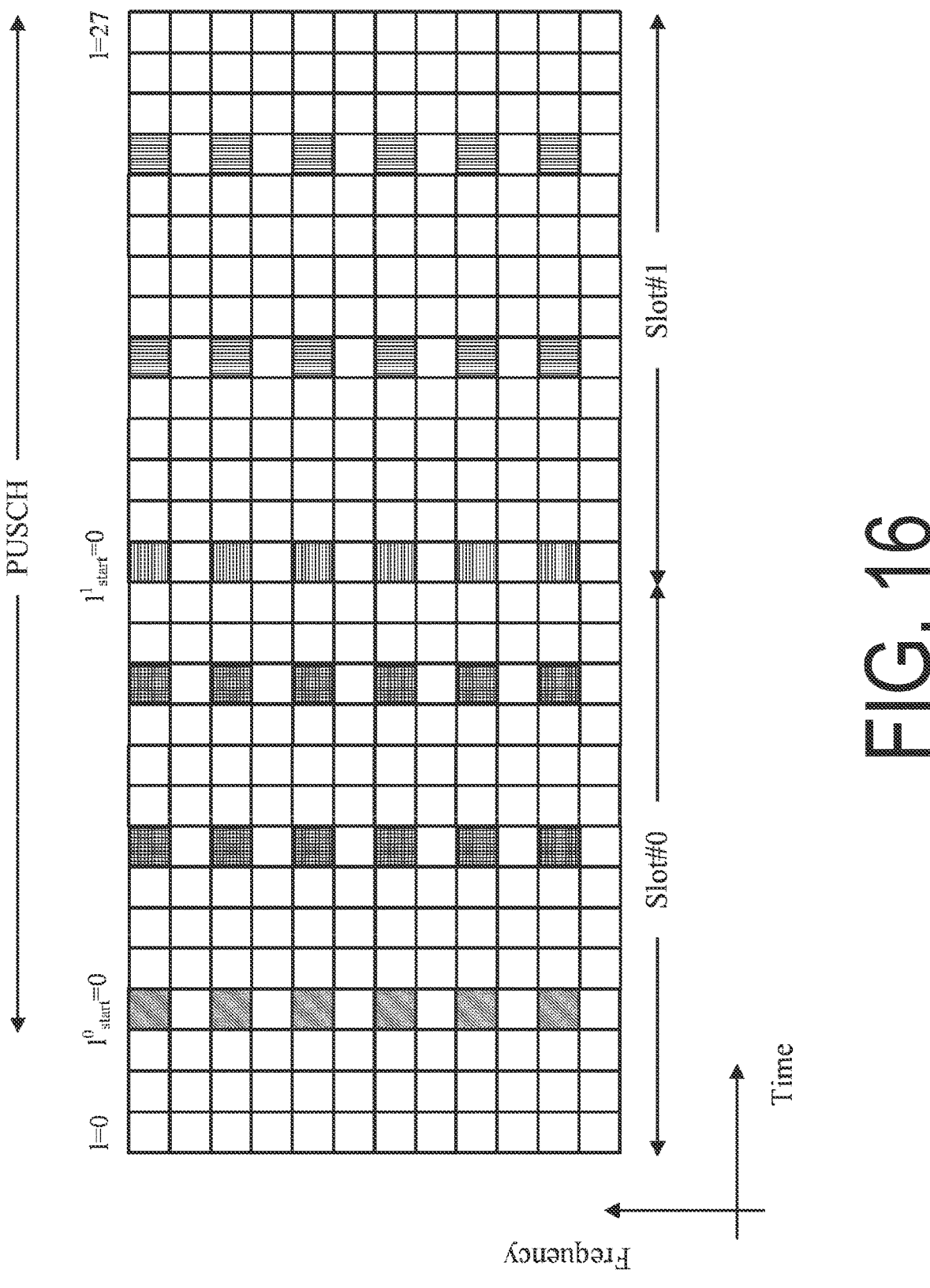
FIG. 16 is a diagram illustrating a mapping example of a DMRS for the PUSCH according to an aspect of the present embodiment.

FIG. 16 is a diagram illustrating a mapping example of the DMRS for the PUSCH according to an aspect of the present embodiment. In FIG. 16, it is assumed that the mapping period of the DMRS for the PUSCH is 1 slot. In FIG. 16, the horizontal axis indicates the time axis, and the vertical axis indicates the frequency axis. In the time domain of FIG. 16, resource elements corresponding to OFDM symbols corresponding to 2 slots are illustrated. In the frequency domain of FIG. 16, resource elements corresponding to 1 PRB are illustrated. 28 OFDM symbols illustrated in FIG. 16 are assigned with indexes of l=0 to l=27 in ascending order in the time domain. In FIG. 16, a configuration that the PUSCH is mapped from OFDM symbol l=3 to l=27 is illustrated.

For example, mapping of the DMRS may be given based at least on a reference point $l_{start}$ and a mapping pattern. For example, mapping of the DMRS may be determined based at least on a reference point $l_{start}$ and a mapping pattern. For example, the terminal apparatus 1 may determine mapping of the DMRS, based at least on a reference point $l_{start}$ and a mapping pattern. For example, the base station apparatus 3 may determine mapping of the DMRS, based at least on a reference point $l_{start}$ and a mapping pattern.

The mapping pattern may at least include a set of OFDM symbol indexes to which the DMRS is mapped. Here, a point of OFDM symbol index l=0 in the mapping pattern of the DMRS is defined as the reference point $l_{start}$.

In FIG. 16, a reference point $l^0_{start}$ ma for slot #0 is set to a point at which transmission of the PUSCH is started in slot #0 (in other words, a point of OFDM symbol index l=3). In other words, OFDM symbol index l=3 is the reference point $l^0_{start}$ for slot #0. Here, the mapping pattern for slot #0 is 0, 4, and 8, and thus the DMRS is mapped to the resource elements hatched with oblique lines and grid lines. As illustrated in FIG. 16, the DMRS may be mapped at certain intervals in the frequency direction. In particular, the DMRS of the resource elements with oblique lines is also referred to as a front-loaded DMRS (flont-loaded DMRS). The DMRS of the resource elements with grid lines is also referred to as an additional DMRS.

In FIG. 16, a reference point $l^1_{start}$ for slot #1 is set to a point at which transmission of the PUSCH is started in slot #1 (in other words, a point of OFDM symbol index l=14). In other words, OFDM symbol index l=14 is the reference point $l^1_{start}$ for slot #0. Here, the mapping pattern for slot #1 is 0, 5, and 10, and thus the DMRS is mapped to the resource elements hatched with oblique lines and grid lines. In particular, the DMRS of the resource elements with horizontal lines is also referred to as a front-loaded DMRS. The DMRS of the resource elements with vertical lines is also referred to as an additional DMRS.

As also illustrated in FIG. 16, the mapping pattern of the DMRS may be different for each slot, or may be configured for each slot. For example, the mapping pattern of the DMRS may be determined based on the number of OFDM symbols used for the PUSCH in the slot.

Sparse mapping of the DMRS in the time domain as illustrated in FIG. 16 is preferable in an environment in which the terminal apparatus 1 is moving at high speed, but may not be efficient use of resources in a case that the terminal apparatus 1 is moving at low speed or the terminal apparatus 1 is not moving. In view of this, in a case that the PUSCH is mapped across multiple slots, a configuration of further limiting mapping of the DMRS is preferable.

For example, the slots to which the DMRS is mapped may be given based at least on the mapping period X2 of the DMRS. For example, the slots to which the DMRS is mapped may be determined based at least on the mapping period X2 of the DMRS. For example, the terminal apparatus 1 may determine to which slots in one period of the mapping period of the DMRS the DMRS is mapped, based at least on the mapping period X2 of the DMRS. For example, the base station apparatus 3 may determine to which slots in one period of the mapping period of the DMRS the DMRS is mapped, based at least on the mapping period X2 of the DMRS.

Figure 17:
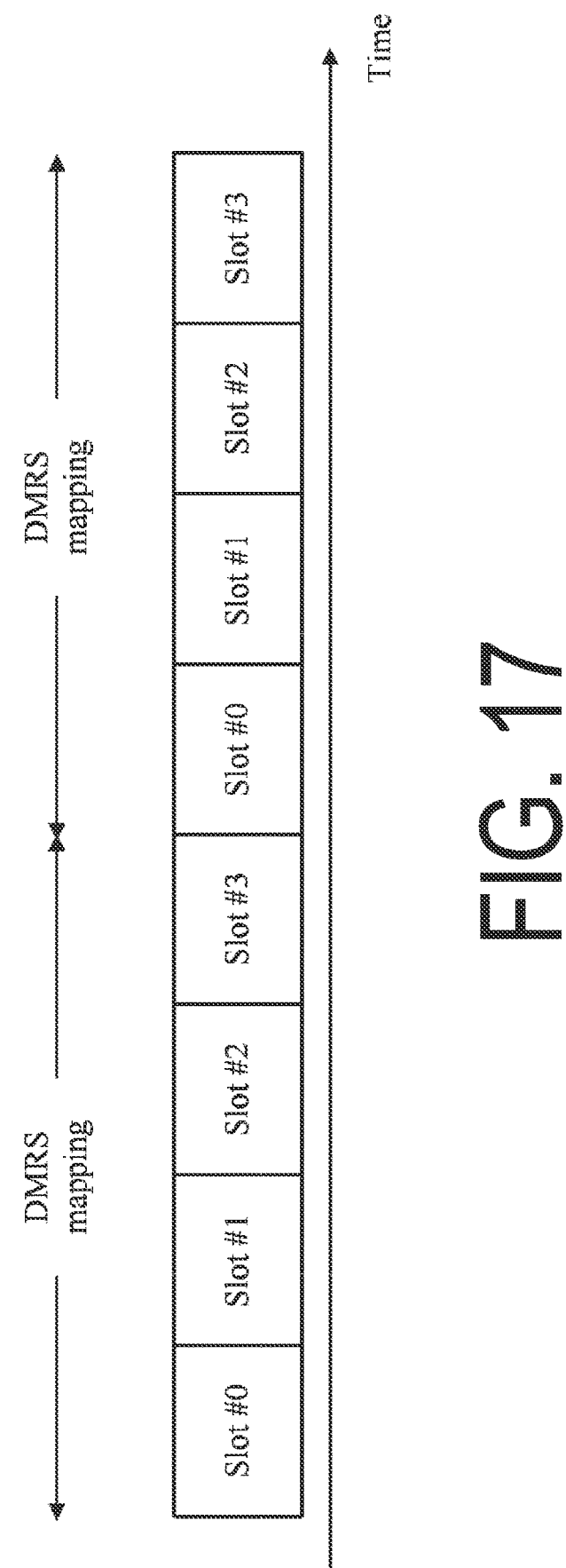
FIG. 17 is a diagram illustrating an example of slots to which the DMRS for the PUSCH is mapped according to an aspect of the present embodiment.

FIG. 17 is a diagram illustrating an example of slots to which the DMRS for the PUSCH is mapped according to an aspect of the present embodiment. The horizontal axis of FIG. 17 indicates the time axis. In FIG. 17, multiple slots (in FIG. 17, eight slots) are illustrated on the time axis. Here, multiple slots of FIG. 17 are assigned with indexes for each mapping period of the DMRS in a manner of slot #0 to slot #3 from the earliest one with respect to time. In FIG. 17, multiple slots are continuously mapped in the time domain; however, the aspect of the present invention is not limited to the configuration in which multiple slots are continuously mapped in the time domain. For example, in the aspect of the present invention, multiple slots may be configured with slots capable of uplink transmission. In other words, in the aspect of the present invention, multiple slots may not include slots capable of downlink transmission.

For example, in FIG. 17, the DMRS for the PUSCH may be mapped to slot #0, slot #1, slot #4, and slot #5. In contrast, in FIG. 17, the DMRS for the PUSCH need not be mapped to slot #2, slot #3, slot #6, and slot #7.

For example, the slots to which the DMRS for the PUSCH is mapped may be mapped to the initial X7 slots in one period of the mapping period of the DMRS. In contrast, the DMRS need not be mapped to the slots in which it is not determined that the DMRS for the PUSCH is mapped.

For example, the slots to which the DMRS for the PUSCH is mapped may have periodicity of X7 slots in one period of the mapping period of the DMRS. For example, a slot i to which the DMRS for the PUSCH is mapped may be a value satisfying mod(i, X7)=Z. Here, Z may be included in at least any one of an RRC parameter, higher layer signaling, an uplink grant used for scheduling the PUSCH, or one DCI format.

For example, X7 may be determined based at least on seventh control information. For example, the seventh control information may be determined based at least on at least any one of an RRC parameter, higher layer signaling, an uplink grant used for scheduling the PUSCH, or one DCI format.

Also, in a case that the terminal apparatus 1 retains the seventh control information, the DMRS for the message 3 PUSCH may be mapped to all of the slots.

For example, a case that the terminal apparatus 1 retains the seventh control information may be a case that the terminal apparatus 1 retains X7. For example, the seventh control information may be information indicating X7. For example, the seventh control information may be information used for determining X7, although being information other than information indicating X7.

Also, in a case that the terminal apparatus 1 retains the seventh control information, the DMRS for the PUSCH scheduled by the random access response grant may be mapped to all of the slots.

In a case that the terminal apparatus 1 does not retain the seventh control information, the DMRS for the PUSCH may be mapped to all of the slots.

For example, X7 may be given based at least on the configuration of the PUSCH scheduled by one uplink grant in the time domain. For example, X7 may be determined based at least on the configuration of the PUSCH scheduled by one uplink grant in the time domain. For example, the terminal apparatus 1 may determine X7, based at least on the configuration of the PUSCH scheduled by one uplink grant in the time domain. For example, the base station apparatus 3 may determine X7, based at least on the configuration of the PUSCH scheduled by one uplink grant in the time domain.

By controlling X7 based at least on the configuration of the PUSCH in the time domain, density of the DMRS of the PUSCH in the time domain may be able to be controlled based on the configuration of the PUSCH in the time domain.

For example, in a case that the configuration of the PUSCH in the time domain is first configuration, X7 may be a first value. In a case that the configuration of the PUSCH in the time domain is second configuration different from the first configuration, X7 may be a second value different from the first value. For example, in a case that the time resources of the PUSCH have a first slot number, X7 may be the first value. In a case that the time resources of the PUSCH are a second slot different from the first slot, X7 may be the second value different from the first value.

For example, X7 may be given based at least on X0. For example, X7 may be determined based at least on X0. For example, the terminal apparatus 1 may determine X7, based at least on X0. For example, the base station apparatus 3 may determine X7, based at least on X0.

By controlling X7 based at least on X0, density of the DMRS of the PUSCH in the time domain may be able to be controlled based on the mapping period of the transport block. For example, it is preferable that mapping of a prescribed DMRS is implemented for each transport block.

For example, in a case that X0 is the first value, X7 may be the second value. In a case that X0 is a third value different from the first value, X7 may be a fourth value different from the second value.

For example, X7 may be given based at least on X1. For example, X7 may be determined based at least on X1. For example, the terminal apparatus 1 may determine X7, based at least on X1. For example, the base station apparatus 3 may determine X7, based at least on X1.

By controlling X7 based at least on X1, density of the DMRS of the PUSCH in the time domain may be able to be controlled based on the mapping period of the sequence of the modulation symbols. For example, implementation of mapping of the modulation symbols and mapping of the DMRS may be facilitated.

For example, in a case that X1 is the first value, X7 may be the second value. In a case that X1 is a third value different from the first value, X7 may be a fourth value different from the second value.

For example, X7 may be given based at least on X2. For example, X7 may be determined based at least on X2. For example, the terminal apparatus 1 may determine X7, based at least on X2. For example, the base station apparatus 3 may determine X7, based at least on X2.

By controlling X7 based at least on X2, density of the DMRS of the PUSCH in the time domain may be able to be controlled based on the mapping period of the DMRS. Through configuration of the mapping period of the DMRS and density of the DMRS in the time domain, flexible mapping of the DMRS can be implemented.

For example, in a case that X2 is the first value, X7 may be the second value. In a case that X2 is a third value different from the first value, X7 may be a fourth value different from the second value.

For example, X7 may be given based at least on X3. For example, X7 may be determined based at least on X3. For example, the terminal apparatus 1 may determine X7, based at least on X3. For example, the base station apparatus 3 may determine X7, based at least on X3.

By controlling X7 based at least on X3, density of the DMRS of the PUSCH in the time domain may be able to be controlled based on the coherence period. Through configuration of the coherence period and density of the DMRS in the time domain, DMRS density may be able to be controlled based on a moving speed of the terminal.

For example, in a case that X3 is the first value, X7 may be the second value. In a case that X3 is a third value different from the first value, X7 may be a fourth value different from the second value.

For example, X7 may be given based at least on X4. For example, X7 may be determined based at least on X4. For example, the terminal apparatus 1 may determine X7, based at least on X4. For example, the base station apparatus 3 may determine X7, based at least on X4.

By controlling X7 based at least on X4, density of the DMRS of the PUSCH in the time domain may be able to be controlled based on a determination method of the size of the transport block.

For example, in a case that X4 is the first value, X7 may be the second value. In a case that X4 is a third value different from the first value, X7 may be a fourth value different from the second value.

Figure 18:
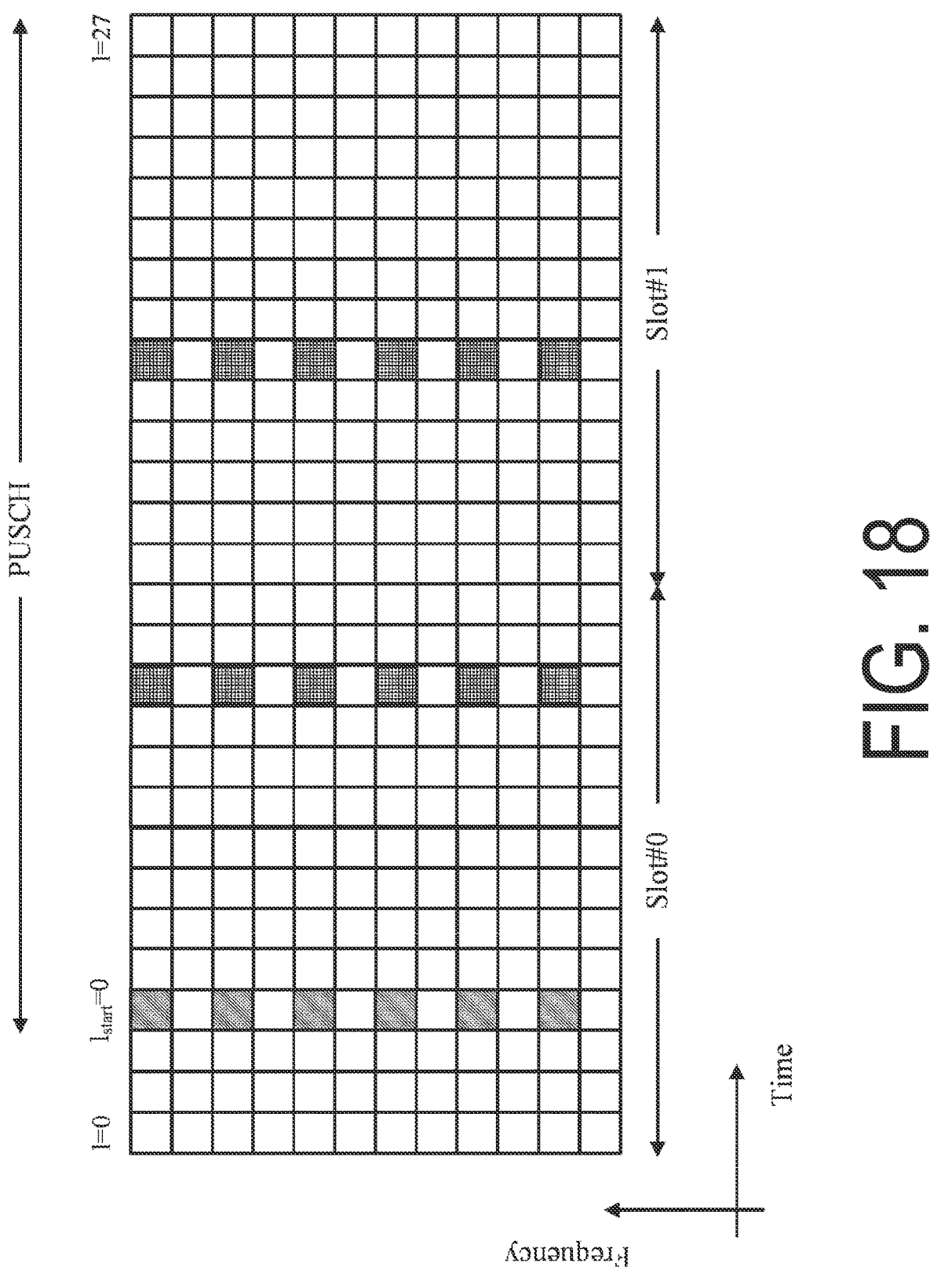
FIG. 18 is a diagram illustrating a mapping example of a DMRS for the PUSCH according to an aspect of the present embodiment.

FIG. 18 is a diagram illustrating a mapping example of the DMRS for the PUSCH according to an aspect of the present embodiment. In FIG. 18, it is assumed that the mapping period of the DMRS for the PUSCH is 2 slots. In FIG. 18, the horizontal axis indicates the time axis, and the vertical axis indicates the frequency axis. In the time domain of FIG. 18, resource elements corresponding to OFDM symbols corresponding to 2 slots are illustrated. In the frequency domain of FIG. 18, resource elements corresponding to 1 PRB are illustrated. 28 OFDM symbols illustrated in FIG. 18 are assigned with indexes of l=0 to l=27 in ascending order in the time domain. In FIG. 18, a configuration that the PUSCH is mapped from OFDM symbol l=3 to l=27 is illustrated.

In FIG. 18, the mapping pattern of the DMRS includes OFDM symbol indexes 0, 8, and 16. In other words, the DMRS is mapped to the 0th, 8th, and 16th OFDM symbols, with respect to the reference point $1_{start}$ of the DMRS.

As illustrated in FIG. 18, the mapping pattern of the DMRS may be applied for each single period of the mapping period of the DMRS. Here, the mapping pattern of the DMRS may be configured by a set of integer values in the range from 0 to X2*14 OFDM symbols−1. In particular, at least one of the indexes of the OFDM symbols included in the mapping pattern of the DMRS may be a value exceeding 13.

Various aspects of apparatuses according to an aspect of the present embodiment will be described below.

(1) In order to accomplish the object described above, the present invention is contrived to provide the following means. Specifically, a first aspect of the present invention is a terminal apparatus including: a receiver configured to receive a command of a MAC layer for activating a spatial relation information set, and a transmitter configured to transmit a PUCCH by applying a transmission filter based on any one piece of spatial relation information of the spatial relation information set, and transmit a PUSCH in a slot set by applying multiple transmission filters respectively based on multiple pieces of spatial relation information included in a spatial relation information subset of the spatial relation information set, wherein the spatial relation information subset at least includes first spatial relation information and second spatial relation information different from the first spatial relation information, the transmitter applies a transmission filter of the multiple transmission filters based on the first spatial relation information to the PUSCH of a first slot subset of the slot set, and applies a transmission filter of the multiple transmission filters based on the second spatial relation information to the PUSCH of a second slot subset of the slot set.

(2) A second aspect of the present invention is a terminal apparatus including: a receiver configured to receive a DCI format including at least one SRS resource indication field; and a transmitter configured to transmit a PUSCH scheduled by the DCI format in a slot set, wherein one SRS resource set is configured for the terminal apparatus by an RRC parameter, a first SRS resource subset of the one SRS resource set and a second SRS resource subset of the one SRS resource set are determined, the first SRS resource subset or the second SRS resource subset is indicated based on a value of the one SRS resource indication field, the first SRS resource subset at least includes a first SRS resource and a second SRS resource, the second SRS resource subset at least includes a third SRS resource and a fourth SRS resource, in a case that the indicated SRS resource subset is the first SRS resource subset, the transmitter applies a transmission filter applied to the first SRS resource to the PUSCH of a first slot subset of the slot set, and applies a transmission filter applied to the second SRS resource to the PUSCH of a second slot subset of the slot set, and in a case that the indicated SRS resource subset is the second SRS resource subset, the transmitter applies a transmission filter applied to the third SRS resource to the PUSCH of a third slot subset of the slot set, and applies a transmission filter applied to the fourth SRS resource to the PUSCH of a fourth slot subset of the slot set.

(3) In the second aspect of the present invention, in a case that a transmission mode configuration for the PUSCH is set to a codebook mode, and transmission diversity is configured for the PUSCH, the first SRS resource subset includes multiple SRS resources, in a case that the transmission mode configuration for the PUSCH is set to the codebook mode, and the transmission diversity is not configured for the PUSCH, the first SRS resource subset includes one SRS resource, and the second SRS resource subset includes one SRS resource, and in a case that the transmission mode configuration for the PUSCH is set to a non-codebook mode, the first SRS resource subset includes multiple SRS resources regardless of configuration of the transmission diversity for the PUSCH.

(4) A third aspect of the present invention is a terminal apparatus including: a receiver configured to receive a first MAC layer command for activating a first spatial relation information set, and receive a second MAC layer command for activating a second spatial relation information set; and a transmitter configured to transmit a PUCCH by applying a transmission filter based on one piece of spatial relation information of the first spatial relation information set, and transmit a PUSCH in a slot set by applying multiple transmission filters respectively based on multiple pieces of spatial relation information included in a first spatial relation information subset of the second spatial relation information set, wherein the first spatial relation information subset at least includes first spatial relation information and second spatial relation information, the transmitter applies a transmission filter of the multiple transmission filters based on the first spatial relation information to the PUSCH of a first slot subset of the slot set, and applies a transmission filter of the multiple transmission filters based on the second spatial relation information to the PUSCH of a second slot subset of the slot set.

(5) A fourth aspect of the present invention is a base station apparatus including: a receiver configured to transmit a command of a MAC layer for activating a spatial relation information set; and the receiver configured to receive a PUCCH to which a transmission filter based on any one piece of spatial relation information of the spatial relation information set is applied, and receive, in a slot set, a PUSCH to which multiple transmission filters respectively based on multiple pieces of spatial relation information included in a spatial relation information subset of the spatial relation information set is applied, wherein the spatial relation information subset at least includes first spatial relation information and second spatial relation information different from the first spatial relation information, a transmission filter of the multiple transmission filters based on the first spatial relation information is applied to the PUSCH of a first slot subset of the slot set, and a transmission filter of the multiple transmission filters based on the second spatial relation information is applied to the PUSCH of a second slot subset of the slot set.

(6) A fifth aspect of the present invention is a base station apparatus including: a transmitter configured to receive a DCI format including at least one SRS resource indication field; and a receiver configured to receive a PUSCH scheduled by the DCI format in a slot set, wherein one SRS resource set is configured for a terminal apparatus by an RRC parameter, a first SRS resource subset of the one SRS resource set and a second SRS resource subset of the one SRS resource set are determined, the first SRS resource subset or the second SRS resource subset is indicated based on a value of the one SRS resource indication field, the first SRS resource subset at least includes a first SRS resource and a second SRS resource, the second SRS resource subset at least includes a third SRS resource and a fourth SRS resource, in a case that the indicated SRS resource subset is the first SRS resource subset, a transmission filter applied to the first SRS resource is applied to the PUSCH of a first slot subset of the slot set, and a transmission filter applied to the second SRS resource is applied to the PUSCH of a second slot subset of the slot set, and in a case that the indicated SRS resource subset is the second SRS resource subset, a transmission filter applied to the third SRS resource is applied to the PUSCH of a third slot subset of the slot set, and a transmission filter applied to the fourth SRS resource is applied to the PUSCH of a fourth slot subset of the slot set.

(7) In the fifth aspect of the present invention, in a case that a transmission mode configuration for the PUSCH is set to a codebook mode, and transmission diversity is configured for the PUSCH, the first SRS resource subset includes multiple SRS resources, in a case that the transmission mode configuration for the PUSCH is set to the codebook mode, and the transmission diversity is not configured for the PUSCH, the first SRS resource subset includes one SRS resource, and the second SRS resource subset includes one SRS resource, and in a case that the transmission mode configuration for the PUSCH is set to a non-codebook mode, the first SRS resource subset includes multiple SRS resources regardless of configuration of the transmission diversity for the PUSCH.

(8) A sixth aspect of the present invention is a base station apparatus including: a transmitter configured to transmit a first MAC layer command for activating a first spatial relation information set, and transmit a second MAC layer command for activating a second spatial relation information set; and a receiver configured to receive a PUCCH to which a transmission filter based on one piece of spatial relation information of the first spatial relation information set is applied, and receive, in a slot set, a PUSCH to which multiple transmission filters respectively based on multiple pieces of spatial relation information included in a first spatial relation information subset of the second spatial relation information set is applied, wherein the first spatial relation information subset at least includes first spatial relation information and second spatial relation information, a transmission filter of the multiple transmission filters based on the first spatial relation information is applied to the PUSCH of a first slot subset of the slot set, and a transmission filter of the multiple transmission filters based on the second spatial relation information is applied to the PUSCH of a second slot subset of the slot set.

(9) A seventh aspect of the present invention is a terminal apparatus including: a receiver configured to receive a control signal indicating information for identifying a first precoder subset of a first precoder set, and receive a DCI format including a field indicating a first precoder out of precoders included in the first precoder subset; and a transmitter configured to transmit a PUSCH scheduled by the DCI format, wherein the first precoder subset at least includes a second precoder, the second precoder is determined based on the first precoder, and the transmitter applies the first precoder to the PUSCH of a first slot subset of the slot set, and applies the second precoder to the PUSCH of a second slot subset of the slot set.

(10) In the seventh aspect of the present invention, the transmitter transmits function information of the terminal apparatus, the function information indicates whether or not a function of applying a prescribed type of precoder out of the first precoder set is included, and in a case that the function information indicates that there is no function of applying the prescribed type of precoder, the first precoder subset is configured without including the prescribed type of precoder.

(11) An eighth aspect of the present invention is a base station apparatus including: a transmitter configured to transmit a control signal indicating information for identifying a first precoder subset of a first precoder set, and transmit a DCI format including a field indicating a first precoder out of precoders included in the first precoder subset; and a receiver configured to receive a PUSCH scheduled by the DCI format in a slot set, wherein the first precoder subset at least includes a second precoder, the second precoder is determined based on the first precoder, and the first precoder is applied to the PUSCH of a first slot subset of the slot set, and the second precoder is applied to the PUSCH of a second slot subset of the slot set.

(12) In the eighth aspect of the present invention, the receiver receives function information of a terminal apparatus that transmits the PUSCH, the function information indicates whether or not a function of applying a prescribed type of precoder out of the first precoder set is included, and in a case that the function information indicates that there is no function of applying the prescribed type of precoder, the first precoder subset is configured without including the prescribed type of precoder.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. Also, the information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral device. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Furthermore, the base station apparatus 3 according to the aforementioned embodiment may be achieved as an aggregation (apparatus group) including multiple apparatuses. Each of the apparatuses included in such an apparatus group may include each function, or some or all portions of each functional block of the base station apparatus 3 according to the aforementioned embodiment. As the apparatus group, it is only necessary to have a complete set of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a Next-Gen RAN (NG-RAN or NR RAN). Moreover, the base station apparatus 3 according to the aforementioned embodiment may have some or all of the functions of a higher node for an eNodeB and/or a gNB.

Also, some or all portions of each of the terminal apparatus 1 and the base station apparatus 3 according to the aforementioned embodiment may be implemented as an LSI which is a typical integrated circuit or may be implemented as a chip set. The functional blocks of each of the terminal apparatus 1 and the base station apparatus 3 may be individually implemented as a chip, or some or all of the functional blocks may be integrated into a chip. Furthermore, a circuit integration technique is not limited to the LSI, and may be realized with a dedicated circuit or a general-purpose processor. Moreover, in a case that with advances in semiconductor technology, a circuit integration technology with which an LSI is replaced appears, it is also possible to use an integrated circuit based on the technology.

In addition, although the aforementioned embodiments have described the terminal apparatus as an example of a communication apparatus, the present invention is not limited to such a terminal apparatus, and is applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception unit
10a, 30a Radio transmitting unit
10aa Channel coding/scrambling/modulation unit 10*ab* Layer mapping unit
10*ac* Precoding unit
10*ad* Time-signal generation unit
10*ae* Spatial filter unit
10*af* Antenna unit
10*b*, 30*b* Radio receiving unit
10*ba* Channel decoding/descrambling/demodulation unit
10*bb* Layer demapping unit
10*bc* Channel demodulation unit
10*bd* Frequency signal generation unit
10*be* Spatial filter unit
10*bf* Antenna unit
11, 31 Antenna unit
12, 32 RF unit
13, 33 Baseband unit
14, 34 Higher layer processing unit
15, 35 Medium access control layer processing unit
16, 36 Radio resource control layer processing unit
91, 92, 93, 94 Search space set
300 Component carrier
301 Primary cell
302, 303 Secondary cell
1600 Spatial filter set
1700 Codebook set
3000 Point
3001, 3002 Resource grid
3003, 3004 BWP
3011, 3012, 3013, 3014 Offset
3100, 3200 Common resource block set
16000 Management function
16001, 16002, 16003, 16004, 16005, 16006, 16007, 16008, 16009, 16010, 16011, 16012, 16013,
16014, 16015, 16016, 16017, 16018, 16019, 16020, 16021, 16022, 16023, 16024, 16025, 16026,
16027, 16028, 16029, 16030, 16031, 16032 Spatial filter
16101, 16102 Downlink physical signal
16103 Uplink physical signal
17001, 17002, 17003, 17004 Codebook
The invention claimed is:

1. A terminal apparatus comprising:
receiving circuitry configured to receive a Physical Downlink Control Channel (PDCCH) including a Downlink Control Information (DCI) format for determining a first spatial filter and a second spatial filter; and
transmitting circuitry configured to:
  transmit a Physical Uplink Shared Channel (PUSCH) scheduled by the DCI format in a slot set, and
  apply the first spatial filter to the PUSCH in a first slot subset of the slot set, and apply the second spatial filter to the PUSCH in a second slot subset of the slot set, wherein:
    a number of slots of the first slot subset in a first part of one period, during which the first spatial filter is continuously mapped, and a number of slots of the second slot subset in a second part of the one period, during which the second spatial filter is continuously mapped, are determined based on a Radio Resource Control (RRC) parameter, and
  the first slot subset comprises the same number of slots as the second slot subset, and the number of slots in the first slot subset remains the same in each one period.

2. A base station apparatus comprising:
transmitting circuitry configured to transmit a Physical Downlink Control Channel (PDCCH) including a Downlink Control Information (DCI) format for determining a first spatial filter and a second spatial filter; and
receiving circuitry configured to receive a Physical Uplink Shared Channel (PUSCH) scheduled by the DCI format in a slot set, wherein:
  the first spatial filter is applied to the PUSCH in a first slot subset of the slot set, and the second spatial filter is applied to the PUSCH in a second slot subset of the slot set,
  a number of slots of the first slot subset in a first part of one period during which the first spatial filter is continuously mapped, and a number of slots of the second slot subset in a second part of the one period during which the second spatial filter is continuously mapped, are determined based on a Radio Resource Control (RRC) parameter, and
  the first slot subset comprises the same number of slots as the second slot subset, and the number of slots in the first slot subset remains the same in each one period.

3. A communication method used for a terminal apparatus, the communication method comprising:
receiving a Physical Downlink Control Channel (PDCCH) including a Downlink Control Information (DCI) format for determining a first spatial filter and a second spatial filter;
transmitting a Physical Uplink Shared Channel (PUSCH) scheduled by the DCI format in a slot set; and
applying the first spatial filter to the PUSCH in a first slot subset of the slot set, and applying the second spatial filter to the PUSCH in a second slot subset of the slot set, wherein:
  a number of slots of the first slot subset in a first part of one period, during which the first spatial filter is continuously mapped, and a number of slots of the second slot subset in a second part of the one period, during which the second spatial filter is continuously mapped, are determined based on a Radio Resource Control (RRC) parameter, and
  the first slot subset comprises the same number of slots as the second slot subset, and the number of slots in the first slot subset remains the same in each one period.

* * * * *